(12) United States Patent
Khambete et al.

(10) Patent No.: US 8,660,539 B2
(45) Date of Patent: Feb. 25, 2014

(54) DATA COLLECTION AND TARGETED ADVERTISING SYSTEMS AND METHODS

(75) Inventors: Prasad M. Khambete, Cupertino, CA (US); Sanjeev Tenneti, Milpitas, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 506 days.

(21) Appl. No.: 12/433,881

(22) Filed: Apr. 30, 2009

(65) Prior Publication Data

US 2009/0298480 A1    Dec. 3, 2009

Related U.S. Application Data

(60) Provisional application No. 61/049,030, filed on Apr. 30, 2008, provisional application No. 61/075,304, filed on Jun. 24, 2008, provisional application No. 61/074,995, filed on Jun. 23, 2008.

(51) Int. Cl.
  *H04M 3/42*    (2006.01)
(52) U.S. Cl.
  USPC ........ 455/414.1; 455/405; 455/406; 455/407; 455/408; 455/418; 455/429; 455/420; 455/466; 370/310.2; 370/312; 370/328; 379/111; 379/141
(58) Field of Classification Search
  USPC .................. 455/405, 406, 407, 408, 418–420, 455/414.1, 466; 370/310.2, 312, 328; 379/111–141
  See application file for complete search history.

(56) References Cited

U.S. PATENT DOCUMENTS

| | | |
|---|---|---|
| 5,399,874 A | 3/1995 | Gonsalves et al. |
| 5,668,897 A | 9/1997 | Stolfo |
| 5,724,521 A | 3/1998 | Dedrick |
| 5,785,353 A | 7/1998 | Diamond |
| 5,974,548 A | 10/1999 | Adams |

(Continued)

FOREIGN PATENT DOCUMENTS

| | | |
|---|---|---|
| EP | 1139198 A2 | 10/2001 |
| EP | 1477879 A2 | 11/2004 |

(Continued)

OTHER PUBLICATIONS

PCT Notification Concerning Transmittal of International Preliminary Report on Patentability for International Application No. PCT/US2009/002703, mailed Nov. 11, 2010, 10 pages.

(Continued)

*Primary Examiner* — Steve D Agosta
(74) *Attorney, Agent, or Firm* — Finnegan, Henderson, Farabow, Garrett & Dunner, LLP

(57) ABSTRACT

Embodiments of a mobile device and server system are described. The mobile devices communicate with the server system and present targeted content, such as advertisements to the mobile device users. The content is targeted based on usage statistics stored on the server system which were previously collected from the mobile device. The server receives the usage statistics collected from the mobile device, makes inferences about preferences of users by tracking application and/or content usage behaviors of the users, generates recommendations for advertisements targeted toward the users of the mobile devices based on usage statistics; and transmits the recommendations to one or more of the mobile devices for presentation to the user(s).

18 Claims, 30 Drawing Sheets

(56) References Cited

U.S. PATENT DOCUMENTS

| | | | |
|---|---|---|---|
| 6,144,944 A * | 11/2000 | Kurtzman et al. | 705/14.54 |
| 6,233,684 B1 | 5/2001 | Stefik et al. | |
| 6,314,521 B1 | 11/2001 | Debry | |
| 6,351,815 B1 | 2/2002 | Adams | |
| 6,487,301 B1 | 11/2002 | Zhao | |
| 6,510,453 B1 | 1/2003 | Apfel et al. | |
| 6,567,530 B1 | 5/2003 | Keronen et al. | |
| 6,584,613 B1 * | 6/2003 | Dunn et al. | 725/122 |
| 6,785,815 B1 | 8/2004 | Serret-Avila et al. | |
| 6,862,583 B1 | 3/2005 | Mazzagatte et al. | |
| 6,957,062 B2 | 10/2005 | Castrogiovanni et al. | |
| 7,152,047 B1 | 12/2006 | Nagel | |
| 7,215,832 B1 | 5/2007 | Yamaguchi | |
| 7,236,610 B1 | 6/2007 | Luo et al. | |
| 7,383,441 B2 | 6/2008 | Vorbruggen et al. | |
| 7,877,460 B1 * | 1/2011 | Brouwer et al. | 709/217 |
| 8,055,536 B1 * | 11/2011 | Olaiya et al. | 705/14.1 |
| 2001/0051920 A1 | 12/2001 | Joao et al. | |
| 2002/0024714 A1 | 2/2002 | Sandstrom et al. | |
| 2002/0042884 A1 | 4/2002 | Wu et al. | |
| 2002/0083441 A1 | 6/2002 | Flickinger et al. | |
| 2002/0124182 A1 | 9/2002 | Bacso et al. | |
| 2002/0152169 A1 | 10/2002 | Dutta et al. | |
| 2002/0156677 A1 * | 10/2002 | Peters et al. | 705/14 |
| 2003/0028432 A1 | 2/2003 | Troyansky et al. | |
| 2003/0110497 A1 | 6/2003 | Yassin et al. | |
| 2003/0182246 A1 | 9/2003 | Johnson et al. | |
| 2003/0196110 A1 | 10/2003 | Lampson et al. | |
| 2004/0022444 A1 | 2/2004 | Rhoads | |
| 2004/0039707 A9 | 2/2004 | Ricci | |
| 2004/0117627 A1 | 6/2004 | Brewington | |
| 2004/0249709 A1 | 12/2004 | Donovan et al. | |
| 2004/0260574 A1 | 12/2004 | Gross | |
| 2005/0138357 A1 | 6/2005 | Swenson et al. | |
| 2005/0144065 A1 | 6/2005 | Calabria et al. | |
| 2005/0198510 A1 | 9/2005 | Robert et al. | |
| 2005/0203796 A1 | 9/2005 | Anand et al. | |
| 2005/0215238 A1 | 9/2005 | Macaluso | |
| 2007/0028106 A1 | 2/2007 | Lauter et al. | |
| 2007/0033397 A1 | 2/2007 | Phillips, II et al. | |
| 2007/0038931 A1 | 2/2007 | Allaire et al. | |
| 2007/0123275 A1 | 5/2007 | Faraz | |
| 2007/0136761 A1 | 6/2007 | Basmajian et al. | |
| 2007/0156838 A1 | 7/2007 | Kocho et al. | |
| 2007/0250383 A1 | 10/2007 | Tollinger et al. | |
| 2007/0288518 A1 | 12/2007 | Crigler et al. | |
| 2007/0296805 A1 | 12/2007 | Tedenvall et al. | |
| 2008/0046758 A1 | 2/2008 | Cha et al. | |
| 2008/0059631 A1 | 3/2008 | Bergstrom et al. | |
| 2008/0092239 A1 | 4/2008 | Sitrick et al. | |
| 2008/0103977 A1 | 5/2008 | Khosravy et al. | |
| 2008/0133311 A1 | 6/2008 | Madriz Ottolina | |
| 2008/0155589 A1 | 6/2008 | McKinnon et al. | |
| 2008/0187279 A1 | 8/2008 | Gilley et al. | |
| 2009/0037949 A1 | 2/2009 | Birch | |
| 2009/0083147 A1 | 3/2009 | Paila et al. | |
| 2009/0198542 A1 | 8/2009 | D'Amore et al. | |
| 2009/0234923 A1 | 9/2009 | Hunter | |
| 2010/0293049 A1 | 11/2010 | Maher et al. | |
| 2010/0293050 A1 | 11/2010 | Maher et al. | |
| 2010/0293058 A1 | 11/2010 | Maher et al. | |
| 2010/0299522 A1 | 11/2010 | Khambete | |

FOREIGN PATENT DOCUMENTS

| | | |
|---|---|---|
| JP | 2007286832 | 11/2007 |
| JP | 2008-077173 A | 4/2008 |
| KR | 2009-0021514 A | 3/2009 |

OTHER PUBLICATIONS

International Search Report and International Written Opinion mailed Dec. 29, 2010 for application No. PCT/2010/001500.
International Search Report and International Written Opinion mailed Dec. 14, 2010 for application No. PCT/2010/001509.
International Search Report and International Written Opinion mailed Dec. 14, 2010 for application No. PCT/2010/001510.
International Search Report and International Written Opinion mailed Dec. 14, 2010 for application No. PCT/2010/001511.
International Search Report and International Written Opinion mailed Jul. 2, 2009 for application No. PCT/2009/02703.
Office Action mailed Jan. 4, 2012, in U.S. Appl. No. 12/785,406.
Office Action mailed Mar. 19, 2012, in U.S. Appl. No. 12/785,409.
Office Action mailed Mar. 27, 2012, in U.S. Appl. No. 12/785,412.
Office Action mailed Jul. 12, 2012, in U.S. Appl. No. 12/785,406.
Office Action mailed Aug. 9, 2012, in U.S. Appl. No. 12/784,290.
Final Office Action mailed Oct. 11, 2012, in U.S. Appl. No. 12/785,409.
Final Office Action mailed Oct. 31, 2012, in U.S. Appl. No. 12/785,412.
Extended Search Report mailed Nov. 27, 2012 in U.S. Appl. No. 09739235.1.
English translation of First Office Action mailed Dec. 10, 2012, in Chinese Patent Application No. 200980124975.2.
Office Action mailed Apr. 23, 2013, in U.S. Appl. No. 12/785,406.
Office Action mailed May 9, 2013, in U.S. Appl. No. 12/784,290.
English translation of First Office Action mailed May 21, 2013 in Japanese Patent Application No. 2011-507464.
Non-Final Office Action mailed Jun. 21, 2013, in U.S. Appl. No. 12/785,412.

* cited by examiner

Advertiser Ref:

Category: ⌄   Region ID: ⌄   Search

ID:

Advertiser Ref:   Title:

Category:   Description:

Coupon
Image URL:

2410

|◁  ◁   New   Save   Delete   △  ▷|

DATA COLLECTION AND TARGETED ADVERTISING SYSTEMS AND METHODS

CROSS REFERENCE TO RELATED APPLICATIONS

This application claims the benefit of U.S. Provisional Applications Nos. 61/049,030, filed Apr. 30, 2008; 61/074,995, filed Jun. 23, 2008; and 61/075,304, filed Jun. 24, 2008; each of which is also incorporated by reference herein.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Mobile service providers typically collect usage information using server-side techniques. One techniques is to track downloads from a WAP portal/web-server when users visit a web-site optimized for viewing on the mobile phone. A drawback of this technique is that it does not provide fine-grained information regarding how users actually consume the content. Such information would be useful in order to better tailor service offerings to user needs. Another technique for collecting usage information is by tracking the delivery of SMS (Short Message Service) messages. A drawback of this technique is that it typically assumes that the recipient views each SMS message that is delivered. This assumption can be very inaccurate, however, since many users delete spam SMS messages without viewing them.

In the absence of reliable usage information, a common form of mobile advertising is via SMS spamming. In many locales where incoming SMS messages are free, advertisers purchase bulk SMS sending capacity and spam users with SMS advertisements. Users often delete these advertisements without viewing them. Some evidence suggests that some consumers do not want to pay for content but would be willing to watch advertisements in exchange for not paying for the content. Some consumers even enjoy watching advertisements.

SUMMARY

The following is a non-limiting summary of some of the inventive aspects of some embodiments the systems and methods described herein:

In one embodiment, a mobile telecommunications device includes a display for displaying content to a user; one or more input devices for collecting input from the user; and one or more processors adapted and programmed to communicate with a server system and to present targeted advertisements to the user, the advertisements being targeted based at least in part on usage statistics stored on the server system and having been previously collected from the mobile telecommunications device.

In another embodiment, a server system for collecting usage statistics and recommending targeted advertisements includes one or more processors adapted and programmed to receive usage statistics from a plurality of mobile telecommunications devices, to analyze the usage statistics and to generate therefrom recommendations for advertisements targeted to users of the mobile devices, wherein the one or more processors automatically make inferences about relatedness of the users by tracking application and/or content forwarding behaviors of the users, and recommending products and/or services to users based at least in part on the relatedness of the users.

In another embodiment, a method for presenting targeted advertisements to a user of a mobile telecommunications device includes collecting usage statistics from the mobile telecommunications device; transmitting the usage statistics to a server system; receiving recommended targeted advertisements from the server system, the advertisements being recommended by the server system based at least in part on the collected usage statistics; and presenting one or more of the recommended targeted advertisements to the user via the mobile device.

In another embodiment, a method for recommending targeted advertisements to users of mobile telecommunications devices includes receiving usage statistics collected from the mobile telecommunications devices; making inferences about relatedness of the users by tracking application and/or content forwarding behaviors of the users; generating recommendations for advertisements targeted toward users of the mobile devices based in part on the relatedness of the users; and transmitting the recommendations to one or more of the mobile telecommunications devices.

In another embodiment, a method for identifying a mobile telecommunications device for purposes of collecting usage statistics and recommending targeted advertising includes collecting usage statistics from the mobile telecommunications device; receiving a mobile device identifier from a server system; transmitting the usage statistics to the server system such that the server system can associate the usage statistics with the mobile device; and receiving recommended targeted advertisements from the server system wherein the advertisements are targeted based at least in part on the transmitted usage statistics.

In another embodiment, a server system for collecting usage statistics from mobile telecommunications devices includes one or more processors adapted and programmed to transmit a mobile device identifier to a mobile telecommunications device, receive usage statistics from the mobile device, and verify that the received usage statistics originated from the mobile device based at least in part on an association of the mobile device identifier and the received usage statistics.

As used herein the term "mobile phone" or "mobile device" refers generally to any electronic device used for mobile voice or data communication, and includes, without limitation, devices known by other names such as cellphones, handphones, cellular phones, cells, mobiles, wireless phones, cellular telephones, mobile telephones, cell telephones, smartphones, gaming devices, personal digital assistants, and the like.

Other inventive aspects of the systems and methods described herein are described below. It will be appreciated that in some embodiments, only some of the inventive aspects described above might be included. It will be appreciated that these systems and methods are novel, as are applications thereof and many of the components, systems, and methods employed therein. It should be appreciated that embodiments of the presently described inventive body of work can be implemented in numerous ways, including as processes, apparatuses, systems, devices, methods, computer-readable media, and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which:

FIG. 14 shows an illustrative interface for performing user management, according to some embodiments;

FIGS. 15, 16 and 17 show illustrative interfaces for an advertiser, advertisement, and ad-purchase order, respectively, according to some embodiments;

FIG. 18 shows a content provider interface, according to some embodiments;

FIG. 19 shows a channel interface screen, according to some embodiments;

FIG. 23 shows a modify-allocation interface screen, according to some embodiments;

FIG. 24 shows a coupon interface screen, according to some embodiments;

FIG. 25 shows a location ad interface screen, according to some embodiments;

DETAILED DESCRIPTION

Figure 1:
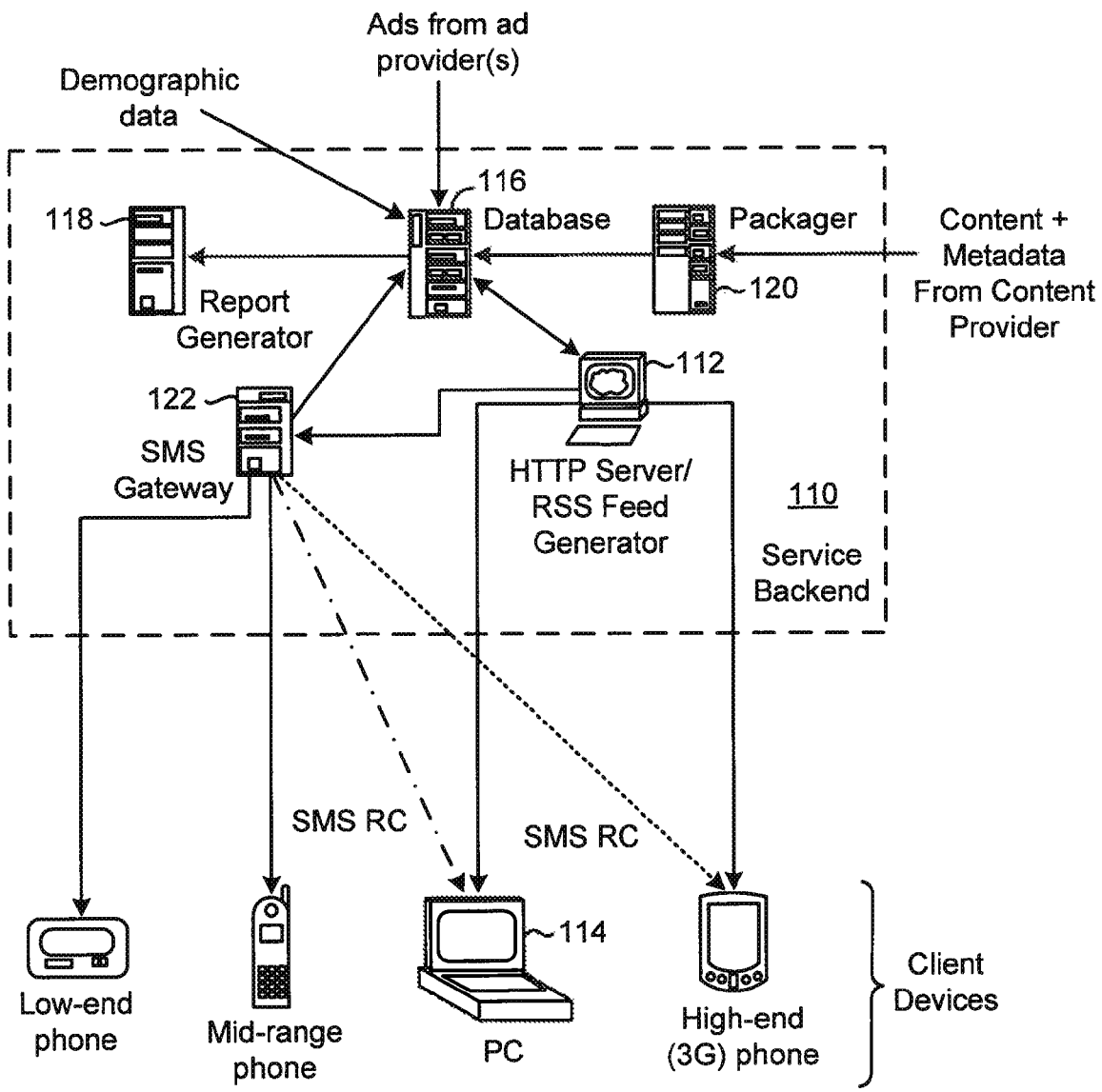
FIG. 1 is a diagram showing various elements of system for data collection and the measurement of usage statistics in the context of targeted mobile advertisements.

A detailed description of the inventive body of work is provided below. While several embodiments are described, it should be understood that the inventive body of work is not limited to any one embodiment, but instead encompasses numerous alternatives, modifications, and equivalents. For example, without limitation, while several of the illustrative embodiments described below are in the context of targeted mobile advertisements, it will be appreciated that the systems and methods described herein are readily applicable to other contexts as well, including, without limitation, non-mobile contexts, and contexts involving the targeting of content other than advertisements (e.g., entertainment content, news and informational content, etc.). In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

Targeting advertisements and other content to a user based on relevance is a more effective way of getting the user's attention than sending spam. Systems and methods are presented for facilitating the collection of usage information and/or other data, and/or for facilitating targeted advertising and/or other content. Systems and methods are described herein that, in some embodiments, could be used to attract mobile phone users and/or to provide a platform for targeted advertisement and/or audience measurement using digital rights management ("DRM") technology such as that described in commonly assigned, co-pending U.S. patent application Ser. No. 11/583,693, filed Oct. 18, 2006 (Publication No. 2007/0180519 A1)("the '693 application"), and/or the DRM technology and/or service orchestration technology described in commonly assigned U.S. patent application Ser. No. 10/863,551 (Publication No. 2005/0027871) ("the '551 application")(the contents of both the '693 application and the '551 application are hereby incorporated by reference in their entirety herein). It will be appreciated that these systems and methods are novel, as are many of the components, systems, and methods employed therein.

The collection of usage information is one application that greatly benefits from the use of trusted computing. A system that collects usage statistics typically needs to ensure that the data are accurately collected and can be trusted. For example, advertisers will typically want an assurance that the collected information was integrity-protected (e.g., that it was not altered or tampered with) after collection. Mobile users' may want their privacy protected, and/or regulations of some locales may require that user's privacy be protected.

Many of the embodiments described herein overcome some or all of the problems of current technology used in mobile usage data collection by enabling the collection of authentic and accurate client usage data. The collected data can be analyzed by a backend system and used to provide targeted advertisements, promotional offers, and the like to users who may be interested in receiving them, thereby increasing system efficiency and contributing to a more satisfying user experience.

In one embodiment, a system is provided that includes client applications on the PC and/or mobile platforms and a corresponding service backend infrastructure. The client application measures usage information and relays this information to the service backend. The collected data is correlated with other information, such as, e.g., demographic data, and used to deliver targeted advertisements or other information to the user. The client reports the collected usage information using a suitable return channel, such as, e.g., SMS or a web-based protocol. The targeted advertisements may be delivered separately, or with an associated piece of content.

In some embodiments, the measurement and collection of usage statistics, even when the user is mobile or offline, is enabled. A DRM engine can be used to enable the application to record such usage statistics. Encoding and compressing techniques can be used on the collected usage statistics, and/or the usage statistics can be sent in multipart messages if they exceed any applicable size limits. Alternatively, or in addition, on some embodiments usage statistics can be collected and analyzed at the service backend.

Some advantages of some preferred embodiments of the systems and methods described herein include, for example:

(1) Service providers can use the usage statistics to determine the effectiveness of content services and to customize their offerings based on this feedback. For example, service providers could charge a premium for advertisements shown with popular content, as determined by analyzing usage statistics.

(2) Consumers will have more relevant content and offerings. Consumers will be shown advertisements that are of interest to them, which will improve their user experience. Consumers may also be offered the choice of advertisement-free content services.

(3) Advertisers can realize savings by delivering advertisements to targeted users, rather than broadcasting them via spam. In some embodiments, the advertisers will be able to see from collected usage information whether or not an advertisement was actually viewed.

(4) Content providers can track the popularity of their offerings within the fast-growing mobile user base, which is currently not effectively tracked.

Illustrative Implementation Details

Content Encryption

In some embodiments, no content encryption is used. In other embodiments, content can be encrypted using any suitable technique, such as those described in the '693 application and the '510 application. Possible reasons for not encrypting the content include:

(1) Encryption is often ineffective at protecting content. Plaintext versions of encrypted content often become available to consumers regardless of whether encryption was initially used.

(2) Currently, consumers are used to transferring unencrypted content freely between devices and playing the content on different devices without any constraints. Thus, using unencrypted content can help avoid creating a user experience that will be perceived to be worse than what consumers are currently accustomed to.

(3) Mobile phone manufacturers have built barriers to entry into their platforms that can make it difficult for third party application developers to create applications with codec hooks. The traditional route of deployment via device manufacturers or systems integrators can be difficult. By not requiring encryption, non-traditional paths can be used to deploy third-party applications via direct download by subscribers without having to go through device manufacturers or carriers.

(4) In embodiments where the content that is pushed to users is of relatively ephemeral value (e.g., clips from network TV shows), there is less of a need for encryption.

In one embodiment, a consumer's mobile device will include a DRM engine such as that described in the '551 application and/or the '693 application, and will respect control information related to metering and ad-insertion (e.g., licenses including obligations and/or callbacks of the type described in the '693 application). The mobile device will report the collected statistics using a suitable return channel such as, e.g., SMS and/or a web services protocol such as that described in the '551 application.

In one embodiment, an application is provided for the PC and/or mobile platform. Network television shows featuring quizzes or contests have gained a huge following and viewership, and have generated a very large volume of user feedback in terms of votes cast. In one embodiment, the application would enable a user to download content clips with embedded advertisements from a network television show and to transfer these clips to his or her cell phone (or tethered phone) or to directly download the clips to the phone (e.g., to a 3G phone).

Although interest in a network TV show may be one of the factors that could initially motivate a user to download the application to his or her PC and/or mobile phone, in order to engage and maintain the attention of the user the application will preferably provide some value to the user in terms of making some activities easier. In one embodiment, the feature set for the application could include capabilities such as some or all of the following: (1) enable users to automatically download excerpts and/or clips from new episodes of shows; (2) enable consumers to consume content offline or on the go; (3) offer free ringtones corresponding to a clip and make it easy to set the ringtone on the phone; (4) enable consumers to send a ringtone from the show to another mobile phone (e.g., to a friend); (5) make it easy to vote for a particular contestant on a show from within the application; and/or (6) provide trivia, jokes, and background information about the show.

In one illustrative embodiment, a system is provided that includes some or all of the following components:

(1) A PC-based player application and RSS feed listener for downloading show excerpts, clips, advertisements, licenses, and/or the like, and for providing a mechanism to transfer content and ringtones to a tethered device (e.g., a mobile phone). For example, the application could send ringtones to a mobile phone using SMS.

(2) A mobile phone application, or a suite of mobile phone applications, customized for low-end, intermediate, and high-end phones, respectively.

Alternatively, in some embodiments, for simple, low-end phones that are only capable of receiving ringtones, a dedicated mobile application is not used. In such embodiments, the SMS delivery report obtained from the SMS gateway can be used to track which ringtones, for example, a particular user received. Advertisements may be inserted into the ringtone SMS.

For intermediate, mid-range phones that are more capable than low-end phones, but that may have a slow network connection, different applications can be provided for different platforms (e.g., for Java-enabled phones and Symbian phones). In the case of Java-enabled phones, a stripped-down, mobile version of the PC application can be provided on which content (e.g., audio and ringtone content) is sideloaded. The application may come with a pre-personalized DRM engine and may store metering data in secure storage. An SMS adapter can be used to read this data and periodically upload it via SMS to the service backend. A Symbian version of the mobile phone application can also be provided that provides similar functionality.

For high-end phones, such as 3G smart phones with fast network connectivity, a full-featured, mobile version of the PC application can be used, with a built-in DRM engine and service orchestration stack. Such an application can be functionally equivalent to the PC application, but preferably has a user interface that is customized for the phone screen form factor.

(3) A backend infrastructure. In preferred embodiments, the backend infrastructure may include some or all of the following functionality: feed generation; ad insertion for static and/or dynamic ads; generation of ringtones from audio clips (e.g., Truetone ringtones for the Nokia platform); packaging tools for packaging content and associated license(s) requiring metering and/or ad-insertion (e.g., via the obligation and/or callback mechanisms described in the '693 application); SMS gateway and web-based front-end/web-service interface to enable a PC-based application to send a ringtone via SMS to the phone; a mechanism to collect metering data sent via SMS and organize it in a database for analysis; and offline tools for analysis and correlation of received metering and usage information with other data in order to more effectively draw inferences about user behavior. For example, usage data indicating ad viewing preferences could be correlated with demographic data (such as, e.g., age and income) to help identify a target segment of the population for a particular product.

A more detailed example embodiment is described below in connection with FIG. 1, which is a diagram showing various elements of an illustrative system for data collection and measurement of audience usage statistics for use, e.g., in targeted mobile advertising. Service backend 110 includes a report generator 118, database 116, packager 120, SMS gateway 122, and an HTTP Server/RSS Feed Generator 112. In one example, a PC application running at the service backend 110 targets users that have a PC 114 and a mobile phone to which users copy content through a data cable, e.g., by mounting the mobile phone in the USB mass storage mode on the PC.

Many network television shows currently have official web sites, but they are often relatively slow to load over the network. This makes them less usable, especially in view of the fact that some households have slow dial-up links and/or relatively slow, shared Internet connections. Accordingly, in some preferred embodiments, a PC application can be locally installed on the user's PC 114 (e.g., a Microsoft WINDOWS-based PC), and can use network bandwidth to download content/metadata via RSS and provide a better user experience especially in a disconnected mode.

In preferred embodiments, a DRM client is included on the PC and/or mobile phone, and could, e.g., be pre-personalized with a personality and/or fixed user node of the type described in the '693 application.

Figure 2:
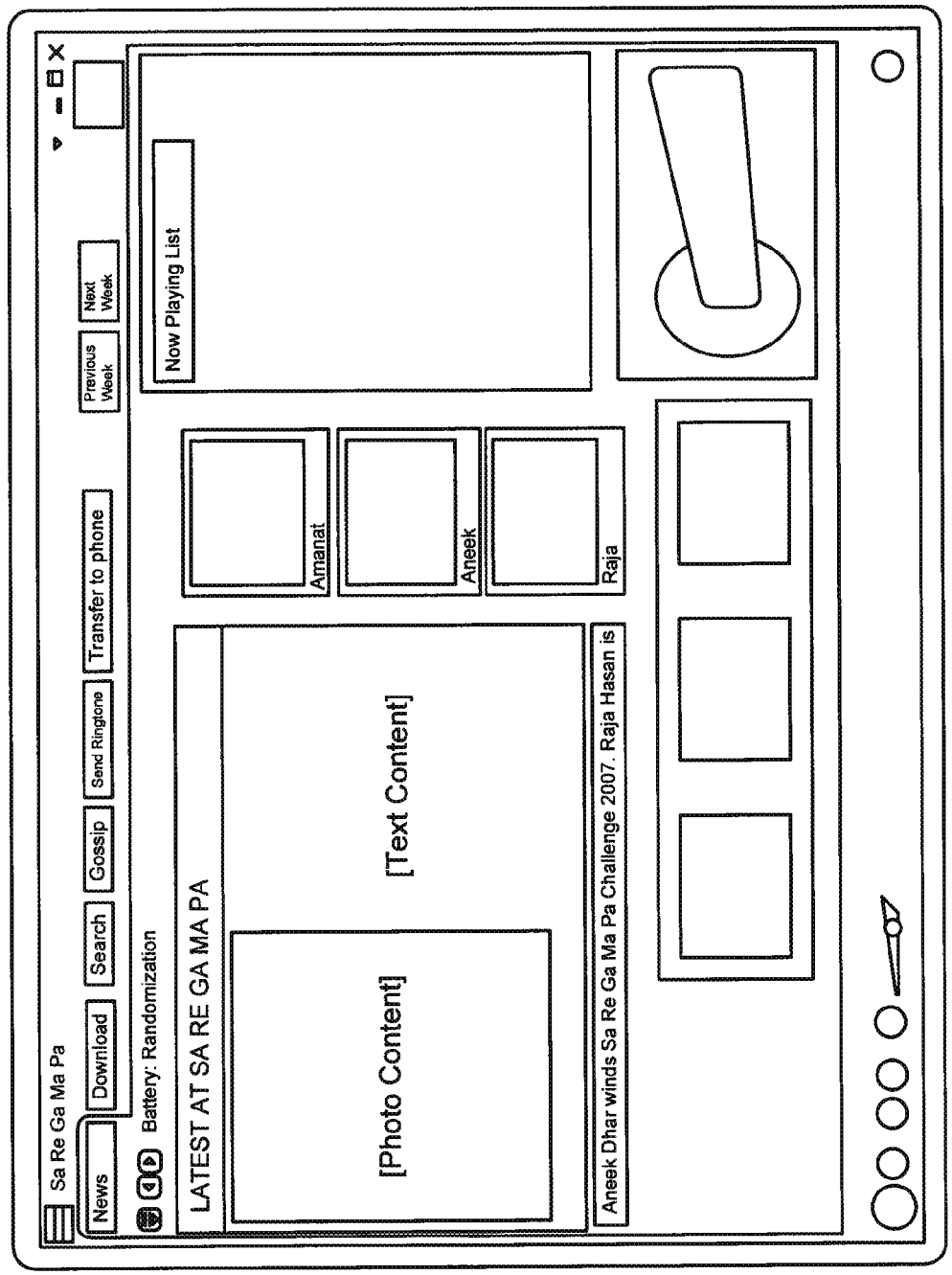
FIG. 2 shows an example of a user interface for a branded application associated with a particular television show, according to one embodiment.

FIG. 2 shows an example of a user interface 210 for a branded application associated with a particular television show (e.g., the "Sa Re Ga Ma Pa" application), according to one embodiment. For example, the application could be running on a user's PC, such as PC 114 in FIG. 1.

Content/Metadata Download

In one embodiment a PC application running on a PC, such as PC 114 of FIG. 1, has a user interface, such as user interface 210 of FIG. 2, and an RSS feed listener that provides a content download URL and metadata for the content. In one embodiment, the application periodically listens to the feed and automatically downloads content and metadata, e.g., from database 116 of FIG. 1. In some embodiments, the PC application could also include a button/menu item to perform such operations "on demand." This could be useful for consumers who do not have an "always on" Internet connection.

In some embodiments, the PC application might support some or all of the following:

(1) Automatically download news items and trivia related to a show in order to encourage users to use the system more.

(2) Support simple searches for content, e.g., using a basic search scheme (e.g., words, list of words, wildcards using '*', etc.)

(3) Support the transfer of content to a tethered device. Alternatively, or in addition, the user could directly mount the mobile phone as a USB mass storage device and just use the file explorer to copy files. A convenience provided by enabling transfer as a tethered device is that the content and metadata would be copied to the phone at the right location and with the right directory structure (e.g., the location and directory structure that the mobile application expects to see).

(4) Support sending ringtones to phone. In one embodiment, the application includes an interface for enabling the user to send a ringtone to the phone (possibly with some protection against automated bots). A user selects the phone type (e.g., brand/model), enters the phone number, and sends the ringtone with a personalized message. In one embodiment, a static ad text/graphic could also be inserted automatically by the backend.

Mobile Applications

In preferred embodiments, at least two categories of mobile applications are supported:

1) A limited feature-set application for tethered devices; and

2) A full-featured mobile application (e.g., an application that is equivalent in functionality to the PC application described above).

In some embodiments, the user interface of the mobile applications could be "deck"-based, with buttons at the bottom to navigate to menus and submenus.

Figure 3:
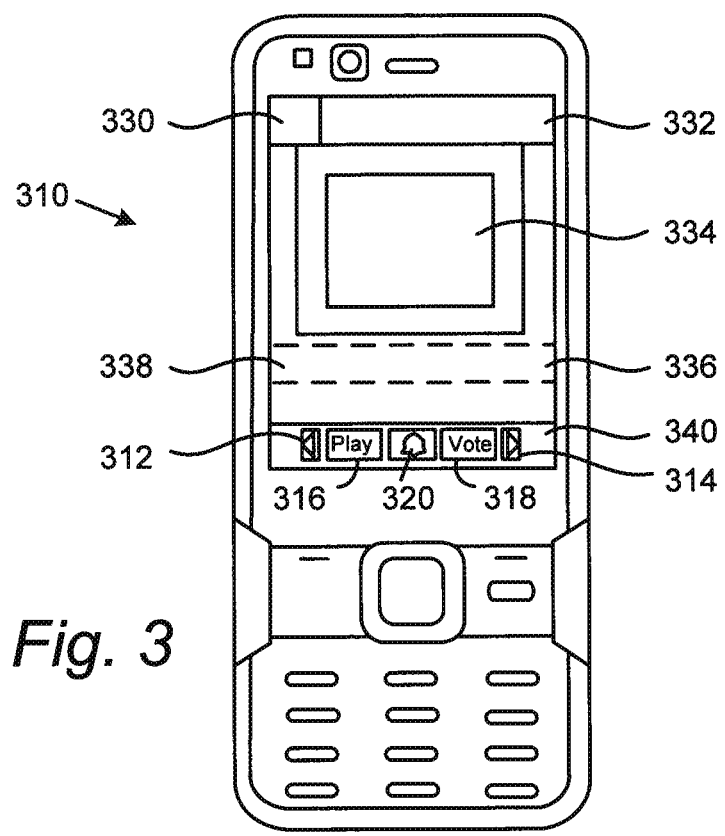
FIG. 3 shows an example of a deck-based mobile phone user interface.

FIG. 3 shows an example of a deck-based mobile phone user interface. As shown in FIG. 3, the interface on mobile phone 310 provides left and right arrow buttons 312 and 314, respectively, which are used to navigate between content items, the 'Play' button 316 and 'Vote' button 318 are self-explanatory, and the 'Bell' icon 320 is for setting a ringtone corresponding to the currently selected content item.

In one embodiment, the limited feature-set mobile application has the following special features: (1) a DRM engine pre-personalized and pre-registered to a given user; (2) an SMS adapter to upload metering data; and (3) a media player application to play plaintext content, and which is capable of parsing DCF/PDCF files, evaluating licenses, and supporting DRM functionality such as obligations and callbacks.

In one embodiment, the full-featured application has all the features of the limited feature-set application, plus a complete service orchestration stack such as that described in the '551 application (e.g., the NEMO stack), and the ability to participate fully as a client in a system such as the Marlin Broadband ecosystem.

Backend Infrastructure

In one embodiment, functions of the backend infrastructure 110 of FIG. 1 include feed generation, ad insertion, content packaging, an SMS gateway, metering and usage data upload, and data analysis and correlation.

Feed Generation.

Generates an RSS feed that clients will consume. In one embodiment, the feed may contain information to enable the clients to automatically download content.

Ad-Insertion.

In one embodiment, there are two points for ad-insertion: (1) insertion into the content (e.g., statically and/or dynamically); and (2) out-of-band delivery (e.g., via SMS). Examples of out-of-band delivery include delivery as part of a ringtone, and delivery as a regular advertisement.

Content Packaging.

In some embodiments, relatively simply licenses are used. In other embodiments, relatively rich licenses, such as those described in the '693 application and/or U.S. patent application Ser. No. 12/178,543, "Dynamic Media Zones Systems and Methods," filed Jul. 28, 2008 (Publication No. 2009/0031431 A1)(the contents of which are hereby incorporated by reference), can be used, e.g., to enable dynamic ad insertion. In one embodiment, DCF/PDCF can be used as the container format.

Metering/Usage Data Upload.

In one embodiment, SMS is used as the return channel (RC) for uploading usage data to the backend infrastructure. In some embodiments, data can be encoded and compressed for efficiency.

Data Analysis and Correlation.

The data that has been uploaded is extracted from the SMS Gateway, decompressed, decoded, and then loaded into a database for further analysis. Correlation of the uploaded data with other sources of data, such as, for example, demographic data, can be powerful. An example is provided below:

Analysis of Collected Metering/Usage Data.

Figure 4:
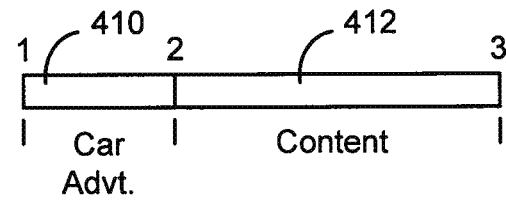
FIG. 4 shows an example of a piece of content and an associated advertisement.

FIG. 4 shows an example of a piece of content 412 and an associated advertisement 410 (e.g., an advertisement for an automobile). Assume, for the sake of illustration, that data analysis showed the following: (1) the user played the advertisement 410 multiple times; (2) the user rewound and played back some segments of the advertisement 410 multiple times; and (3) the user replayed the advertisement 410 a few days after initially viewing the content 412. In this example, the user's behavior indicates that the user found this advertisement interesting. The fact that the user came back to the content item and played the advertisement again probably implies that it was not a fleeting interest. The parts of the advertisement that were replayed probably indicate something of special interest. These types of analyses can help identify users that are interested in a particular product.

Correlation with Demographic and/or Other Data.

Correlating the above data with other data, such as demographic data or data previously collected about the user, could provide further validation of the metering data analysis. For example, if demographic data in the example discussed above showed the user to be someone from a middle income household with children—a household that does not own a car or owns one car—then it could be a strong indicator that the user is thinking of buying a car. A targeted advertisement by other means, such as a sales call, might produce a favorable outcome for the merchandiser in this case. Perhaps a car loan company might be interested in sending its advertisement material to the user. Or perhaps a car dealership might make an offer to trade-in the user's old car. The collected data, after analysis and correlation, can yield valuable information that could be sold to potential consumers of this information.

License Generation Tools.

In one embodiment, downloaded content is associated with a license, although the content itself may not be encrypted. In an embodiment in which licenses such as those described in the '693 application are used, the application evaluates the license in order to get the ESB containing metering obligations (if any). In one embodiment, a fixed license could be inserted that just has metering obligations. In other embodiments, more sophisticated controls could be used. A lot of information can be obtained purely through metering data, and sophisticated ad-support is an extra. For example timestamps in the metering data can be used to determine if the user watched an ad or not, how many times the user watched the content item, etc.

Tamper Resistance.

Since, in some embodiments, content will not be encrypted, there may not be a strong incentive to hack the system's software and/or hardware. As a result, sophisticated tamper resistance may not be necessary in some embodiments. In some embodiments, applying any suitable form of code obfuscation to the PC application (e.g. using Themida) and/or to the mobile application may be sufficient.

Ringtone Formats and Conversion.

The type of ringtone that a mobile phone requires (e.g., monophonic, polyphonic, or Truetone) typically depends on the mobile set hardware. The ringtone can be delivered to the phone either through the data cable (if the user has a PC), or, more commonly, via SMS. The SMS encoding formats for ringtones vary across phone manufacturers, and are known to those of skill in the art.

SMS Adapter.

The only return channel available on some mobile phones is the SMS channel. On mid-range phones (e.g., Java-enabled phones with a slow network connection) an SMS adapter could be provided to pull the metering data from the DRM client and upload it via SMS to the backend.

SMS Gateway Selection.

In a preferred embodiment, the SMS gateway application/service provider that is selected would be scalable to large SMS loads.

Charges for SMS.

In some situations, using SMS as a return channel has a cost associated with it (e.g., in some locations, incoming SMS is free, whereas outgoing calls carry a charge). Therefore, in these situations, it may be better to upload data less frequently, or via a different mechanism.

Advertisement Allocation

In some embodiments, an auction-based mechanism can be used to fill ad-slots. In one embodiment, the ad-slots are sold via a Dutch auction. An auction-based mechanism enables a service to get a better price for advertisement real estate, which could otherwise be hard to price in new and emerging advertisement delivery channels, such as mobile advertising, or for advertisements associated with new content channels in established delivery channels, for which pricing models are not well-developed. In preferred embodiments, the system would also make use of standby/backup advertisements. Standby advertisements are advertisements for which the ad-slots are sold at a deep discount, but which only get to run on a contingency basis if any ad-slots are otherwise unfulfilled via the primary allocation mechanism(s).

Constraints for ad-slot allocation include targeting constraints and adjacency constraints. Adjacency constraints may be broken down into (a) distance constraints (e.g. the maximum or minimum allowable distance between advertisements), and (b) mutual exclusion constraints (e.g. advertisements of a particular type, or for a particular product, manufacturer, or advertiser may not appear with another advertisement of a particular type, product, manufacturer, or advertiser).

According to some embodiments, a simple tagging mechanism allows simple wildcards to be used to specify mutual exclusion constraints. Mutual exclusion constraints are a type of constraint which an advertiser may wish to use to exclude advertisements for competing products when its advertisement is being shown. For example, a soft drink manufacturer may want to exclude banner ads for its competitors' products while an advertisement for its soft drink is being played.

The advertisement allocation problem can be modelled using a mathematical programming language such as AMPL in terms of an objective function (e.g., revenue generated) and several constraints. The advertisement allocation problem is typically a non-linear discrete optimization problem which does not currently have good numerical methods to solve it. The non-linear discrete optimization problem can be broken down into a series of linear discrete optimization problems by converting some variables into parameters and solving the problem for a range of values of these parameters. A linear discrete optimization problem can be solved using standard algorithms such as those from the branch-and-cut and branch-and-bound categories of algorithms. Finally the local maxima for each sub-problem can be compared to arrive at a global maximum for the objective function.

Backend For Advertisement-Supported Content Delivery Platform.

According to some embodiments, systems and methods described herein are used in a backend system for an advertisement-supported content delivery platform. In certain embodiments, some or all of the following functionality can be supported: (1) content upload; (2) content packaging; (3) advertisement upload; (4) advertiser registration; (5) purchase order placement for ad-units (e.g., ad-slots); (6) order fulfillment (e.g., including reservation of ad slots for an advertiser and assigning an individual advertisement to a particular slot); (7) RSS feed generation; (8) promotions and coupon management; (9) survey-based advertisements; and/or (10) report generation.

Embodiments of the systems and methods described herein can be used to provide the infrastructure for managing the placement of advertisements, performing audience measurements, and targeting advertisements.

In the discussion below, the following terms will generally have the following meanings:

| | |
|---|---|
| Ad-magazine | A collection of ads tied to a content item |
| Ad-unit (bullet) | A slot representing a fractional rental of ad-placement real-estate (e.g. ⅕ of the banner real estate for any single content item for a week) |
| MAP | Minimum Ad-unit Price |
| RP | Retail Price (price for outright purchase) |
| CPM | Click Per Mille (cost of ad for 1000 views) |
| CTR | Click Through Rate |

Embodiments of the systems and methods described herein aim to develop an advertisement-supported content delivery system for mobile users, and can be used to deal with ephemeral content, such as that produced by popular network shows (e.g., singing competitions, dancing competitions, quiz shows, reality TV show competitions, etc.).

Because of the time-dependent nature of these shows there is a significant "flash crowd problem" with the viewership. The traditional models for advertisements, such as CPM or CTR, tend to break down for these types of events. The bursty nature of the audience responses (such as votes sent in by fans) has a substantial impact, and needs to be addressed by the architecture of the system in order to handle the bursty loads.

There is tremendous viewer interest in these shows and because of the phenomenal growth in the number of mobile phone users, the patterns of consumption of the content are changing dramatically. This shift in consumer behavior poses many challenges, and provides a unique opportunity for content delivery, audience measurement, and targeted advertisement. Embodiments of the systems and methods described herein try to address these current and evolving needs of consumers.

Advertisements.

Referring again to FIG. 3, the screen layout of an illustrative client application is shown. The button bar 340 at the bottom has buttons for navigating through content and (left and right buttons 312 and 314, respectively) and a vote button 318 that is used for voting on the content display screen or for recording user-clicks (e.g., as described below in the discussion of survey-based ads). Also included in the illustrative embodiment shown in FIG. 3 are a logo icon 330, ticker ad field 332, video/content icon 334, information ticker 336, and animated GIF ad-banner 338.

In some embodiments, the client can be capable of showing the following types of marketing messages: (1) text-based ads; (2) graphical, animated GIF banner ads; (3) survey-based ads; (4) market-research surveys; (5) location-sensitive ads; and (6) OOB (sent via SMS) advertisements.

Text Based Ads.

Examples include simple, textual tickers, such as a top ticker. Top tickers are an example of an animated ticker, which are generally more effective than plain, static textual ads.

Graphical, Animated GIF Banner-Ads.

These are analogous to the familiar Internet banner ads.

Survey-Based Ads.

These are ads placed occasionally between content items (e.g., these can be shown when the user presses the Next Button 314 to go to the next content item). Since a survey question could be annoying, in a preferred embodiment, they should not be used very frequently. Also, in one embodiment, the user will have a choice to not respond to the survey question by not pressing the middle button and pressing "Next" to go to the next content item instead. Survey-based ads can be useful because they provide a means to realize higher value Click-Through (CT) advertisements.

Survey ads could contain items that ask questions such as: (1) a question about the visual ad in the previous content item (e.g. "Would you be interested in learning more about product X?"); (2) "Rate the product in the previous ad on a scale of 1-5" (radio button selection followed by middle button click); or (3) "Do you like product X? Yes/No". The survey screens could also be independent of the previous screen and be pure market research surveys.

Location-Sensitive Ads.

A location-sensitive ad may be delivered to the user based on where he is located at that point in time. For example: ads for a nearby store, coupons for a nearby restaurant containing a promotion code, and/or the like. These context-sensitive ads could be user-configurable (e.g., users may indicate a preference to opt-in or out when they register, or as part of ongoing account management).

Ad Delivery/Download.

In some embodiments, advertisements will be delivered along with the content. The tethered model is probably the most practical model for content and advertisement delivery today, as wireless network Internet speeds are relatively slow. This is especially true in some markets (e.g., India) where the 3G spectrum has not yet been opened. Also, wireless Internet access is typically relatively expensive and some users do not have it as part of their mobile phone plan. For this reason the following may be useful: (1) Internet Cafés where users can download music and/or other content; and (2) special mobile phone kiosks to sync content (e.g., mobile phone charging stations in locations such as bus stations, commuter train stations, and airports). Kiosks could be set up at these locations to enable users to download content to their mobile phones. Kiosks could also be placed at strategic locations in major cities through independent operators (e.g., coffee shops, outside college campuses, STD-ISD Centers (i.e. manned telephone booths), etc.).

Viral Application Distribution.

To facilitate wide distribution of the mobile phone application, viral distribution can be encouraged, for example, as follows: (1) a user presses a 'send' button while he is running the application; (2) the user is shown a text box to enter his friend's mobile phone number at the bottom of the screen; (3) the user enters the number and presses OK; (4) the application sends an SMS to the backend with the friend's number; (5) the backend composes an SMS containing a link to download the application and sends it to the friend; (5) the friend clicks on the link to download and install the application; and (6) the downloaded application could contain "teaser" content and ads (e.g., very small clips of content and ads) so that the user will get a flavor of what the application does, and a request to sync the phone with the latest content, e.g., over the network or at the nearest Internet café or kiosk.

In one embodiment, the backend will track the forwarding requests for the application, thereby learning information regarding relationships between users, which it can store in its database. This information can, for example, be used for friends-and-family targeting (described in more detail below).

Ad Placement.

In preferred embodiments, the mobile application has real-estate for showing ads—real estate that will be wasted if an advertiser is not lined-up. Measurement and ad-targeting are value-added services that can be used to obtain better rates for ads.

Today, due to the bursty nature of dialing, a significant fraction of SMS messages are lost. If these messages could be delivered, it would be valuable to the carrier. In one embodiment, requests could be timestamped, and store-and-forward could be used to defer sending a message if the network was busy.

Ad Pricing

Minimum Ad-Unit Price (MAP).

In one embodiment, the system attempts to ensure that ad real-estate is not wasted (i.e., that there is someone lined up to place an ad in a given slot). The system enables this by having a minimum price for a single ad-unit. The operator of the system approaches potential advertisers and asks them to be on the contingency list. An advertiser can be on the list if he commits to purchase X amount of ad-units for a discounted price. The advertisers' ad will be placed only if there is a spot available. The minimum price could be based on the market price of similar services, with a discount applied to the price. In some embodiments, a certain fraction of the ad-units could be reserved for free public service announcements.

Retail Price (RP).

This is the regular list price that a customer pays if he wishes to buy the spot outright. The retail price could be a fixed price that is set for an ad-unit. The actual sales price could be more or less than the retail price depending on factors such as demand for the ad-unit, promotions and discounts, price reductions (e.g., for public service advertisements), etc.

Dutch Auction.

In one embodiment, if any ad-units are unsold at a predefined time before a certain event (e.g., two weeks before the airing of a popular television show), these ad units could be sold by Dutch auction. In one embodiment, the initial price range could be RP—MAP. Bids are accepted until all unsold ad-units get sold. In one embodiment, everyone pays the lowest bidder's price (the lowest bid that won). If an ad-unit is in high demand, the actual sales price could go above the retail price.

Targeted Ads.

In one embodiment, targeted ads (e.g., ads targeted to a particular demographic) have a higher buy-it-now price. If they are purchased, they get removed from the ones to be subsequently sold—the rest are auctioned off or sold at the minimum price.

Demographic Targeting.

In one embodiment, the system will enable advertisers to target audiences by demographic groups (e.g., young professionals; families without children; working adults ages 40-60; adults older than 60, etc.)

Geographic Targeting.

In one embodiment, the system will enable advertisers to target audiences by geographic zones (e.g., the West Coast, the Northwest, the Midwest, the South, the East Coast, the Northeast, the Southeast, etc.).

Local Targeting.

Local Targeting could be done as follows: (1) the mobile phone application records the user's location periodically; (2) the mobile phone application sends this information to the backend (e.g., when it uploads usage data); (3) when the back-end receives the data containing the area in which the user travels, it will use ads from the local targeting pool and send them to the user the next time the user does a sync; (4) when the user comes within x miles of a location, it will pop-up the corresponding local advertisement (e.g., an ad for a pizzeria, with the coupon in it; in one embodiment, a one-line message saying that a coupon is available for the local eatery will be shown; the popup is preferably relatively unobtrusive); (5) the user will have the choice to click on the advertisement (e.g., if the user clicks on a coupon, the application will record the click, and this information could be used to bill the advertiser); (6) if the user ignores the pop-up ad it will go away (timeout) in some suitably define timeframe (e.g., after 20 seconds).

To address subscriber concerns that collected data will be shared with third parties, in some embodiments, the service could provide a guarantee in the privacy policy that, except as required by law, the service will not disclose identifiable user information to third parties.

Friends-and-Family Targeting.

In some embodiments, advertisers can be given the option for "demographic+" targeting, which targets a particular demographic, and also, e.g., the friends of people in that demographic (e.g., to two degrees of separation, or any other suitable number of degrees).

Usage Measurement

In preferred embodiments, usage data is collected by the mobile phone client application regarding some or all of the following: (1) how many times a content item was viewed (e.g., can be used to infer number of ad views for banner, text ads, video ads, etc.); (2) user clicks on local ads, survey ads, etc.; (3) user location data; (4) ad viewing data regarding dynamically inserted ads.

Content Identification

Watermarking.

In some embodiments, a content watermarking scheme can be used to identify content. For example, the watermark could be 32 bit wide, with 8 bits reserved for a content version and 24 bits reserved for an ID. The watermark is preferably computationally easy to read using the mobile client application, yet hidden and difficult for the user to remove and/or change.

Content ID.

GIF banner ads and textual ticker data can be packaged with their associated content, as they are typically fairly small (e.g., 5-6 kilobytes for an animated GIF banner). For example, if an MPEG-4 based format such as 3 gp is used, simple ads could be put into the udta atom. This would make it easier to deliver and manage ads and make it slightly harder for users to remove the ads. The udta atom could have a byte to indicate the first ad to display and a counter (updateable by the player) to indicate the next ad to display.

In one embodiment, different versions of the same content are created to have different starting ad numbers. This is done to ensure fair treatment of all banner/text ads.

According to some embodiments, video ads are also a part of the content, although in some embodiments the size of the ad should be relatively small as the ads will be repeated in some content items. In one embodiment, one video ad would be static encoded into the video track, while any others would be included in a separate top level atom.

Counting Rotating Ads.

In one embodiment, ads are rotated (e.g., a different ad is shown when user changes the page, or a different ad is shown based on a timer). The mobile phone application counts the number of times the user sees the content item and reports this information to the backend. The backend can then use the content version and the counter to deduce how many times each ad was shown.

System Architecture

User Management.

In one embodiment, a system is provided that supports three tiers of membership: (1) anonymous users, (2) signed-up users, and (3) paying subscribers.

Anonymous Users.

When a user downloads content from an Internet café or kiosk, he or she has the choice to either: (1) use a user name and password if he or she has signed up; or (2) use a fixed user name and password (e.g., a separate one could be created for each café location). This makes it easy for people to download content without signing up (e.g., if someone does not want to go through the hassle of signing up). In one embodiment, anonymous users do not get some extras that signed up users get, but are able to download content and ads. In another embodiment, measurements are made for all users—anonymous or signed up—and sent via SMS to the backend. For example, the user's number (e.g., TON, NPI, and number tuple) could be used to identify the user.

Signed-Up Users.

In one embodiment, users will be able to sign up for the service, e.g., with an email and mobile phone number. This could, for example, be done as follows: (1) the user enters details (e.g., first name, last name, email address, location, sex, age, marital status, number of children, mobile phone number, and/or the like). The user name could be the mobile phone number and a separate password could be created for each mobile phone number; (2) the user gets an email confirmation containing a link, which he or she clicks on to confirm the email address, which results in SMS being sent to his mobile phone; and (3) the user asks the SMS message to complete the registration. In some embodiments, limits could be place on signing up (e.g., a maximum of 10 mobile phones could be registered with a given email address each day (e.g., to prevent bot attacks)). According to one embodiment, signed up users get some extras such as the ability to send ringtones from a show to their mobile phone, or the ability to receive behind-the-scenes information, trivia, bloopers, etc.

Paying Subscribers.

According to some embodiments, some subscribers pay for premium content. In this case, a DRM-protected PC client may also be used.

Ad-Space Sales

In one embodiment, the system provides a mechanism to enter bids for ad-spaces (e.g., untargeted ads, in one embodiment). In one embodiment, the system picks the top bids, informs bidders if they won or lost, and publishes the price (open for all to see).

Ad-Selection

Untargeted Ads.

In one embodiment, once winning bids are selected, those ads, along with any additional ads sold for the minimum price, will be put into pools (e.g., one ad each for text, banner and video). In one embodiment, ads will be randomly selected and placed into ad-magazines (e.g., one per content item). A selected ad will be removed from the pool. This process is continued until all ads are assigned to magazines.

Targeted Ads.

In one embodiment, for targeted ads (e.g., ads that target a particular group of users), if the ad space is partially sold, the rest of the ads will be scheduled using the bid-price to order the ads in priority order. In one embodiment, the remaining spaces to be filled for targeted users equals the total (for the target group), minus ads sold, minus public service ads. These will be filled with ads using bid-price to prioritize the ads (minimum price ads come last).

Content Packaging.

In one embodiment, once an ad magazine is associated with a content item, different versions of the content will be packaged with different starting numbers for the text, banner, and video ads. Targeted users form a different class for the content and ads.

Ad and Content Delivery.

In one embodiment, the different versions of each content item will be served out in a round-robin fashion to distribute the ads evenly.

System Design

In preferred embodiments, the backend seeks to ensure maximum use of the real estate available for ad-placement. A benefit of certain embodiments of the systems and methods described herein is the information about content consumption and ad-viewership that can be collected from users. This data is valuable by itself, and can also be used to develop inferences about user behavior and preferences over a period of time. These inferences could then be used to better tune or target advertisements.

In some embodiments, some or all of the following design considerations may be applicable:

1. Operators are the Primary Users of the Backend.

Some parts of the system could be exposed to external parties (e.g. content management functionality could be exposed to content providers and advertisement management and placement functionality could be exposed to advertisers). However external parties probably cannot be assumed to learn how to use the system as the system is only one of the many channels through which their content and/or ads get distributed. These external parties would typically be expected to contact the service through traditional means. For example: (1) content providers would typically expect a simple FTP drop for content in a common format (possibly full screen resolution) as well as metadata. The service would be expected to take this content and format it and any metadata to make it suitable for the mobile platforms; (2) advertisers would typically send a purchase order for ad-space by phone or by fax; and (3) operators or some other types of users will typically want to be able to check each content item and advertisement manually to ensure there is editorial control over the content and advertisements.

2. Ad-Viewership is Closer to the Television Model than the Internet Model:

Preferred embodiments of the systems and methods described herein deal with ephemeral, time-sensitive content, such as that related to a television game show. User interest in this type of content is high around the time the show airs, but drops off almost completely some time after the show. The content itself is not very valuable after the event. The user interest and the corresponding ad-viewership for this type of content on the mobile application is expected to closely follow the television audience. In contrast, Internet ad-viewing for a well-known web-site happens more or less at an even rate. Internet advertisements can follow the cost-per-impressions model. In the case of television, the ad-space is sold as a whole without directly counting the number of impressions. The ratings system for television from Nielsen is an indirect measurement of audience which is used by advertisers to determine the price of an ad slot.

3. Content Items May not be Available at Ad-Sales Time:

Content for some shows is taped very close to the date of airing of the show. Advertisers do not know in advance what the exact content is going to be. They only know the genre of the show and the type of content aired in the past.

4. Advertisements May not be Available at Ad-Sales Time:

Advertisers would typically upload/submit the advertisement once they get confirmed ad-space. Advertisers could also choose to have a set of stock advertisements uploaded to the system for use in various content feeds.

5. Constraints for Ad-Spaces are Available at the Time an Ad-Space Order is Booked:

Although advertisements may be submitted much later, in one embodiment, any constraints that the advertiser needs to put on ad-placement generally need to be made available at the time of ad-space booking.

6. The Backend is a Back-Office System:

The backend system is used to record orders for ad-space and to process them. The end-result of the order processing is a set of RSS feeds and packaged content and advertisements that these feeds refer to. Once the feeds, packaged content, and advertisements are generated, these could be hosted at a data center on HTTP servers, or distributed to edge servers. Download statistics from the data center will be periodically brought back and uploaded into the backend system for analysis and reports.

System Users.

System users will typically include the following: (1) operators—feed content and advertisements into the system; (2) system administrators—configure and maintain servers; advertisers—typically don't have access to the system; typically place purchase orders for ad-slots via telephone or fax (alternatively, in some embodiments, some of the system interfaces could be exposed for use by these remote users); (3) content providers—typically content providers require a very simple interface for submitting content (e.g. an ftp mechanism to upload content). The system operators take this uploaded content and, after proper checks, use the system to package the content; and (4) end-users (e.g., consumers of the content)—typically download the content and RSS feeds from the public Internet infrastructure.

Figure 5:
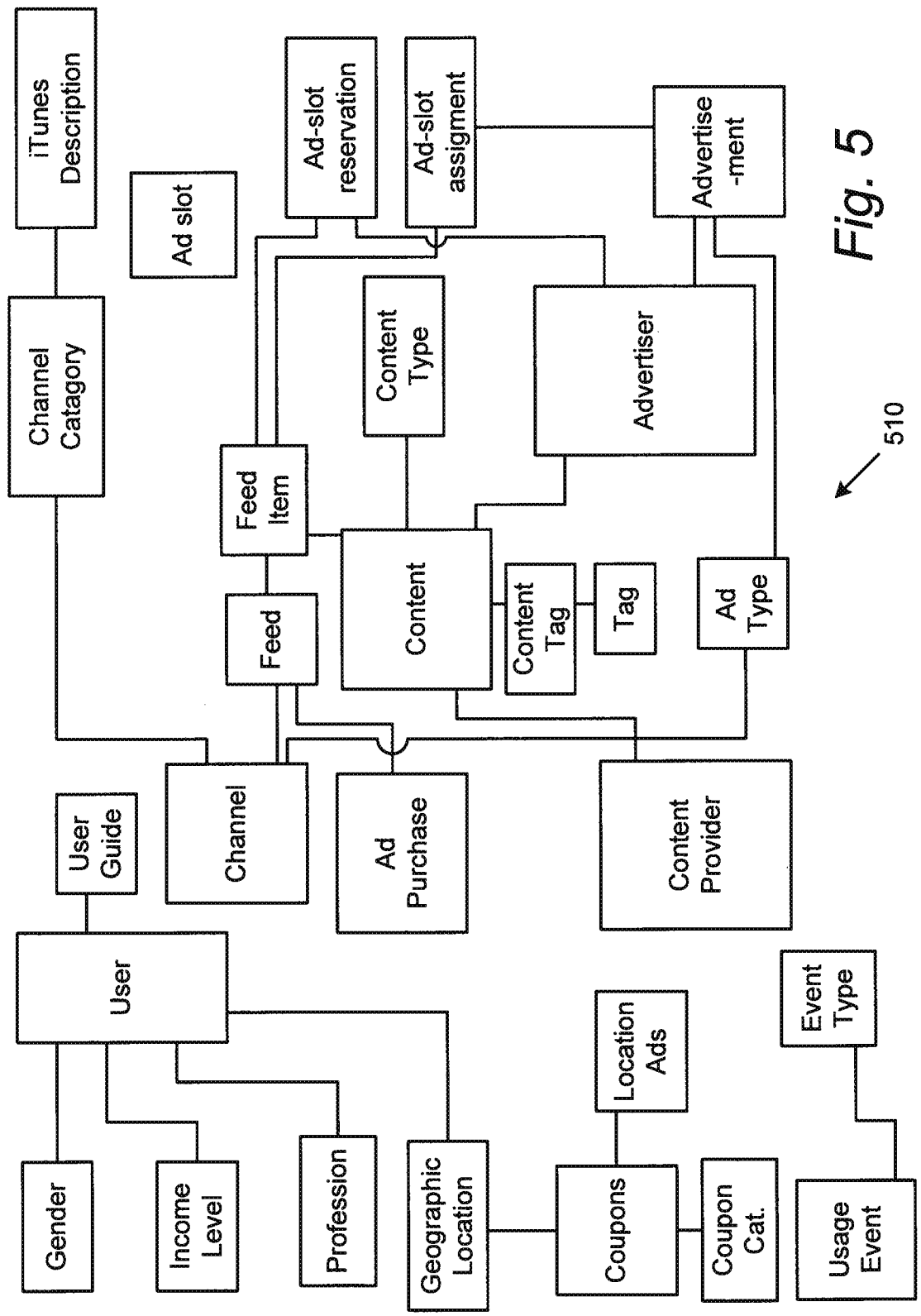
FIG. 5 shows major entities and their relationship in an illustrative database schema, according to some embodiments.

FIG. 5 shows entities and their relationships in an illustrative database schema in accordance with some embodiments. The major entities in the system are as follows: (1) users (e.g., consumers/end users); (2) content (including content, tags and content type, channels, channel categories, feeds, and content providers); (3) advertisers (e.g., including advertisers and ad-purchase orders); (4) order fulfillment entities (e.g., including advertisements, ad-spot reservations and ad-assignment; (5) group and location ads; and (6) raw statistical data.

The discussion below focuses on each of the major entities in the system and provides details about their relationship to one another, and use cases that affect these entities.

Users

Figure 6:
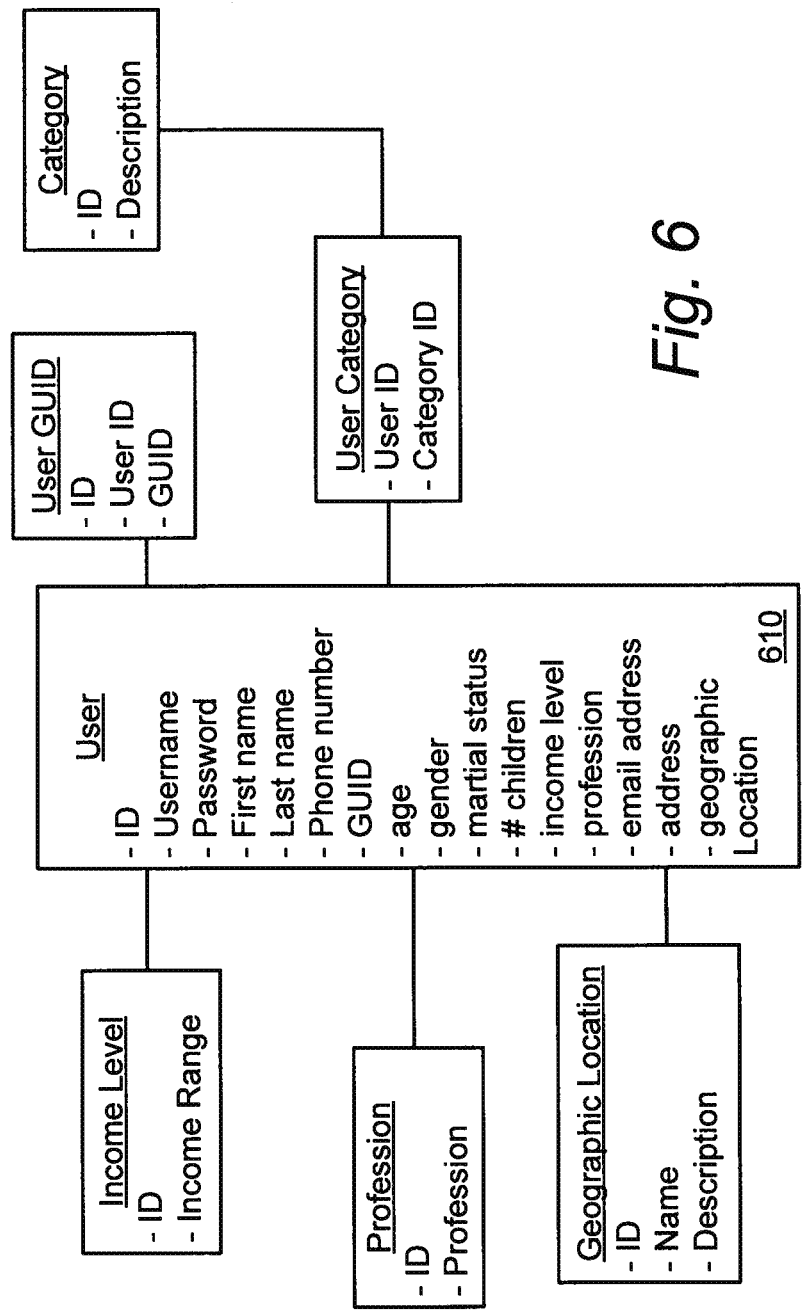
FIG. 6 shows a 'user' entity and related entities, according to some embodiments.

FIG. 6 shows the 'user' and related information, according to some embodiments. In one embodiment, a user entity is tracked by the following attributes:

username
password
first name
last name
phone number
GUID

The user may optionally provide extra demographic and geographic information (e.g., via a form that is filled-in at sign-up), such as:

age
gender
marital status
number of children
income level—range of family income
profession
email
postal address
geographic location—this could be inferred from the address, however, a geographic location refers to the region-category of the address.

For anonymous users of the system many of the optional tracking attributes may not be available initially. However this information could get filled in over time (e.g., via information collected through surveys) or through other channels (e.g., external sources of demographic data such as operator provided customer data containing demographic information).

Tracking Users.

In one embodiment, users can get recorded into the system in at least two ways: (1) signed-up users—in this use case the users enter all or some of their details in a form and submit the form when signing up; and (2) anonymous users—these are users who either directly download the mobile client or get the client when a friend forwards the application to them. They then go to an Internet café and "anonymously" sync up their mobile phones with the content. The PC application generates a GUID and places it on the mobile phone. Subsequently, the phone sends a "Call-Home Message" to the backend which associates the GUID with the mobile phone number Updating Users.

In one embodiment, operators are able to update user data (e.g., for managing lost/stolen passwords, and/or otherwise updating user records).

Importing Demographic Data.

In one embodiment, demographic data (if made available from external sources) is formatted and entered into the system, e.g., through database update scripts.

Dynamic Categories.

In one embodiment, user behavior and preference data is continuously collected and analyzed. Over a period of time this data can help in categorizing the users into dynamically defined categories. These categories can be used to target advertisements more effectively. Some examples of dynamic categories are frequent consumers of sports content, frequent responders to surveys, frequent consumers of promotions/coupons, frequent buyers of items, and/or the like.

In one embodiment, users can be classified as belonging to these dynamic categories based on inferences from analyzed data. The categories themselves can be dynamic, and could be added, modified, and/or deleted dynamically. There is a certain amount of fine-tuning that gets done as the system collects data, which is analogous to setting up a store and coming to know your customers really well over time. When you know the customers, the store can recommend or target the customers with products they think the customer might like.

Content

Content, Tags, and Content Type.

Figure 7:
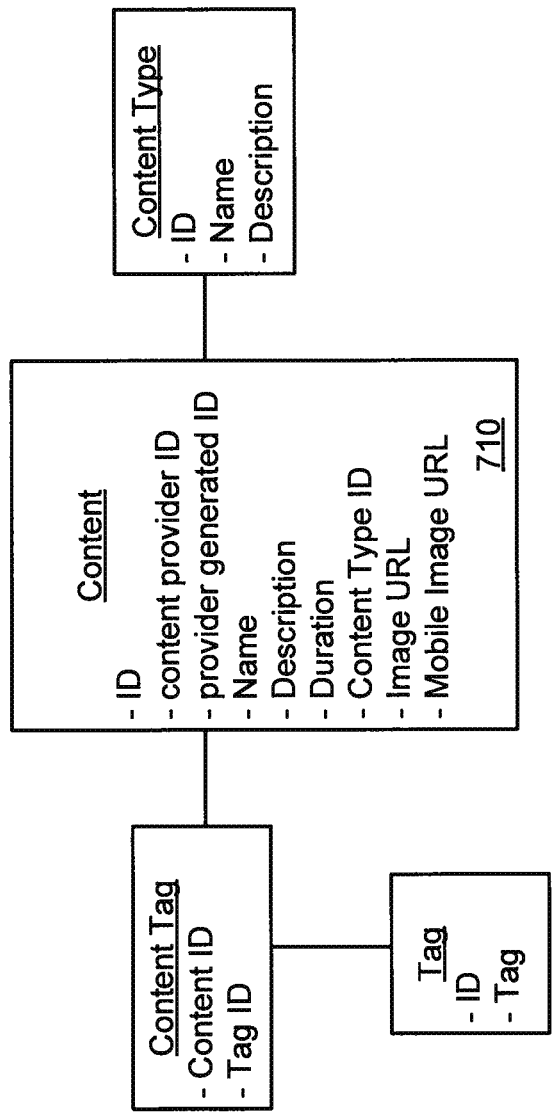
FIG. 7 shows a 'content' entity, which represents content items, and related entities, according to some embodiments.

FIG. 7 shows the 'content' entity, which represents content items and related items, according to some embodiments. In one embodiment, a content item is associated with 0 to N tags that can be used to search the content item. A content item is of a particular mime-type (e.g. audio/Mp3, video/3 gp, etc). In one embodiment, a content item may have the following attributes:

id—unique id
a content_provider_id—id of the content provider that submitted this content
provider_generated_id—id used by the provider to identify this content item
name—user friendly name for the content item
description—verbose description
duration
content type
image_url—artwork for content item
mobile_image_url—artwork created for the mobile phone platform In one embodiment, backend operators will test/verify and enter/update the content item data at content intake time (e.g., adding content uploaded by the content provider, e.g., to an ftp site). The operator may also organize the content into channels, feeds, etc. as described in more detail below.

Channels, Feeds, Items, and Categories.

Figure 8:
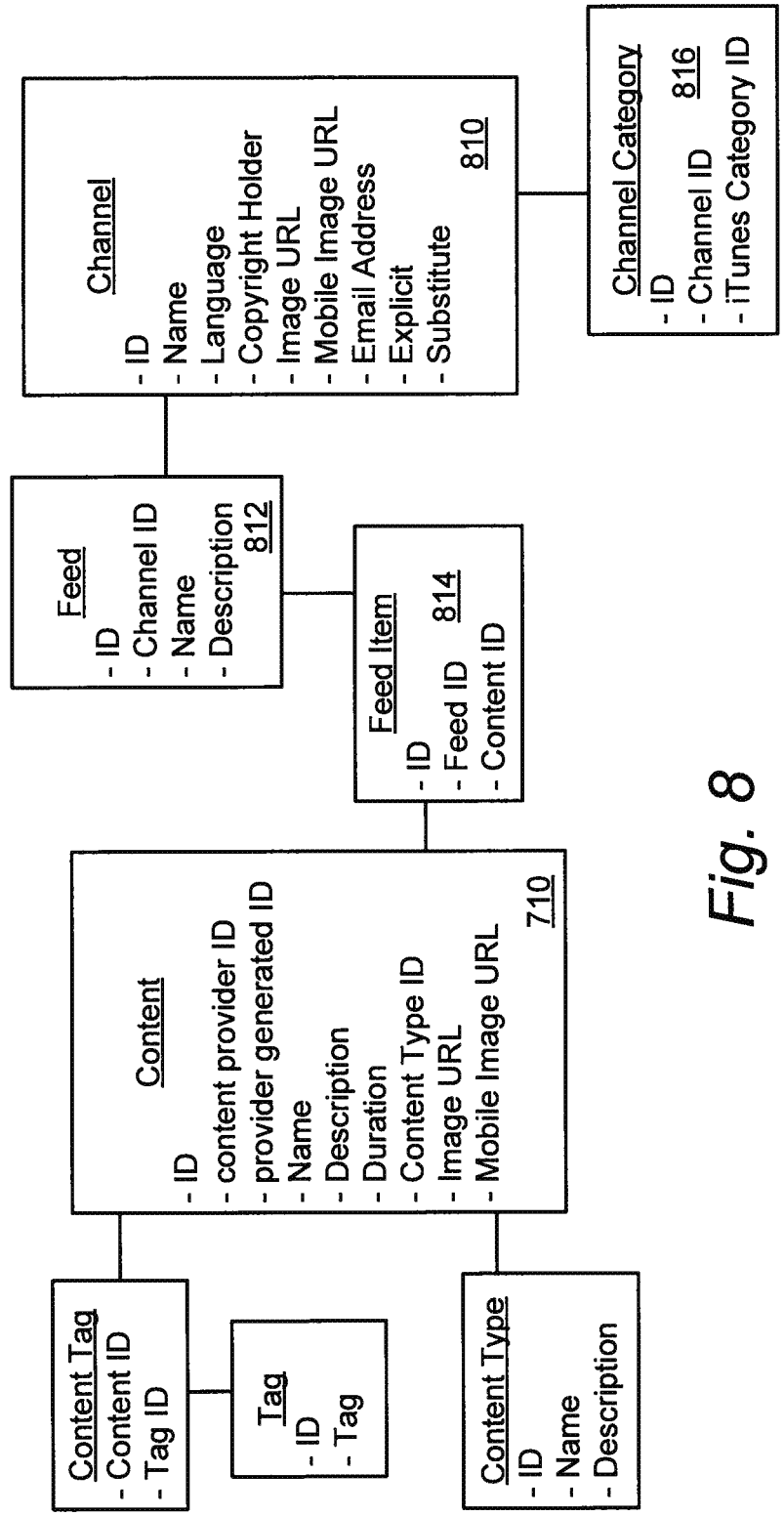
FIG. 8 shows entities used in content organization, according to some embodiments.

FIG. 8 shows entities used for content organization, according to some embodiments. In the example shown in FIG. 8, the entities are: channels 810, feeds 812, feed items 814, and channel categories 816. In one embodiment, a content item may appear in zero or more feeds, and a channel may have zero or more feeds associated with it (e.g., the channel could be 'Dance Contest' and feeds associated with the channel could be 'Week1', 'Week2', 'WeekN', etc.). In one embodiment, a channel can belong to zero or more channel categories, and channel categories are used to search for channels using the PC application.

Advertisers

Advertisers, Advertisements, and Purchase Order.

Figure 9:
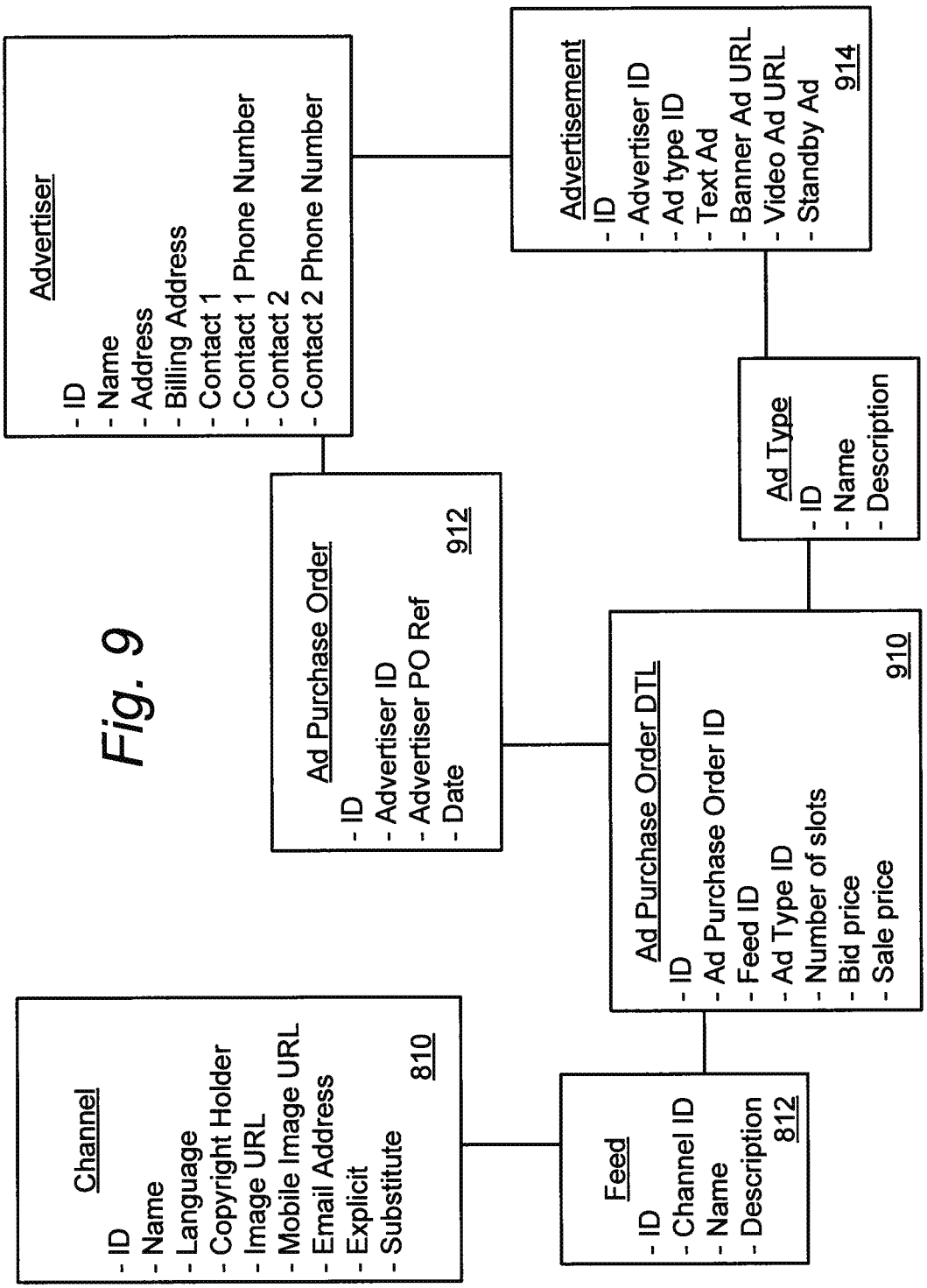
FIG. 9 shows the entities 'advertiser', 'advertisement' and 'purchase order', according to some embodiments.

FIG. 9 shows the entities 'advertiser', 'advertisement' and 'purchase order' in context, according to some embodiments. In the example shown in FIG. 9, the 'purchase order' is associated with the advertiser, even though it is typically the operator who will enter it (e.g., as a sales order for the system). In other embodiments, other relationships between the entities shown in FIGS. 5-12 could be used.

In some embodiments, information regarding an advertiser is typically entered into the system by an operator. In some embodiments, an interface could be exposed for remote advertisers to register themselves into the system. An advertiser can place a purchase order for N ad-slots (various types) for a particular feed. Note that the actual content item is usually not known when the advertiser places the order for ad-slots (e.g., ads-slots are often sold in advance of the taping of a show). The advertiser usually decides to advertise on a particular channel based on the popularity, ratings, or general type of content served by that channel. In one embodiment, the sale price for ad-slots is initially set to NULL, and gets filled in when order fulfillment occurs.

Referring to FIG. 9, in one embodiment advertisers have the following attributes: (1) ID (e.g., a unique ID); (2) name; (3) address; (4) billing address; and/or (5) contact information for one or more contacts. The advertisement entity represents different types of ads (e.g., with some de-normalization, for efficiency). Advertisements are typically uploaded after the sales and reservation step of order fulfillment has occurred (e.g., if an advertisement is specially made for a specific show/event); however, an advertiser may choose to upload stock advertisements in advance. Thus, in one embodiment, the process of uploading advertisements can be delinked from the order placement and reservation step during order fulfillment. The advertisements entered are an input to the ad-assignment step of the order fulfillment process. The ad-assignment step thus uses the existing inventory of advertisements for each advertiser.

In one embodiment, advertisement 914 has the following attributes: (1) ID (e.g., a unique ID); (2) advertiser_id—id of the advertiser that submitted this advertisement; (3) ad_type_id—type of ad (e.g., text, video, video+survey, banner, pure survey, etc.); (4) ad details—(e.g., text, banner file URL, or video ad file URL); and (5) information regarding whether the ad is a standby ad (e.g., an ad that gets placed if there is space available).

Order Fulfillment Entities

Ad-Reservation and Ad-Allocation (Assignment).

Figure 10:
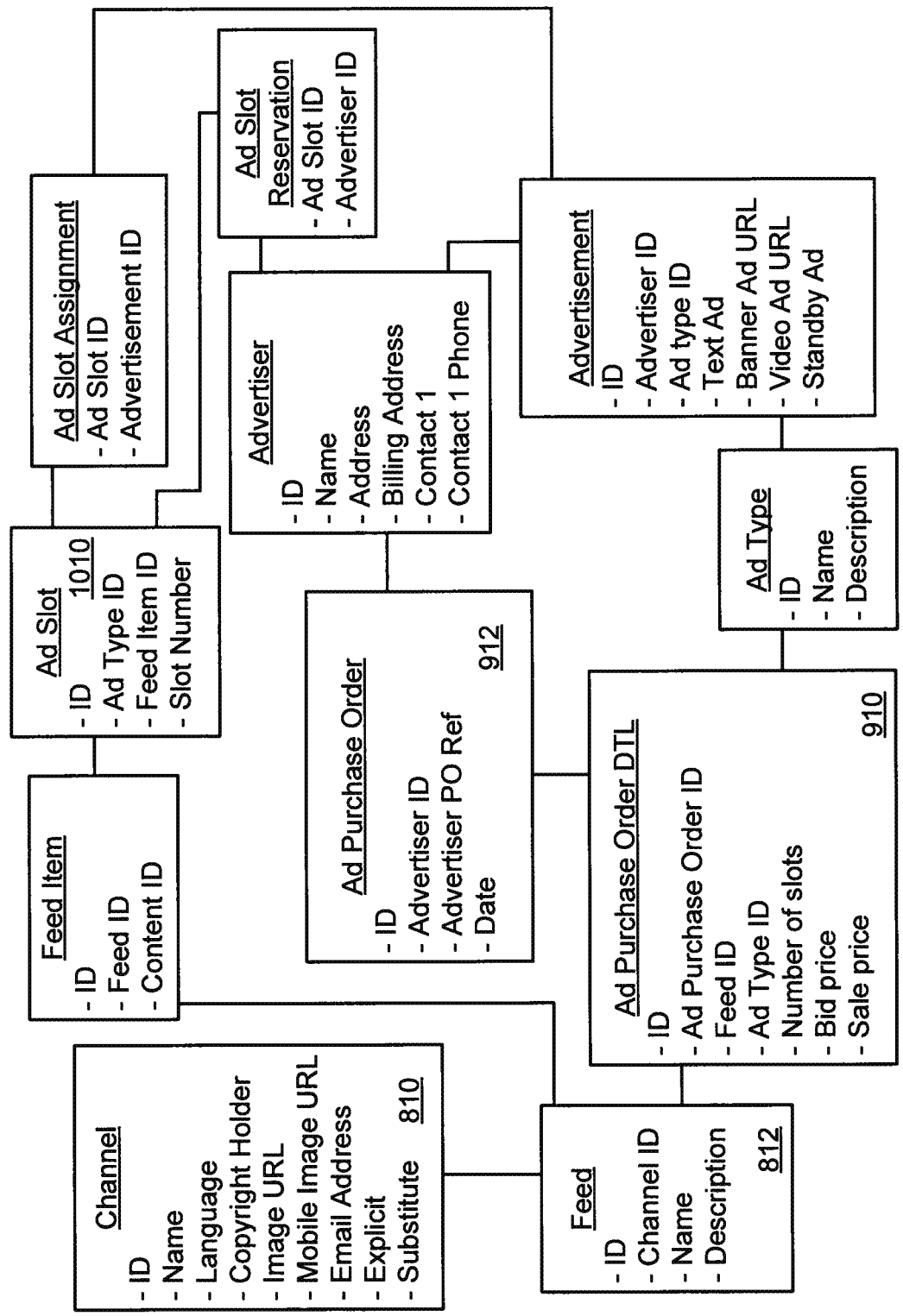
FIG. 10 shows the entities involved in order fulfillment in some embodiments.

FIG. 10 shows the entities involved in order fulfillment in one embodiment. Each feed-item is associated with a fixed number (e.g., up to 5) ad-slots 1010 which comprise the ad-magazine for the feed-item of a particular type of ad. For example, feed-item 'Artist XYZ, Song #2' may be associated with one text ad magazine, one banner ad magazine, and one video ad magazine. In this example embodiment, each ad magazine would have five slots for five ads. The ad-slot represents a unit of the advertisement real estate for each feed-item. Ads in each ad-magazine are rotated, and the first ad is rotated in a round-robin fashion in the feeds in order to avoid favoring any particular ad in the ad-magazine. Ad-slots get filled with advertisements via the order fulfillment process. In one embodiment, order fulfillment takes place in two steps: (1) reservation—reservation of ad-slot(s) for an advertiser; and (2) allocation (or assignment)—actual mapping of an advertisement to a reserved ad-slot.

In one embodiment, an ad-purchase order starts in a 'new' state and goes through 'reserved', 'allocated', and 'confirmed' or 'cancelled' states. In one embodiment, a purchase order may be cancelled at any time until the sale is confirmed, at which time it goes into the 'confirmed' state. In one embodiment, this function can be called manually (e.g., to manually confirm the purchase) or automatically (e.g., an order gets automatically confirmed after a cut-off date passes, such as a cut-off date before the feed goes live, which could be set in the system based on business rules).

Ad-Slot Reservation

Order Selection.

During the reservation phase ad-slots get reserved. One or more Purchase Orders may be selected for order fulfillment. Multiple orders are typically selected at the end of the bidding process—in this case the order fulfillment process sorts the bids by price (high to low) and then proceeds to fulfil the orders from the top to the bottom until all the available slots are reserved. A single order may also be selected for order fulfillment—the use case for this is an advertiser directly purchasing ad-space for the full retail price.

Ad-Slot Reservation.

A very simple scheme for reservations could be to allocate slots to all advertisers who qualify for a particular feed in a round-robin fashion until their orders are satisfied (unreserved slots will be filled later from a pool of standby advertisements). When there are more constraints on the reservation the problem becomes one of optimization—the overall goal of the optimization is to maximize the ad-revenue (e.g., to leave as few slots unreserved as possible).

Reservation Constraints.

In one embodiment, constraints for reservations fall into two categories: those that relate to the user and those that relate to the advertisements themselves. In this document the first type of constraint is referred to as a 'Targeting Constraint' and the second type of constraint is called an 'Adjacency Constraint'

Some examples of Targeting Constraints could include: (1) Reserve ad-space that targets a certain geographic, demographic or dynamic user group instead of the general population; and (2) Reserve ad-space that targets a certain age group or income level instead of the general population.

Adjacency constraints could include conditions such as: (1) Require that an advertisement for a particular advertiser appear at least X content-items apart (e.g., to avoid user fatigue); (2) Require that an advertisement for an advertiser appear no more than X content-items apart (to ensure that the impression of the advertisement does not fade in the mind of the user); (3) Require that a banner ad for one advertiser never appear together with a video ad for another (e.g., for a competitor); and (4) Require that a certain banner and text ad appear together in order to reinforce each other. Note that the specific advertisement itself may be uploaded at a later date; however, in one embodiment, the constraints are specified up-front at reservation time as they cannot readily be taken into account at ad-allocation time.

Specifying Constraints.

Users should be able to specify constraints in a clear and easy way to use the system effectively. A simple tagging mechanism that allows simple wildcards could be used to specify constraints. For example let us assume that the advertisements are tagged with some unique tags.

For example: V-ABC-XYZ-Ad23—Video Ad#23 for Advertiser XYZ from advertising agency ABC; and B-EFG-JKL-Ad35—Banner Ad#35 for Advertiser JKL from advertising agency EFG. When placing an ad-space order line for the ABC-XYZ video ad, the constraint could be specified as '*-*-!JKL-*' to mean that the banner ad magazine for the content item may not contain an ad from advertiser JKL.

User Pools.

End-users for whom the system has optional information available fall into certain pools or target groups. All other users are considered part of the untargeted pool of users. When an advertiser buys an untargeted ad-space, he is trying to reach the untargeted pool. If there is ad-space left in the targeted pool, some of those (usually more sought after) users might also be served the untargeted ads but that is not guaranteed. A targeted ad-space on the other hand specifically is intended to reach the target audience it seeks to reach. In preferred embodiments, users in the target group are guaranteed to be served the targeted advertisement.

Ad-Slot Allocation.

Ad-slot allocation refers to the mapping of a particular advertisement from an advertiser to the slot reserved for the advertiser. In preferred embodiments, the system should allow the following ways to allocate ad slots: (1) Automatic ad-slot allocation: The system should be able to produce an allocation automatically; (2) Manual editing of the allocation table should be allowed—this will allow an operator to manually tweak or fine-tune an allocation; and (3) Importing the allocation table should be allowed: This will allow the allocation scheduling to be performed using an external tool (e.g. a mathematical library that is designed for this purpose) and the results could be imported into the system.

Ad-Selection.

An advertiser may choose to select some of the advertisements in the pool for certain channels and not for certain other channels. This is expected to affect a relatively smaller number of advertisements. For example—some ads are meant to be used only for a special or finale in the show but not for regular episodes.

Coupons And Location Sensitive Ads

Figure 11:
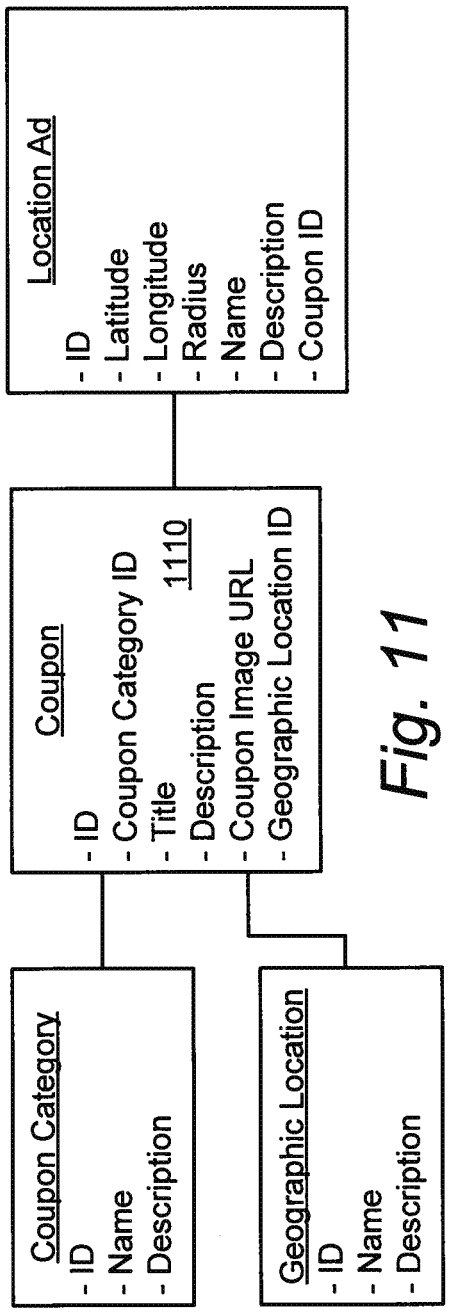
FIG. 11 shows the entities involved in coupons and location sensitive ads in some embodiments.

FIG. 11 shows the entities involved in Coupons and Location Sensitive Ads. Coupons 1110 may be categorized by type (e.g., 'Food', 'Sports', 'Footwear', 'Gift items' etc.). A local ad that offers a coupon may be created for a particular geographic location by providing the coordinates and the effective radius. The description attribute for the location sensitive ad refers to the text displayed to a user in a pop-up while offering to display the location sensitive ad. If the user affirms that he would like to see this ad, the corresponding coupon is displayed by the application. Otherwise the location sensitive ad popup is dismissed.

Raw Statistical Data

Figure 12:
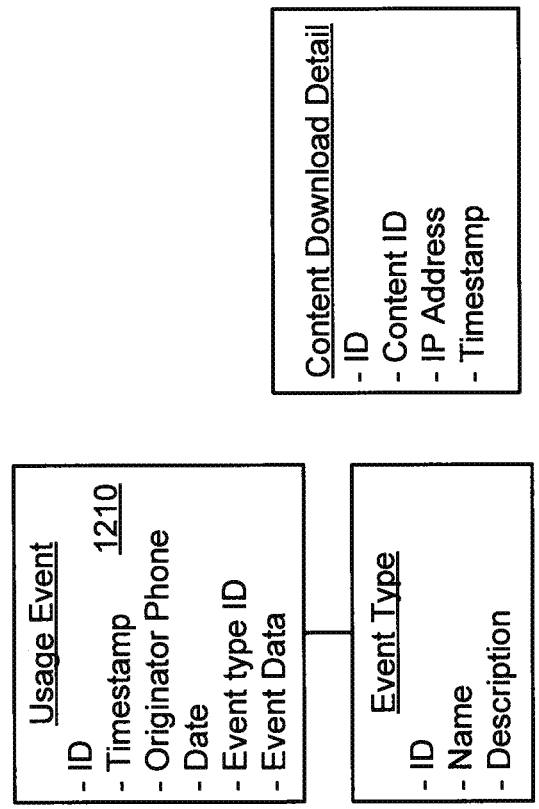
FIG. 12 shows how raw schematic data gets collected, according to some embodiments.

FIG. 12 shows how raw statistical data gets collected according to some embodiments. Event records 1210 for different event types (e.g., Play, Stop, Skip, Vote, Survey, Ad-Rotation) and associated event data (e.g., items selected in a Survey submission event) is recorded as part of the event data. Content download events are also recorded and this data is collected and uploaded to the database. The raw statistical data is analyzed and correlated with demographic data to derive inferences about user behavior and preferences. Currently, content services typically only measure ad-impressions by counting the number of downloads from the server side. Embodiments of the systems and methods described herein can provide better metrics by measuring actual viewings of advertisements by the client. For example, if the ads for a feed item started from Ad#3 in the ad-magazine with 5 ads, and the Ad-rotation event counted 6 rotations then we can tell that Ad #3 was shown twice and all the other ads were shown once.

Illustrative User Interface Screens

Basic Screen Layout.

Figure 13:
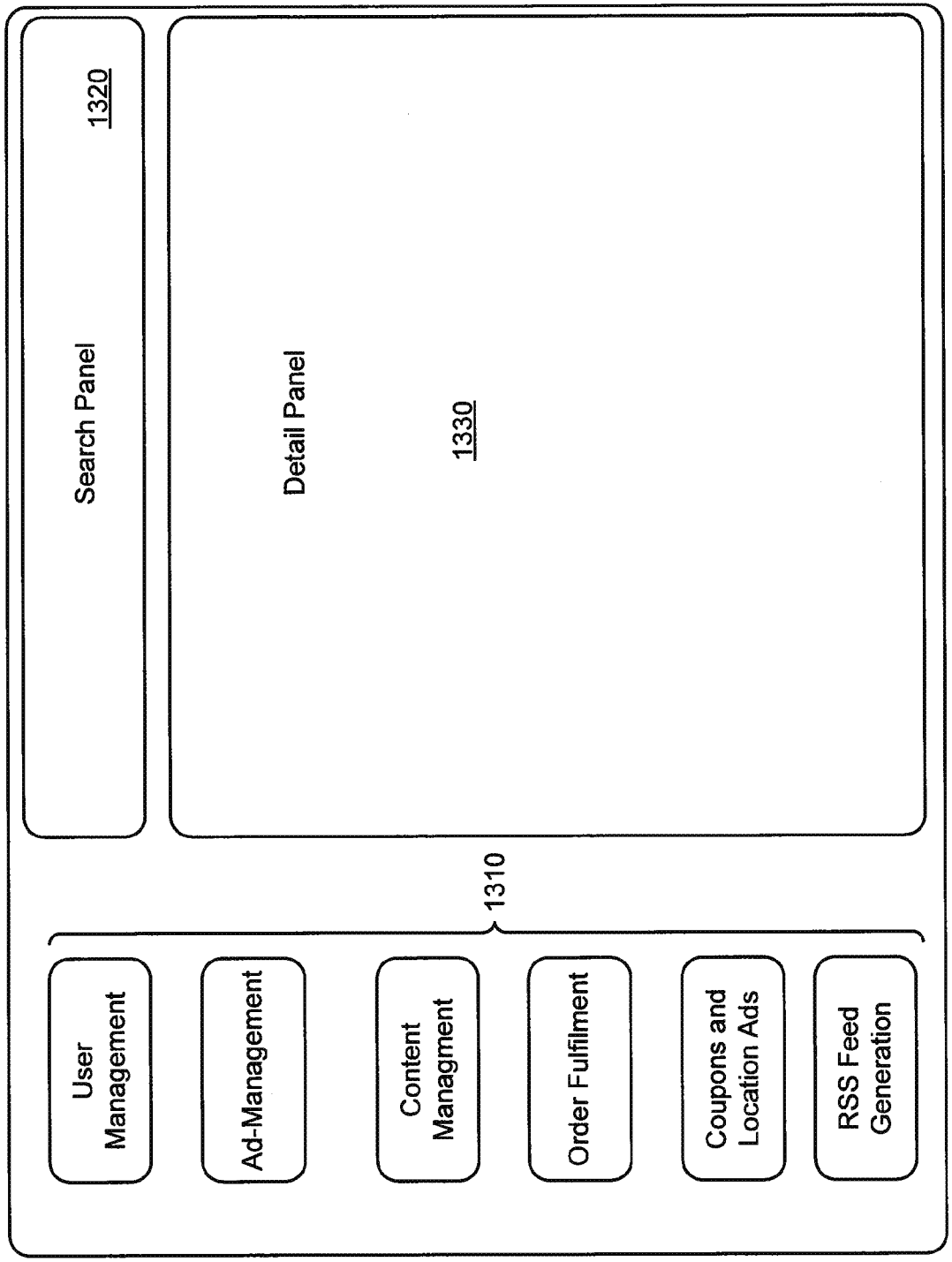
FIG. 13 shows a basic three-pane layout used in one embodiment.

FIG. 13 shows a basic three-pane layout in accordance with one embodiment. The left (tree) panel 1310 gives access to the major functions. Each tree node opens to show individual items in that category. Selecting a function group/item changes the contents of the search panel and the detail panel. The contents of the search panel 1320 change based on what is being currently displayed in the detail panel. The detail panel 1330 shows the forms for performing the selected function item/function group.

User Management.

Figure 14:
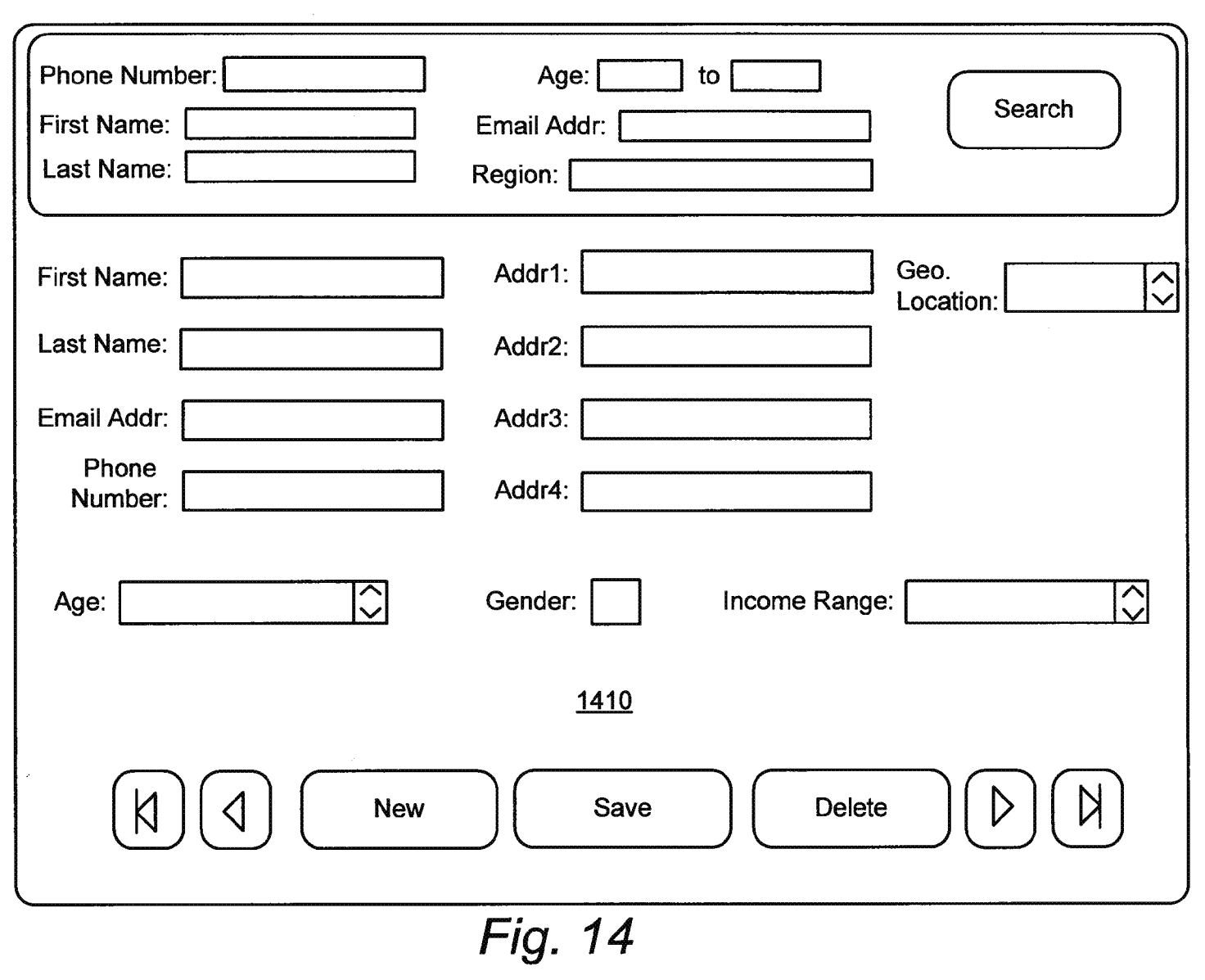

FIG. 14 shows an illustrative interface 1410 for performing user management, in accordance with some embodiments.

Ad Management

Ad-Management Sub-Items.

Figure 15:
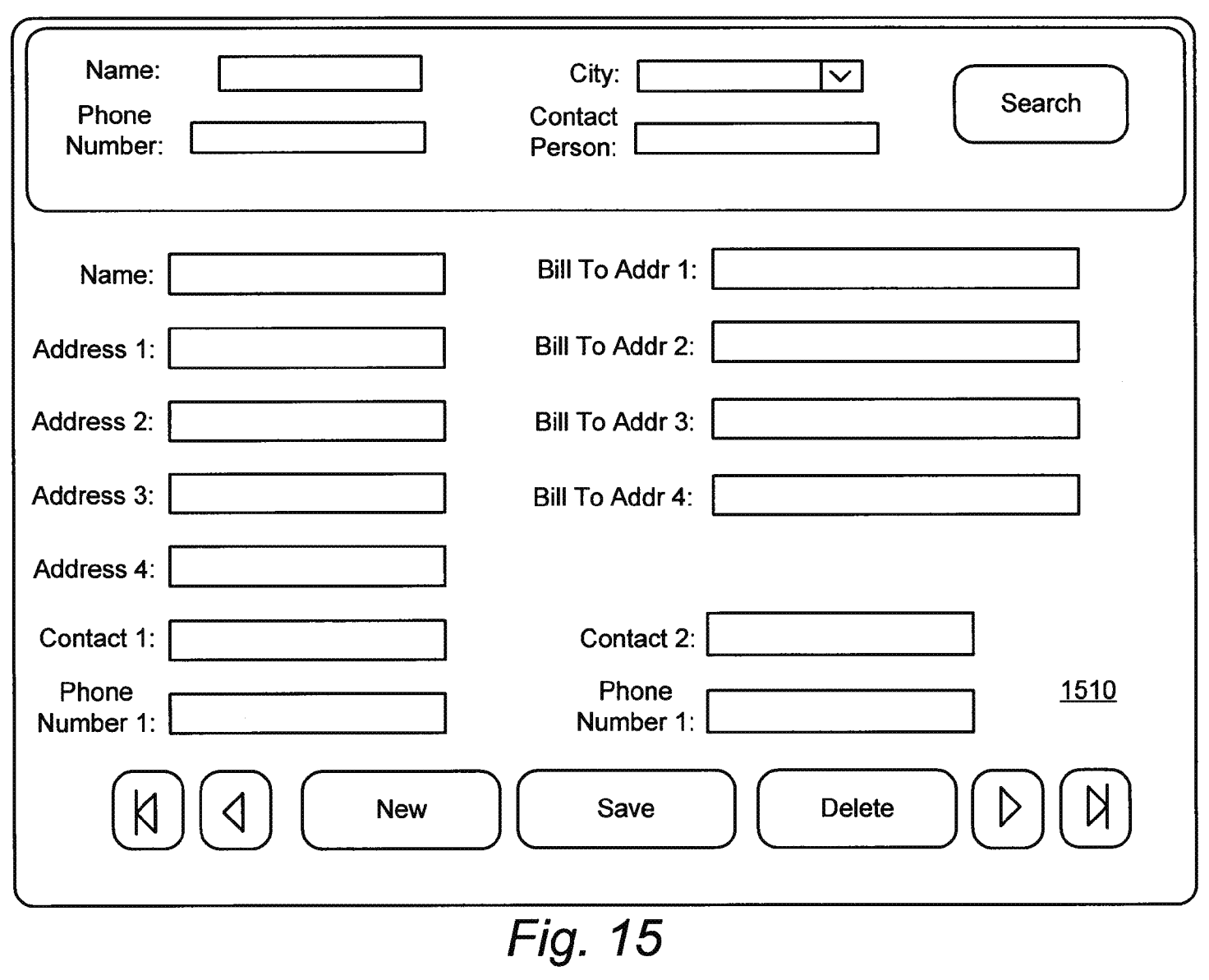
Figure 16:
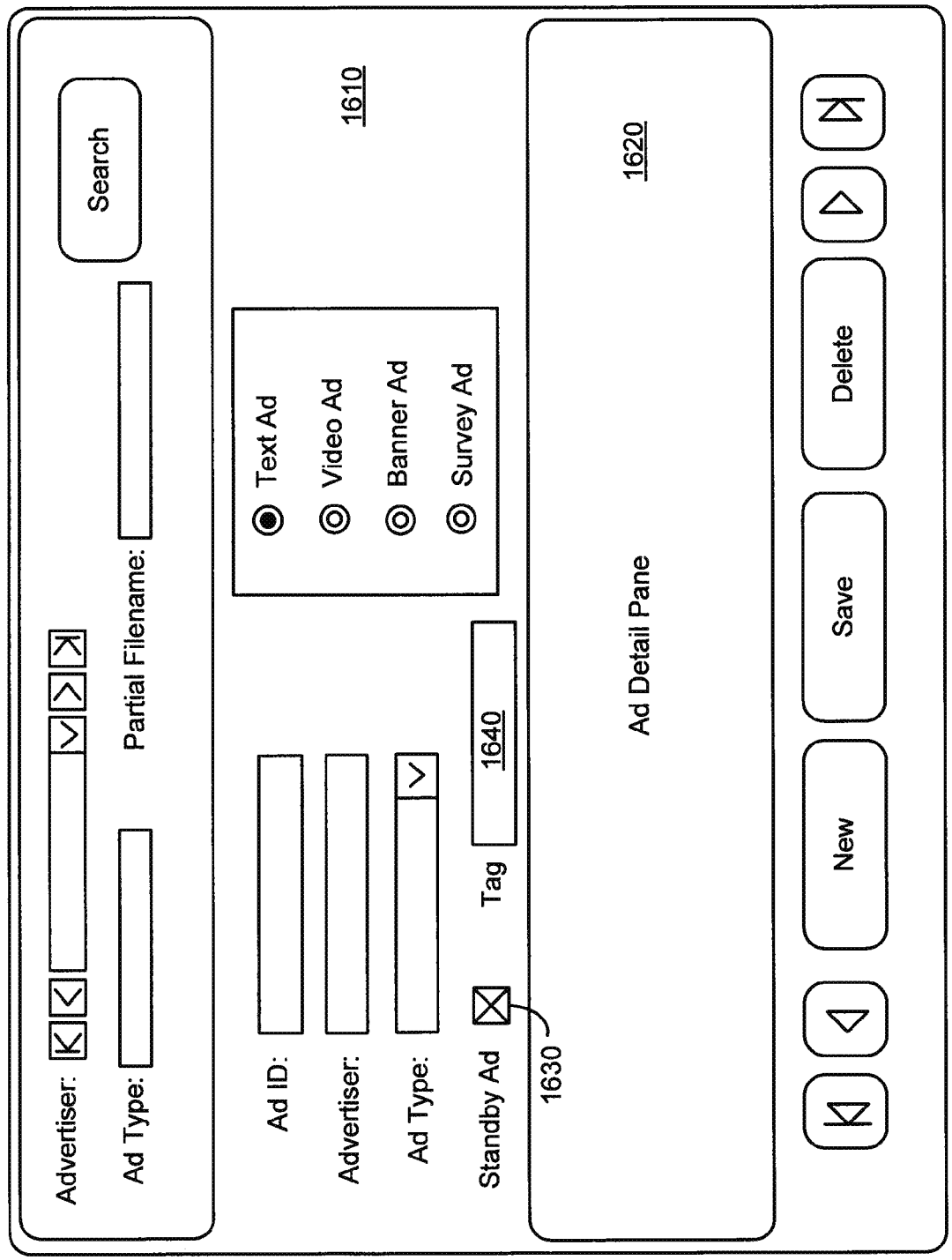
Figure 17:
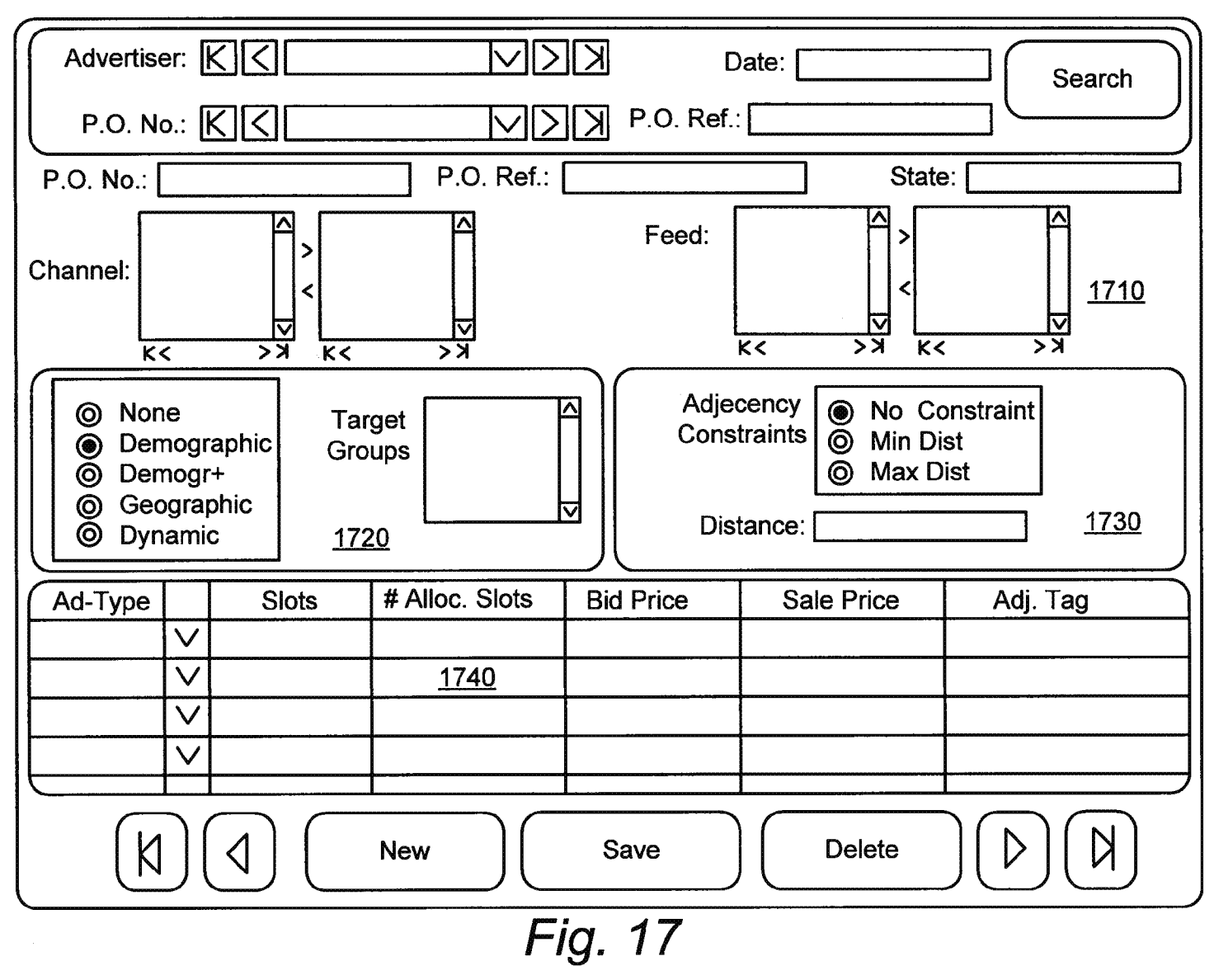

FIGS. 15, 16 and 17 show illustrative interfaces for an Advertiser, Advertisement, and Ad-Purchase Order, respectively, according to certain embodiments. In one embodiment, the 'Ad-Management' node in the tree panel in FIG. 13 has the following child nodes: Advertiser (see, e.g., interface 1510 in FIG. 15); Advertisement (see, e.g., interface 1610 in FIG. 16); and Ad-Purchase Order (see, e.g., interface 1710 in FIG. 17).

Advertisement.

Referring to the illustrative embodiment shown in FIG. 16, the Ad Detail Pane 1620 contents change with the radio button selection for Ad-type. The 'Standby Ad' box 1630 is checked when an ad will be used for order fulfillment if there are any ad-slots left unfilled (e.g., ads that will be billed at the Minimum Ad-space Price); (3) 'Tag' box 1640 is a user-provided unique ID for the advertisement (e.g., mandatory if it is a Survey Ad) or for use in enforcing constraints in ad-space reservation/allocation; (4) When the 'Text Ad' radio button is selected, the pane shows a text area to enter a Text Ad; (5) For Video Ads, the pane shows the following: a text box to enter video URL, a file selection button next to it (e.g., a button that shows the File selection dialog), and a drop-down box to select a Survey Ad to associate with this video ad; (6) For Banner ads the pane shows the following: a text box to enter a URL, and a file selection button next to it (e.g., a button that shows the file selection dialog); (7) For Survey Ads the pane shows the following: a text box to enter a survey question, a radio button with options to select the type of survey (e.g., radio-button based or check-box based), and a grid to enter survey items.

Ad-Purchase Order.

Referring to FIG. 17, the Purchase Order screen 1710 allows advertisers (or operators entering data for the advertiser) to enter a purchase order for ad-slots. A purchase order can be placed for one or more feeds in a single channel or multiple channels. The targeting pane 1720 allows the user to choose the type of targeting. The adjacency constraint pane 1730 can be used to specify the adjacency constraints (e.g., how far apart the advertiser wants its ads to be). The purchase order list grid 1740 enables the purchaser to place an order with multiple items. The Adj. Tag column in the purchase order list 1740 can be used to specify a constraint for keeping two ads together (e.g. a text ad and a banner ad will be shown together—they go in the same position in the ad-magazine). In one embodiment, text and banner ads, for example, may rotate faster than video ads, and thus linking a video ad to a text ad will only ensure that they go to the same feed item; however the ads may not always get shown together.

Content Management

Content Management Sub-Items.

In one embodiment, the 'Content-Management' node in the tree panel of FIG. 13 has the following child nodes: (1) Content Provider; (2) Content; (3) Channel; and (4) Feed.

Content Provider.

Figure 18:
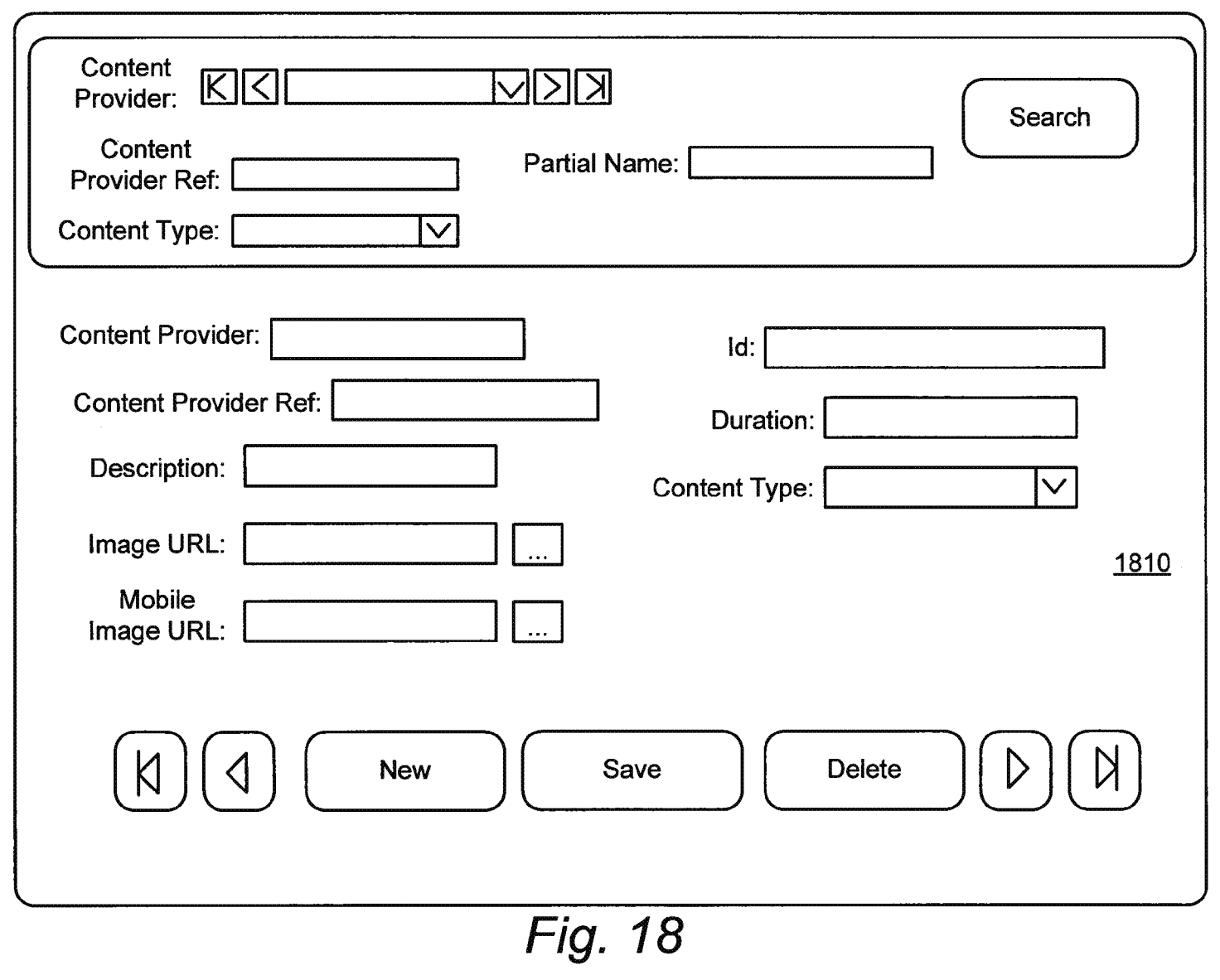

FIG. 18 shows an illustrative content provider screen 1810.

Figure 19:
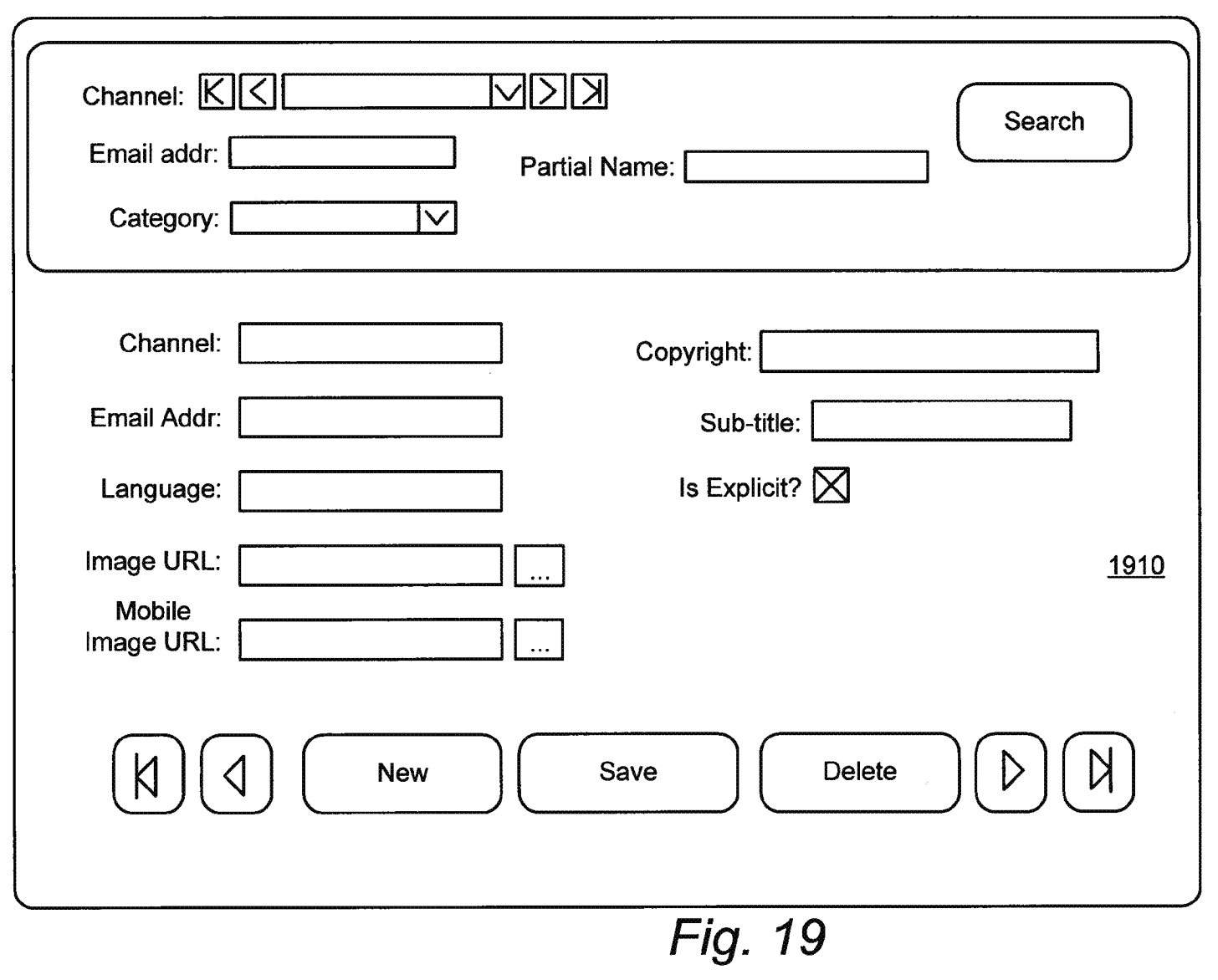

FIG. 19 shows a channel interface screen 1910, in accordance with some embodiments.

Figure 20:
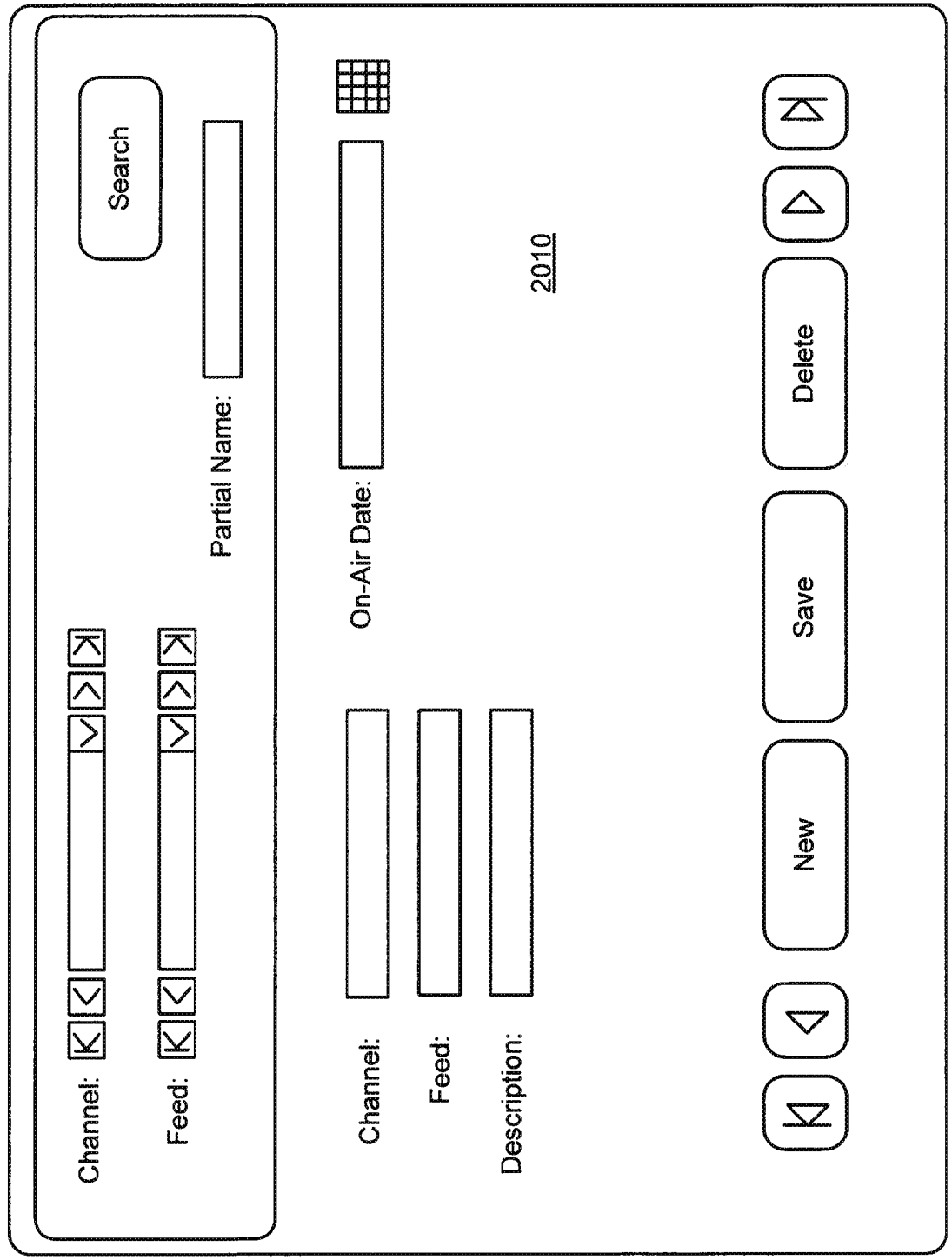
FIG. 20 shows a feed interface screen, according to some embodiments.

FIG. 20 shows a feed interface screen 2010, in accordance with some embodiments.

Order Fulfillment

Figure 21:
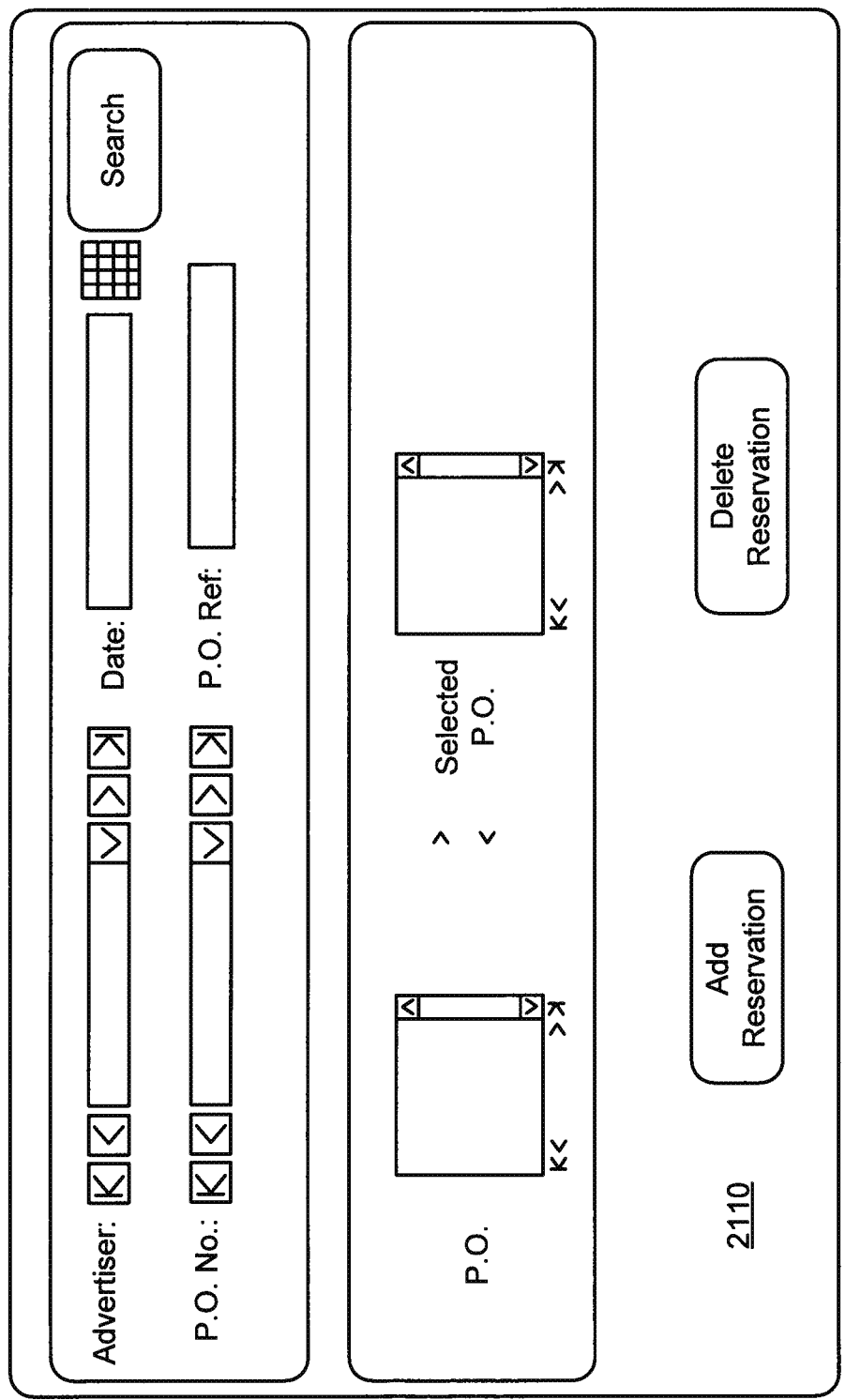
FIG. 21 shows a reservation interface screen, according to some embodiments.

FIG. 21 shows a reservation interface screen 2110, in accordance with some embodiments. Note that one or more purchase orders may be selected for reservation. In one embodiment, if more than one purchase order is selected, the orders are sorted by bid-price and fulfilled in that sequence.

Figure 22:
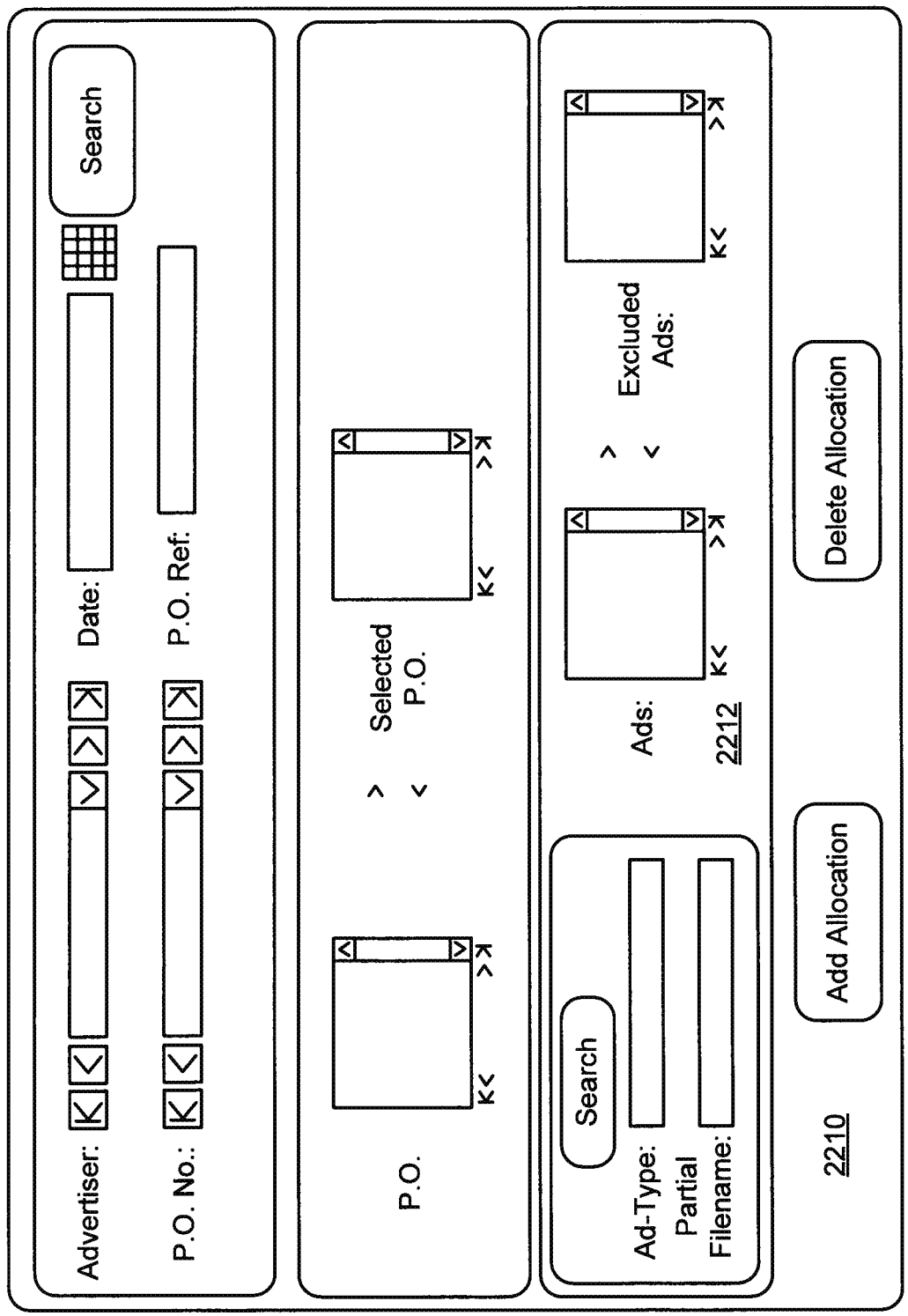
FIG. 22 shows an allocation interface screen, according to some embodiments.

FIG. 22 shows an allocation interface screen 2210 in accordance with some embodiments. The ad exclusion panel 2212 allows some ads to be excluded for allocation (e.g., exclude ads that are to be used only for specials or season finales). The screen layout 2210 could be changed if the requirement is to choose advertisements rather than to exclude advertisements for allocation. Allocation can be done in a single pass or multiple passes (e.g., one pass each for advertisers, one pass for each purchase order, etc.) As long as the reservation exists it can be filled in a number of passes. When the final pass is being performed (for example, if a checkbox indicating it is the final allocation is checked), any remaining slots will be filled using standby ads.

Figure 23:
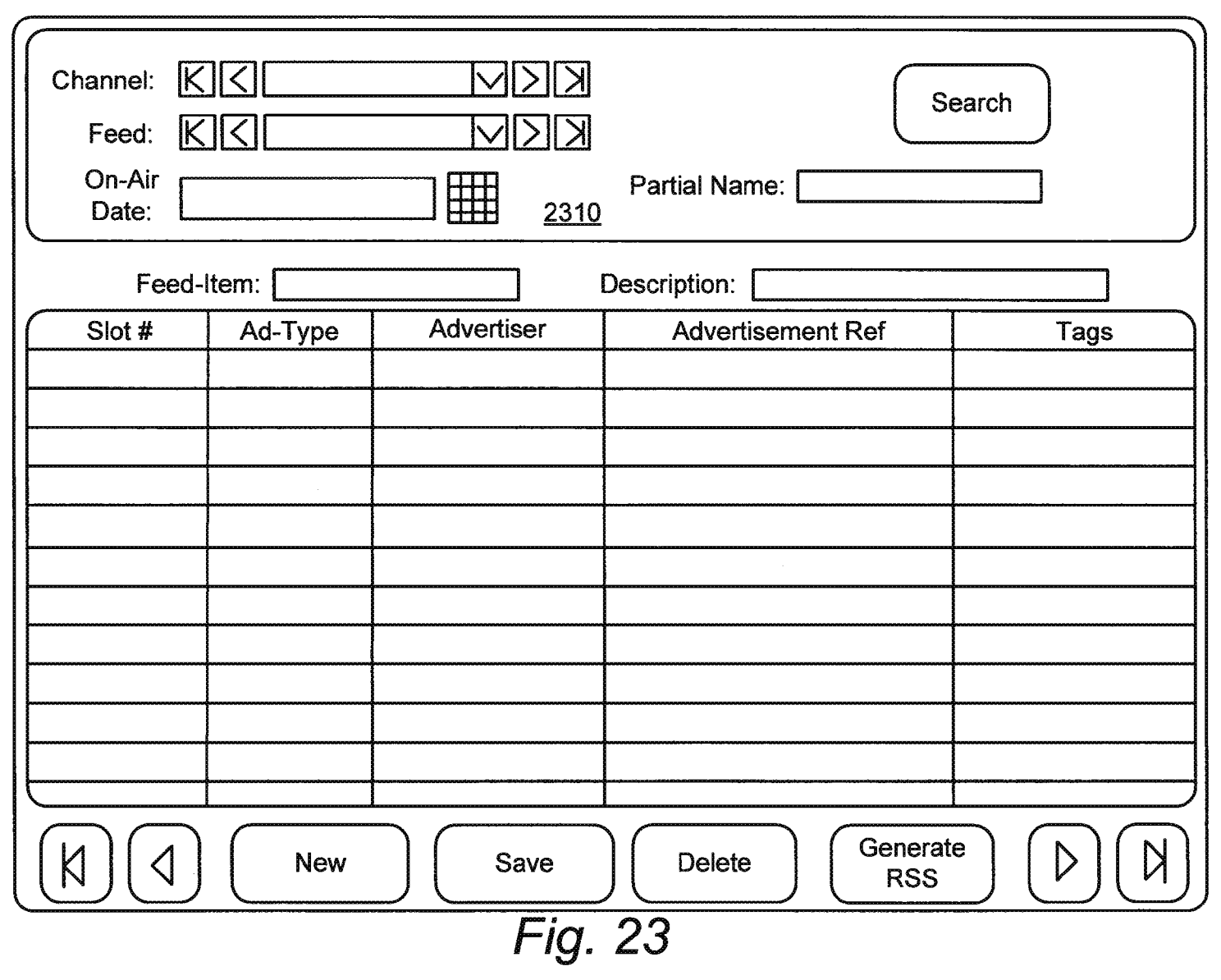

FIG. 23 shows a modify allocation interface screen 2310, according to some embodiments. Screen 2310 allows a user to manually tweak the ad-allocation. The user will be allowed to override the allocation. If the user's change violates a constraint used in reservation, he will be shown a warning but would still be given the choice to go ahead and save the change.

According to some embodiments, the ad-space allocation could be computed using an external mathematical library and the results of the allocation could then be directly imported into the system.

FIG. 24 shows a coupon interface screen 2410, according to some embodiments.

Figure 25:
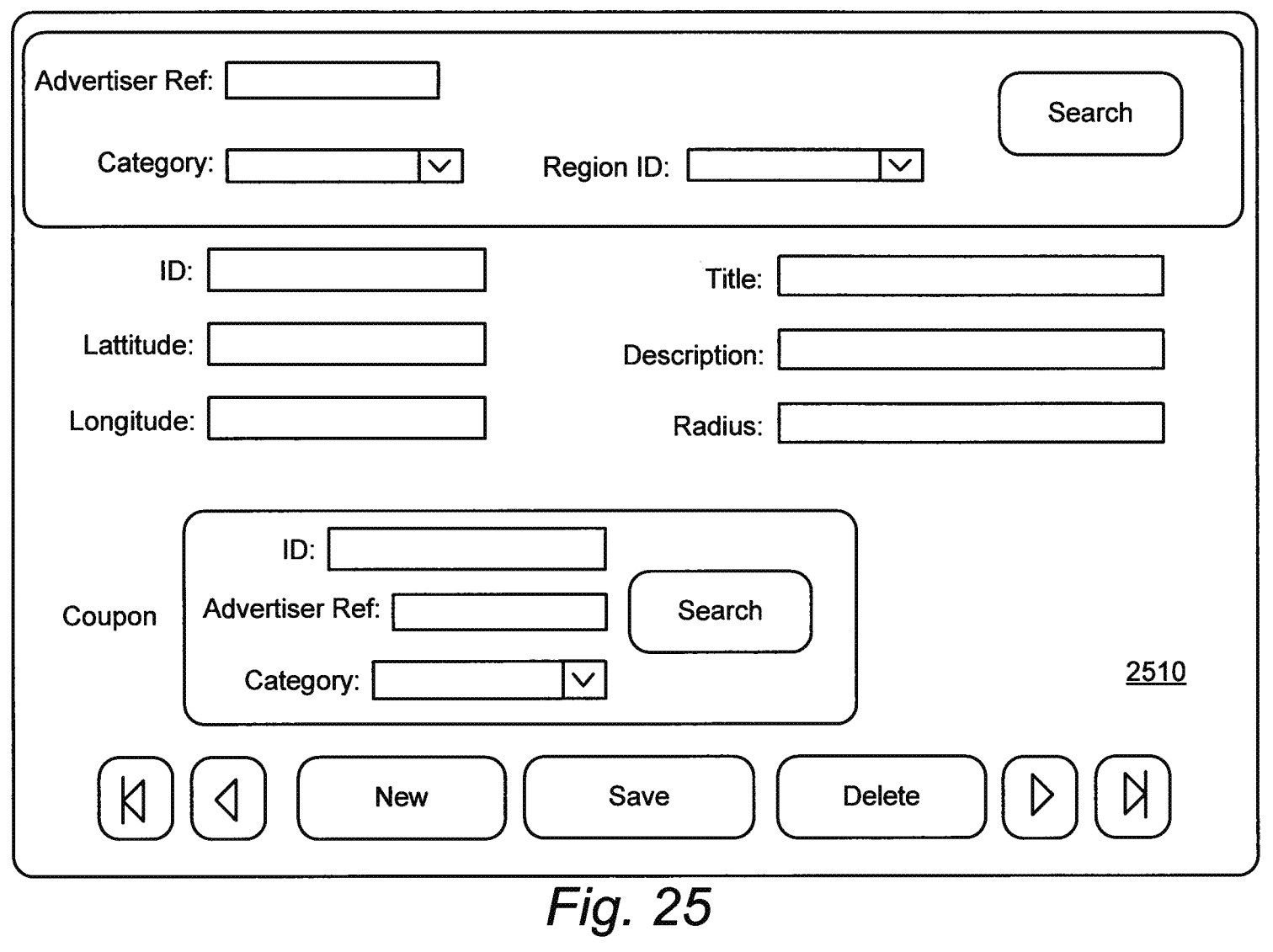

FIG. 25 shows a location ad interface screen 2510, according to some embodiments.

Reports and Analysis

Reports for Advertisers.

The following are examples of types of reports for advertisers, according to some embodiments: (1) Impressions (e.g., number of views) for an advertisement (e.g., how many times was an advertisement actually shown to users). Figures could be broken down by age, gender, income, geographic location, marital status, etc.; (2) Number of downloads—how many times was an advertisement actually downloaded; (3) Number of survey responses per 1000 views of an advertisement—how many of the viewers responded to the survey; (4) Survey response frequency histogram—how did respondents respond to survey question X; and (5) Location-sensitive ad viewing—location-sensitive ad viewership data (e.g., with numbers broken down by gender, income level, age, etc).

Data Analysis Reports.

The following are examples of type of data analysis reports, according to some embodiments: (1) User Activity—in one embodiment, this will provide a graph of active users broken down by age, gender, income level, location, or dynamic group. User activity is measured as a percentage of feeds viewed by the user. For example, in one embodiment a user who is 50% active is one that has seen half the feeds that he downloaded to his mobile phone. Examples include activity by age, gender, income level, region, and dynamic group; (2) Viewership measurement—number of users who viewed a particular channel, feed or content item. Examples include viewership by channel, feed, content item and content tag; and (3) Viewer habits—e.g., what users are watching at present. Examples include percentage shares of each channel by user, region, age, and gender.

Ad-Reservation Example

To further illustrate some embodiments, an example is given of the use of an external mathematical library for the reservation of ad slots for a given episode. In this example, the reservation problem for a typical episode for a channel is described. A description is given of the building of a mathematical model for the problem using AMPL. The use of a suitable solver to solve the problem and a brief interpretation of the results is given.

Problem Description.

Assume that the feed (weekly episode) for a particular channel has ten content items. Each content item is associated with five of each type of ad (e.g., text-ads, banner-ads, and video-ads), thereby yielding space for 50 text-ads, 50 banner-ads and 50 video-ads.

Tables 2-4 show data for untargeted ads. The orders are sorted by price.

For targeted ad-space orders the mechanism for describing and solving is basically similar. In the case of targeted orders, the orders would first be sorted into lists containing orders with the same target group. After this point the allocation process remains the same.

Let us also assume that the standby ad rates for Video, Banner and Text ads are $1000, $200 and $100 per slot respectively.

TABLE 2

Video Advertisements

| Advertiser | Ad-Type | Ad-Tag | #Slots Required | Bid Price | Target group | Adjacency Constraint |
|---|---|---|---|---|---|---|
| ABC Corp. | Video | V-ABC-ZZZ-1 | 5 | 20,000 | None | !B-*-TUV-* |
| | Video | V-ABC-F-23 | 3 | 20,000 | None | !B-*T-* && !T-*T-* |
| EFG Corp. | Video | | 20 | 8,000 | None | min ad-distance = 2 (inclusive) |
| | | | 10 | 8,000 | None | |
| XYZ, Inc. | Video | | 7 | 7,500 | None | None |
| QRS Corp. | Video | | 15 | 7,000 | None | None |

As shown in Table 2, ABC Corp. had placed a bid for five slots for the ABC-ZZZ video ad and would like to have the slot only if an add for TUV Corp. will not appear with it; ABC Corp. has another bid for 3 slots for ABC-F ads; the constraint condition is that the ad be not paired with a text or banner ad for T Corp.; EFG has a bid for 20 slots with a minimum ad-distance of 2; EFG has another bid for 10 slots with no constraints; and XYZ and QRS have placed unrestricted bids for 7 and 15 slots, respectively.

Banner Advertisements

TABLE 3

Banner advertisements

| Advertiser | Ad-Type | Ad-Tag | #Slots Required | Bid Price | Target group | Adjacency Constraint |
|---|---|---|---|---|---|---|
| ABC Corp. | Banner | B-ABC-TUV-32 | 20 | 2,000 | None | !V-*-ZZZ-* |
| EFG Corp. | Banner | B-EFG-TM-23 | 10 | 2,000 | None | None |
| | Banner | | 20 | 1,500 | None | None |
| | Banner | | 10 | 500 | None | None |
| XYZ, Inc. | Banner | | 20 | 500 | None | None |
| QRS Corp. | Banner | | 15 | 400 | None | None |

As shown in Table 3: ABC Corp. has placed a bid for 20 slots for the ABC-TUV Banner Ad and would like to ensure that these never get paired with a video ad for ZZZ Corp.; EFG Corp. has placed a bid for 10 slots for TM Corp. Banner Ads, with no constraints; and EFG, XYZ, and QRS have other bids for banner ads which are not constrained.

TABLE 4

Text Advertisements

| Advertiser | Ad-Type | Ad-Tag | #Slots Required | Bid Price | Target group | Adjacency Constraint |
|---|---|---|---|---|---|---|
| ABC Corp. | Text | T-OM-PEP-32 | 30 | 1,000 | None | None |
| | Text | T-OM-TM-23 | 10 | 1,000 | None | None |
| EFG Corp. | Text | | 20 | 300 | None | None |
| XYZ, Inc. | Text | | 10 | 300 | None | None |
| | Text | | 20 | 300 | None | None |
| QRS Corp | Text | | 15 | 200 | None | None |

As shown in Table 4: ABC Corp. has placed a bid for 30 slots for PEP Text Ads and 10 TM text ads; and (2) EFG, XYZ, and QRS have bids for text ads which are not constrained.

The goal of the allocation is to maximize the total ad-revenue from all three types of ads.

Model Building.

The following is an illustrative description of the problem and its expression in a modelling language known as "A Modeling Language for Mathematical Programming" (AMPL). In modeling this illustrative ad-space reservation example, the description includes expressing sets, parameters, variables, the objective function, and constraints.

Sets.

There are two sets in the ad-space: (1) a set of content items with which the ad-magazine (of a particular type) is associated; and (2) a set of N slots in the ad-magazine. This can be written in AMPL notation as follows:

set CONTENT_ITEMS; # set of content items
set AD_MAGAZINE_ITEMS; # set of items in the ad-magazine Parameters.

The parameters that take part in the problem are:
—parameters for the ad-space reservation—
param VIDEOAD_STANDBY_RATE;
param BANNERAD_STANDBY_RATE;
param TEXTAD_STANDBY_RATE;

Variables.

The ad-space allocation for each video/banner/text ad can be modelled using a 10×5 matrix of binary numbers which is the allocation map. If the value of the element is 1 the slot is assigned for that video/banner/text ad. Otherwise the slot is not assigned for that advertisement. These are the variables in the allocation problem.

—allocation maps for video ads—
—var ABC_VID_AD_1 {CONTENT_ITEMS, AD_MAGAZINE_ITEMS} binary;

```
    var    ABC_VID_AD_2    {CONTENT_ITEMS,
AD_MAGAZINE_ITEMS} binary;
    var    EFG_VID_AD_1    {CONTENT_ITEMS,
AD_MAGAZINE_ITEMS} binary;
    var    EFG_VID_AD_2    {CONTENT_ITEMS,
AD_MAGAZINE_ITEMS} binary;
    var    XYZ_VID_AD_1    {CONTENT_ITEMS,
AD_MAGAZINE_ITEMS} binary;
    var    QRS_VID_AD_1    {CONTENT_ITEMS,
AD_MAGAZINE_ITEMS} binary;
    #—allocation maps for banner ads—
    var    ABC_BAN_AD_1    {CONTENT_ITEMS,
AD_MAGAZINE_ITEMS} binary;
    var    EFG_BAN_AD_1    {CONTENT_ITEMS,
AD_MAGAZINE_ITEMS} binary;
    var    EFG_BAN_AD_2    {CONTENT_ITEMS,
AD_MAGAZINE_ITEMS} binary;
    var        EFG_BAN_AD_3{CONTENT_ITEMS,
AD_MAGAZINE_ITEMS} binary;
    var    XYZ_BAN_AD_1    {CONTENT_ITEMS,
AD_MAGAZINE_ITEMS} binary;
    var    QRS_BAN_AD_1    {CONTENT_ITEMS,
AD_MAGAZINE_ITEMS} binary;
    #—allocation maps for text ads—
    var    ABC_TXT_AD_1    {CONTENT_ITEMS,
AD_MAGAZINE_ITEMS} binary;
    var    ABC_TXT_AD_2    {CONTENT_ITEMS,
AD_MAGAZINE_ITEMS} binary;
    var    EFG_TXT_AD_1    {CONTENT_ITEMS,
AD_MAGAZINE_ITEMS} binary;
    var    XYZ_TXT_AD_1    {CONTENT_ITEMS,
AD_MAGAZINE_ITEMS} binary;
    var    XYZ_TXT_AD_2    {CONTENT_ITEMS,
AD_MAGAZINE_ITEMS} binary;
    var    QRS_TXT_AD_1    {CONTENT_ITEMS,
AD_MAGAZINE_ITEMS} binary;
```

Another set of variables is the selling price for the slots which is determined as a result of the allocation. However this variable can only take a fixed set of values (e.g., the sale price is the bid price for the lowest priced bid that was accepted).

It is much easier to solve the problem if these variables are converted into parameters. The problem can then be broken down into a set of simpler problems and the global maximum can be obtained by selecting the problem for which the combination of parameters gives the highest ad-revenue.

```
    #—price per slot (evaluated as a result of evaluating the bids for the slots)
    param VID_SLOT_SALE_PRICE;
    param BAN_SLOT_SALE_PRICE;
    param TXT_SLOT_SALE_PRICE;
```

The number of unsold slots for video/banner/text ads is another variable in the problem. There could be constraints on it (e.g. a certain number of slots must be kept free for public service ads). In this example, it is assumed that the number of unsold slots is a parameter, with a value of zero.

```
    #—unsold slots—
    param VID_UNSOLD_SLOT_NBS;
    param BAN_UNSOLD_SLOT_NBS;
    param TXT_UNSOLD_SLOT_NBS;
```

Objective Function.

The goal of the process is to maximize the sum of the ad-revenue from all three types of ad-space sales. This is our objective function. This can be expressed as follows:

```
    #—objective function—
    maximize TOTAL_AD_REVENUE: (sum {i in CON-
TENT_ITEMS,
        j in AD_MAGAZINE_ITEMS}
        (ABC_VID_AD_1[i,j]+
        ABC_VID_AD_2[i,j]+
        EFG_VID_AD_1[i,j]+
        EFG_VID_AD_2[i,j]+
        XYZ_VID_AD_1[i,j]+
        QRS_VID_AD_1[i,j])*
        VID_SLOT_SALE_PRICE)
        +
    (sum {i in CONTENT_ITEMS,
        j in AD_MAGAZINE_ITEMS}
        (ABC_BAN_AD_1[i,j]+
        EFG_BAN_AD_1[i,j]+
        EFG_BAN_AD_2[i,j]+
        EFG_BAN_AD_3[i,j]+
        XYZ_BAN_AD_1[i,j]+
        QRS_BAN_AD_1[i,j])*
        BAN_SLOT_SALE_PRICE)
        +
    (sum {i in CONTENT_ITEMS,
        j in AD_MAGAZINE_ITEMS}
        (ABC_TXT_AD_1[i,j]+
        ABC_TXT_AD_2[i,j]+
        EFG_TXT_AD_1[i,j]+
        XYZ_TXT_AD_1[i,j]+
        XYZ_TXT_AD_2[i,j]+
        QRS_TXT_AD_1[i,j])*
        TXT_SLOT_SALE_PRICE)
        +
    (VID_UNSOLD_SLOT_NBS* VIDEOAD_STANDBY_
        RATE)+(BAN_UNSOLD_SLOT_NBS*
BANNERAD_STANDBY_RATE)+(TXT_UNSOLD_
    SLOT_NBS* TEXTAD_STANDBY_RATE)
```

Constraints.

The solution is constrained by the following constraints:

1. A slot in an ad-magazine can be reserved for one order only.

```
    #—no double-allocations—
    subject to
    VIDEOAD_ALLOC_CONSTRAINT_ONCE {i in CON-
TENT_ITEMS,
        j in AD_MAGAZINE_ITEMS}
        :
        0<=
        (ABC_VID_AD_1[i,j]+
        ABC_VID_AD_2[i,j]+
        EFG_VID_AD_1[i,j]+
        EFG_VID_AD_2[i,j]+
        XYZ_VID_AD_1[i,j]+
        QRS_VID_AD_1[i,j])<=1
        ;
    subject to
    BANNERAD_ALLOC_CONSTRAINT_ONCE {i in
CONTENT_ITEMS,
        j in AD_MAGAZINE_ITEMS}
        :
        0<=
        (ABC_BAN_AD_1[i,j]+
        EFG_BAN_AD_1[i,j]+
        EFG_BAN_AD_2[i,j]+
        EFG_BAN_AD_3[i,j]+
        XYZ_BAN_AD_1[i,j]+
        QRS_BAN_AD_1[i,j])<=1
        ;
    subject to
    TEXTAD_ALLOC_CONSTRAINT_ONCE {i in CON-
TENT_ITEMS,
        j in AD_MAGAZINE_ITEMS}
        :
        0<=
        (ABC_TXT_AD_1[i,j]+
        ABC_TXT_AD_2[i,j]+
        EFG_TXT_AD_1[i,j]+
        XYZ_TXT_AD_1[i,j]+
```

XYZ_TXT_AD_2[i,j]+
QRS_TXT_AD_1[i,j])<=1
;
2. Constraints for mutual exclusion for advertisements.
—adjacency (mutual exclusion) constraints—
subject to
MUTEX_TUV_ZZZ_ADS {i in CONTENT_ITEMS, j in AD_MAGAZINE_ITEMS, k in AD_MAGAZINE_ITEMS}
:
   0<=(ABC_VID_AD_1[i,j]+ABC_BAN_AD_1[i,k])
     <=1
;
3. Distance constraints—distance constraints are similarly specified using the allocation map for the advertisement for which the distance applies.
—adjacency (distance) constraints—
—for the minimum distance (ad has to be at least two feed-items apart)—
subject to
MIN_DIST_EFG_VIDEO_ADS_1 {i in 2.9, j in AD_MAGAZINE_ITEMS}
:
   EFG_VID_AD_1[i,j]<=1—sum{i0 in DISTANCE_1_OFFSETS} (sum{j0 in AD_MAGAZINE_ITEMS} (EFG_VID_AD_1[i−i0, j0]))

4. Ordered quantity—limits are placed on the allocation by the quantity ordered for each type of ad-space. These constraints are modelled as follows:
—max number of allocated slots—
—Video—
subject to ABC_VID_AD_1_QTY
:
   0<=sum {i in CONTENT_ITEMS, j in AD_MAGAZINE_ITEMS} (ABC_VID_AD_1[i,j])<=
ABC_VID_AD_1_MAX_QTY
;

Solving the Problem.

Available Tools—for problems that involve integer variables like the one described above, numerical methods in the "Branch and Bound" category are the most effective. It is important to formulate the objective function and constraints as linear constraints because numerical methods for integer problems with non-linear constraints/non-linear objective function are not very well-developed. The numerical techniques for linear problems are well-developed and these algorithms converge reasonably fast.

For non-linear problems most of the techniques used consist of variations of the basic Newton's method. Since these method use derivatives, solvers should relax the integrality of the variables during computation. The result obtained is therefore in real number space and may require some post-processing (rounding etc) for interpretation. The post-processing can move the solution very far from the computed optimum. Due to this, sensitivity analysis should be performed for the solution. Because of all these difficulties, formulating the problem using linear constraints is useful.

Choice of Solver—the solver used for this example problem is the CBC solver (http://www.coin-or.org/Cbc/cbcuserguide.html) available under CPL. A CBC solver is hosted by NEOS (http://neos.mcs.anl.gov/neos/solvers/milp:Cbc/ampl.html). This solver is used for solving the example problem.

Results.

Tables 5-7 below summarize the results for video-ads, banner ads and text-ads in this example.

TABLE 5

Video-Ad Reservation Table

| | Item# 1 | Item# 2 | Item# 3 | Item# 4 | Item# 5 | Item# 6 | Item# 7 | Item# 8 | Item# 9 | Item# 10 |
|---|---|---|---|---|---|---|---|---|---|---|
| Ad1 |  | XYZ1 | QRS1 | ABC2 | QRS1 | EFG2 | ABC1 |  | QRS1 | EFG1 |
| Ad2 | EFG1 | QRS1 | EFG2 | QRS1 | EFG2 | QRS1 | ABC2 | ABC1 | QRS1 | QRS1 |
| Ad3 | XYZ1 | ABC1 | EFG2 | XYZ1 | XYZ1 | QRS1 | QRS1 | EFG2 | QRS1 |  |
| Ad4 |  | EFG2 | XYZ1 | XYZ1 | QRS1 | ABC2 | EFG2 | XYZ1 | EFG2 |  |
| Ad5 | EFG2 | ABC1 | QRS1 | EFG1 | QRS1 | EFG2 | EFG1 |  | QRS1 | ABC1 |

The following results for video ads were obtained: (ABC 1)==5; sum(ABC2)==3; sum(EFG1)==4, only 4 are spots get reserved because of distance constraints; sum(EFG2)==10; sum(XYZ1)==7; and sum (QRS1)==15. Note that some slots are left unfilled because all the purchase orders are filled (subject to constraints). These will get filled by "Standby" Video Ads in preferred embodiments.

TABLE 6

Banner-Ad Reservation Table

| | Item# 1 | Item# 2 | Item# 3 | Item# 4 | Item# 5 | Item# 6 | Item# 7 | Item# 8 | Item# 9 | Item# 10 |
|---|---|---|---|---|---|---|---|---|---|---|
| Ad1 | ABC1 | EFG2 | QRS1 | QRS1 | EFG2 | ABC1 | QRS1 | EFG2 | XYZ1 | XYZ1 |
| Ad2 | QRS1 | XYZ1 | QRS1 | ABC1 | EFG3 | EFG1 | EFG2 | EFG2 | QRS1 | XYZ1 |
| Ad3 | ABC1 | EFG2 | EFG3 | EFG3 | EFG1 | QRS1 | EFG2 | EFG2 | XYZ1 | QRS1 |
| Ad4 | QRS1 | EFG3 | EFG3 | QRS1 | EFG2 | ABC1 | EFG3 | XYZ1 | QRS1 | QRS1 |
| Ad5 | ABC1 | XYZ1 | QRS1 | EFG2 | QRS1 | XYZ1 | EFG1 | XYZ1 | QRS1 | XYZ1 |

The exclusivity of TUV banner with ZZZ Video Ads can be seen from the above table. In this example, no constraints were put favoring the higher priced bids over lower priced bids. Hence ABC1 is not given more slots over the other banner ads. This can be fixed by adding tighter constraints in the model.

TABLE 7

Text-Ad Reservation Table

|     | Item# 1 | Item# 2 | Item# 3 | Item# 4 | Item# 5 | Item# 6 | Item# 7 | Item# 8 | Item# 9 | Item# 10 |
|-----|---------|---------|---------|---------|---------|---------|---------|---------|---------|----------|
| Ad1 | XYZ2    | EFG1    | ABC2    | ABC2    | ABC1    | XYZ1    | XYZ2    | XYZ2    | EFG1    | EFG1     |
| Ad2 | ABC1    | ABC2    | EFG1    | XYZ2    | EFG1    | XYZ2    | EFG1    | EFG1    | XYZ2    | ABC2     |
| Ad3 | ABC2    | QRS1    | EFG1    | EFG1    | XYZ1    | XYZ2    | ABC2    | ABC2    | XYZ1    | ABC1     |
| Ad4 | EFG1    | QRS1    | XYZ2    | ABC1    | XYZ2    | ABC2    | XYZ1    | QRS1    | ABC1    | EFG1     |
| Ad5 | EFG1    | XYZ2    | XYZ1    | XYZ1    | EFG1    | XYZ2    | ABC1    | EFG1    | EFG1    | QRS1     |

Mobile Identification System and Methods

An advertisement-supported mobile content service will typically need to identify the mobile device while uploading usage statistics to the backend service. One way is for mobile applications to probe the mobile device itself for identifying properties. However a mobile device identifier is not uniformly available to applications on all mobile devices, and in many cases the number (if available) may not be unique.

For example, on mobile phones there are identifying properties such as IMEI (International Mobile Equipment Identity) or MEID (Mobile Equipment Identifier) for mobile phones. However these properties are not uniformly available across all mobile devices. Furthermore, it is possible to burn a different IMEI number in a mobile device. Since IMEI was originally designed to identify and blacklist stolen mobile devices, device theft usually involves cloning the IMEI of a legitimate phone into a stolen device. According to some industry estimates about 10% of the IMEI numbers are not unique. In the case of mobile phones, IMSI (International Mobile Subscriber Identity) is a more "sticky" identifier for the mobile consumer since it follows the subscriber even when the subscriber changes/upgrades his mobile device. However IMSI is generally not available to mobile applications and does not exist for other mobile devices.

Hence there is a need to provide a mobile identity for a mobile device. In the case of mobile phones it is preferable if the mobile identity can be correlated with the IMSI number for mobile phones, as IMSI is more closely tied with the mobile consumer. However, there preferably should be a balance between the need for a mobile identity and the need to protect the privacy of consumers. To some extent the requirements for the mobile identity are determined by the cultural mores of a locale. For example, in some cultures it may be acceptable to assign a unique identifier to a mobile device so long as the unique identifier is not directly identified with a physical person (e.g., an anonymous identifier that cannot be traced back to a person). In some cases it may be acceptable for the backend service to personally identify the consumer as long as the service takes care to anonymize the data when it discloses any aggregated or non-aggregated information to outside third parties for conducting its business (e.g., aggregated reports for usage statistics, statistics broken down by categories of users etc.). In some other locales it may not be acceptable to assign a unique identifier to a mobile device. The identifier may need to be some sort of group identifier (e.g., an identifier that identifies the user as belonging to a geographic region, a category of users, an age group, etc.). The classification of the user could be done using actual data (e.g., inferring geographic region by IP address) or using user-provided information (e.g., answers to survey questions provided by a user, information voluntarily provided by a user during signing up, etc.). The classification of the user could be dynamic and could potentially change over time based on the user's responses to survey questions.

In one embodiment, a backend service provides its consumers (advertisers, content providers, content aggregators) an assurance that the usage data that it collects and reports is authentic and accurate. This can be achieved, e.g., by signing the usage data using a secret key. A simple mechanism to provide a mobile client with a secret key is to have a baked-in (e.g., permanently or semi-permanently installed at application manufacture or download/installation) secret. However, a baked-in secret will not necessarily be unique since users often copy the mobile application from device to device. Also it is preferable for the backend service and the mobile device to agree upon a secret key rather than relying upon baked-in secrets since over time even the best tamper resistance can be broken and the secret key will become known. Diversification would provide some help in this context. Diversification of the client application is valuable regardless of any other factors; however, practical considerations often limit the total number of diverse mobile application binaries.

A constraint for many mobile devices is that they are only intermittently connected to a public network. Traditional protocols such as TLS that rely on a network connection in order for the device to obtain a unique personality/identity from the backend cannot be used if there is no network connection.

Embodiments of the systems and methods described herein address some or all of these issues.

Figure 26A:
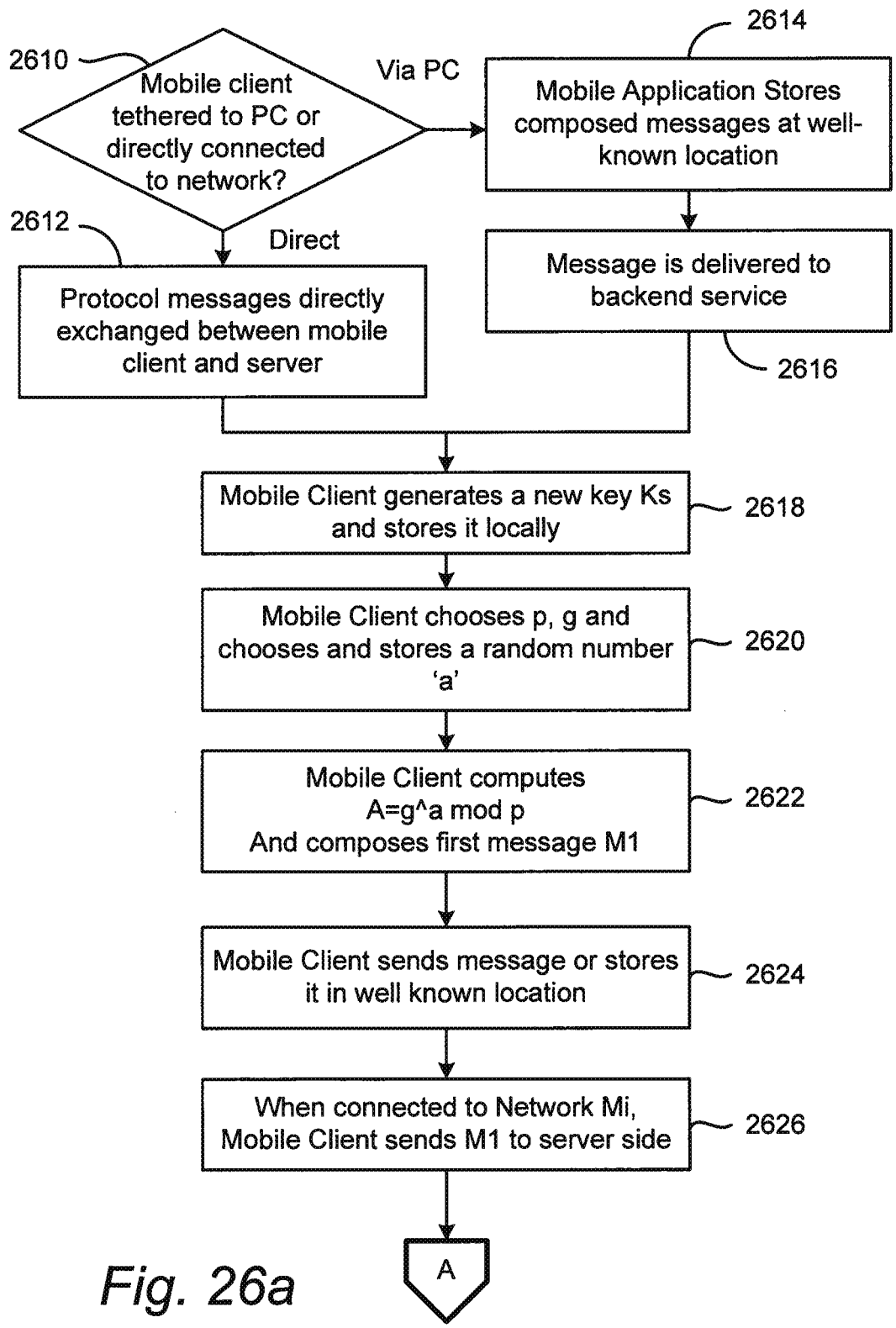
FIGS. 26a and 26b are a flowchart showing steps for a mobile content service to provide a mobile identity and to protect/verify usage data, according to some embodiments.
Figure 26B:
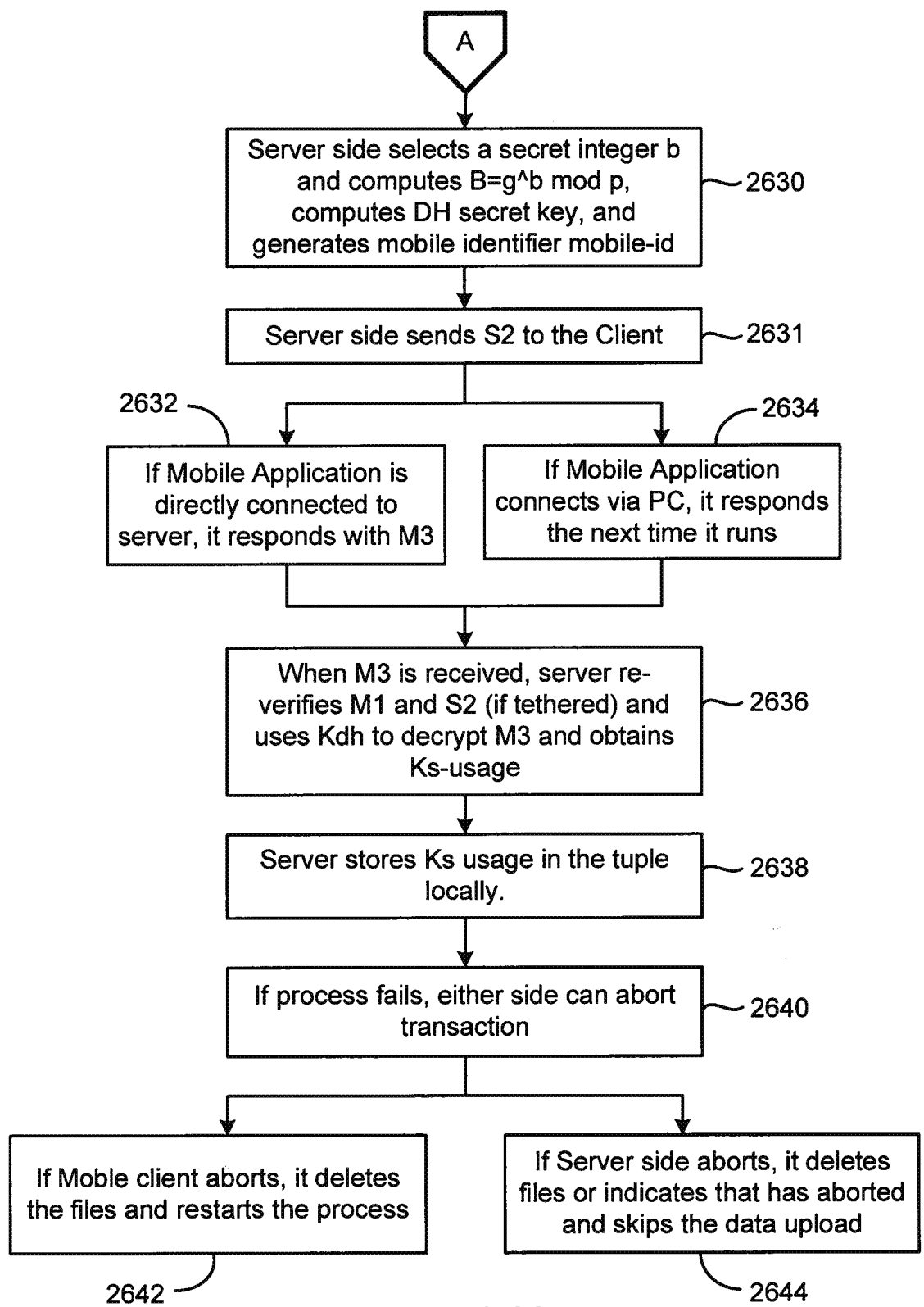

FIGS. 26a and 26b are a flow chart showing steps for a mobile content service to provide an appropriate mobile identity and to protect/verify the usage data, according to some embodiments. The Mobile client is only intermittently connected to a network. In step 2610, the mobile client may be tethered to a PC in a USB mass storage mode or it may be directly connected to a network at the time it gets connected. In step 2614, if the mobile device is tethered to a PC in a mass storage mode, then the mobile application cannot directly talk to servers over the network. In this situation the mobile application will store the composed messages at a well-known location in the mobile device filesystem. In step 2616, the message is delivered to the backend-service on behalf of the mobile device by the PC sync application that runs on the tethering PC the next time the PC-Sync operation occurs. The server's response would be similarly stored in the filesystem of the mobile device. The next time the mobile device runs it would read the server response and would compose a message and store it in the filesystem for the server (to be delivered by the PC Sync application when it occurs the next time). The filesystem location on the mobile device thus acts like a drop box. In step 2612, if the mobile device is capable of and connects to the network directly then the protocol messages could be directly exchanged between the mobile client and the server. In step 2618, the mobile client generates a new key Ks-usage for signing/encrypting the usage data and stores it locally in an encrypted form using the Ks-share which is the baked-in shared secret. Tamper resistance is used to protect the baked-in secrets in the mobile device. In step 2620, the mobile client chooses p, g and chooses a random number 'a'.

It remembers 'a' by storing it in an encrypted form in its own secure storage. In step 2622, the mobile client computes $A=g^a \mod p$; and composes the first message M1 (Client→Server) containing the following:

M1=Enc(Ks-share, nonce |p|g|A|Ks-share-ID|"m1.dat")
Ks-share-ID=id for Ks-share
Nonce=32 bit nonce
p=public key of the personality node baked into the mobile client
g=typically chosen to be 5
a=a random number at least 100 digits long In step 2624, if the mobile client gets connected to the network using the USB mass storage mode, it may not be able to send the message on its own. In this case it will store the composed message in a well-known location on the file system of the mobile device. If the mobile client gets directly connected to the network it could send this message directly to the backend service. In step 2626, when the mobile device is connected to the network M1 is sent to the server side (either by the device itself or by the tethering PC). In step 2630, the server side selects a secret integer b and computes $B=g^b \mod p$. It computes the Diffie Hellman ("DH") secret key using $Kdh=A^b \mod p = (g^a \mod p)^b \mod p = g^{ab} \mod p$. It generates a mobile identifier mobile-id which is either a unique identifier or a group identifier and it then computes the following response S2 which is sent to the Client in step 2631:

data=data-length|mobile-identifier|Enc(Ks-share, nonce|B|"s2.dat")
S2=data|Enc(Kpriv, HMAC(Kdh, data))

The server will also store the (mobile-identifier Kdh, nonce) locally for future use. The usage data (if any) is also uploaded at this time—the data is signed and/or encrypted with Ks-usage. Ks-usage is not known to the server at this time but it will just store the data as having originated from the mobile-identifier.

In step 2632, if the mobile app has directly connected to the server then it can respond to the message with M2. In step 2624, if the mobile device does not directly connect to the network but does so only through being tethered to a connected PC in the mass storage mode, it may not be able to respond to the server right away, but will do so the next time the mobile app runs. At this point it can compute Kdh and verify the data in S2. If the data does not verify it aborts the transaction and the process begins all over again. If the data verifies then it knows it has agreed upon Kdh with the server side. It will compose the third and last message M3 with the following data:

M3=Enc(Kdh, nonce|Ks-usage|mobile-identifier|"m3.dat")

In step 2636, when it receives M3, the server side can re-verify M1, S2 (if it was a tethered device) and check that the values stored (mobile-identifier, Kdh, nonce) match. Next it can use Kdh to decrypt M3 and obtain Ks-usage. In step 2638, it will then store Ks-usage in the tuple locally:

(mobile-identifier, Kdh, nonce, Ks-usage)

At this point the transaction for providing the mobile identity is complete. In step 2640, if the process fails at any point either side can abort the transaction. The transaction can restart the next time the mobile client connects. In step 2642, if Mobile client aborts transaction: It deletes the files (if the messages were stored as files—as in the case of a tethered mobile device) and restarts the process. In step 2644, if the Server side aborts the transaction: It deletes the files (if the messages were stored as files—as in the case of a tethered mobile device OR indicates that it has aborted the transaction to provide the mobile identity to the client if the client directly connects to it) and skips/fails the data upload. The mobile client then begins the process the next time it gets a chance to do so.

The backend-server may choose to use a group-identifier instead of a unique identifier depending on the local cultural requirements. This group identifier may be chosen based on actual data (e.g. geographic region group chosen based on the IP-address of the synchronizing PC/Mobile client) or may be user selected (directly or indirectly based on the user's responses to survey questions or data provided by the user at signing up time).

The user's group-identifier could change over time based on his survey-responses he sends back to the service. It is possible for the server to "downgrade" to a group-identifier from a unique identifier after sampling the user's responses for a period of time to infer the user's classification group. Another scenario is a periodic process of "renewal" of the mobile identity to obtain an assurance that the mobile device continues to be a valid client of the service. In these cases the server can force the client to redo the transaction for obtaining a new mobile identifier. The mobile client will report the old and new mobile identifiers back to the server as part of the usage data to correlate the old identifier with the new identifier. If the mobile device is a mobile phone then it can also send the old/new identifiers back to the service backend via the SMS channel which in addition to correlating these two identifiers also enables the backend-service to associate the IMSI number with a mobile identifier if that is appropriate for the locale.

Thus, a protocol such as that described above can operate within the constraints of an intermittently connected mobile device, even when the mobile client application does not directly connect to the backend service.

Client generates a secret key for signing usage data. In one embodiment, this secret key is never stored in the clear but stored in an encrypted form using a baked-in secret key. The mobile application has tamper resistance applied to it to protect the baked-in secret key.

The Client and the backend service perform a Diffie-Hellman key-exchange to agree upon a key for transmitting the secret key for signing usage data from the mobile client to the backend service. The secret key agreed upon using DH is used to encrypt the secret key while transmitting it to the backend service. In one embodiment, this key is never used again.

The server provides a mobile device identifier on the device as part of the protocol. The server provided identifier is signed with a PKI signature using the private key of the backend service.

The mobile client verifies the PKI signature on the server-provided identifier to ensure that it has obtained the identifier from a trusted service.

The server provides the mobile identity at the same time as it engages in the Diffie Hellman key exchange. This makes it possible to acquire the mobile identity by exchanging three message steps. (Mobile→Server [M1], Server→Mobile[S2], Mobile→Server[M3]).

An approach used for identity/individualization for a mobile client is described herein. In the context of systems and methods such as those described herein above, a mobile client may need to be individualized and provided with a unique identity by the server side. The mobile client can use this identifier to submit usage statistics to the server. For example, an advertisement supported mobile content service may need to provide an assurance to its consumers (advertisers, content providers and aggregators) that the usage statistics it provides are accurate and authentic, and the content service might need to collect usage data using a suitable mobile identifier and the data may need to be signed by the mobile client application (and optionally encrypted). The mobile identifier could be a unique identifier or a group identifier based on cultural mores and local requirements. Embodiments of the systems and methods described herein enable a mobile content service to provide an appropriate mobile identity and to protect/verify the usage data in order to meet these goals.

The following description is organized as follows: (1) Mobile Client Identity—this section describes the attributes that may be used for mobile client identity; (2) Individualization Requirements and Constraints—this section deals with the requirements for individualization and the constraints present on the mobile handset in various embodiments; and (3) Individualization Approach—this section describes the approach to use for individualization in some embodiments.

Table 8 shows various abbreviations used in this detailed description.

TABLE 8

Abbreviations

| | |
|---|---|
| MIDP | Mobile Information Device Profile |
| IMEI | International Mobile Equipment Identity - handset identifier used to identify handsets in GSM and UMTS networks |
| MEID | Mobile Equipment Identifier - globally unique identifier that identifies a mobile device in a CDMA network |
| IMSI | International Mobile Subscriber Identity |
| GSM | Groupe Special Mobile - the prevalent standard for mobile telephony in Europe and most of the world. GSM divides the allocated frequency spectrum into a number of channels (carrier frequencies). Each channel is used in a baseband mode of communication - TDMA is used for transmitting speech channels (8 in full rate 13 kbps and 16 in half rate 5.6 kbps). GSM and CDMA are considered to be $2^{nd}$ generation (2G) Wireless technologies. 1G refers to analog wireless telephony. The term 2.5G is used to refer to GSM networks that have added capability for packet switching in addition to circuit switching for increased capacity. |
| CDMA | Code Division Multiple Access - a spread spectrum based technology from Qualcomm that increases the bandwidth by using a broadband type of communication that uses the entire spectrum. CDMA is less prevalent and is being replaced in parts of the world by GSM [http://en.wikipedia.org/wiki/Comparison_of_mobile_phone_standards] |
| GPRS | General Packet Radio Service - uses a packet switched radio network (2.5G) to send/receive data. Data rates from 56-114 kbps are supported by GPRS |
| EDGE/ Enhanced GPRS | Enhanced Data Rate for GSM Evolution - a bolt on technology for 2G and 2.5G networks that enhances the data rates to 236.8 kbps for four timeslots. EDGE requires base station subsystem upgrades and handsets that are capable of coding/decoding in the new modulation scheme (PSK/8) used for EDGE. EDGE networks are often called 2.75G networks. EDGE is the most commonly deployed wireless networking technology currently in the world. However not all handsets support EDGE. |
| Evolved EDGE | Another set of HW/SW upgrades to EDGE can increase download data rates to 1 Mbps. As of 2008 many network and infrastructure providers have made investments in this area but device manufacturers have not come out with handsets that support this and there are no commercial networks supporting Evolved EDGE. Evolved EDGE is considered to be an alternative to 3G networks. |

TABLE 8-continued

Abbreviations

| | |
|---|---|
| HSPA | High Speed Packet Access - HSPA is part of the 3G standard and uses a different frequency spectrum than 2G networks. HSPA has two existing standards HSDPA (High Speed Downlink Packet Access) which gives up to 14.4 Mbps download speed and HSUPA (High Speed Uplink Packet Access) 5.76 Mbps theoretically but typically of the order of 1 Mbps. Currently the 3G spectrum has not been opened in a number of countries such as India or China |

As used in this detailed description, the term "Individualization" refers to a process of assigning a unique identifier to a mobile handset, and the term "Personalization" refers to a process of assigning a unique DRM personality to a device in a DRM system such as described in the '693 application.

Mobile Client Identity

In preferred embodiments, the server side needs to uniquely identify a mobile handset in order to record usage statistics for each unique handset. In one embodiment, the requirement is only that each handset be uniquely identifiable by the server side. This unique identifier may be obtained by probing the client. The identity could be also be assigned to the handset by the server side or generated using inputs from the client and the server. It is also desirable that the identifier be associated with the IMSI number (as described below).

IMEI

The first place to look for a unique identifier would be the mobile phone itself. This section describes the attributes that can be probed from the environment that is available on the mobile client and which could be used to identify a handset.

In GSM and UMTS networks IMEI or its recent variant IMEI/SV INEI/SV is used to uniquely identify handset hardware. IMEI consists of a 14-digit number followed by a single digit Luhn check digit code as shown in Table 9.

TABLE 9

Luhn check digit codes

| Digits (most significant first) | Purpose for which used |
|---|---|
| 1-2 | Reporting body identifier (centrally assigned numbers, loosely follow the country code) |
| 3-8 | Six digit code assigned to manufacturers by the GSM. The digits 1-8 are known as the Type Allocation Code (TAC) |
| 9-14 | Six digit serial number for the model |
| 15 | Luhn check digit |

IMEI/SV uses a two-digit software version in addition to the 14-digit IMEI. The original purpose for having IMEI was to track and blacklist stolen handsets. However it is possible to burn a different IMEI number in stolen handsets. According to some estimates about 10% of the IMEI numbers are not unique as a result of this.

MEID

CDMA networks use an identifier called MEID which is analogous to the 14 digit IMEI (except that digits are hexadecimal). MEID was created to replace the 32-bit FCC ESN codes which are close to being exhausted.

Probing IMEI/MEID via J2ME

IMEI/MEID numbers can be probed on a mobile phone using system properties. Unfortunately not all phones support the properties and the name of the property varies across handsets manufactured by different manufacturers. Examples are shown in Table 10.

TABLE 10

System Property for IMEI

| Manufacturer | System Property for IMEI |
|---|---|
| Nokia | phone.imei (older handsets) |
| | com.nokia.IMEI (newer handsets) |
| Sony-Ericsson | com.sonyericsson.imei |
| Motorola | com.motorola.IMEI |
| Samsung | com.samsung.imei |
| Siemens | com.siemens.imei |

Nokia has been slow to support this property. On the S40 platform this property is available only if the application is signed by the Manufacturer/Operator. On the S60 no special signing is required but the property is only supported on S60 $3^{rd}$ Edition devices. For example, see, http://wiki.forum.nokia.com/index.php/How_to_get_IMEI_in_Java_ME.

In conclusion IMEI/MEID is not uniformly available and is not guaranteed to be unique. Therefore a mobile phone client cannot depend on using IMEI/MEID for mobile client identity although it could be part of a "fuzzy identifier"

IMSI

IMSI can be useful for identity since it identifies a mobile consumer most closely. IMSI consists of: (1) Mobile Country Code (MCC); (2) Mobile Network Code (MNC); and (3) And Mobile Subscriber Identification Number (MSIN).

In GSM networks the IMSI is linked to the SIM card and goes with the subscriber even when the handset is changed. With mobile phone number portability the IMSI number has become a more "sticky" identifier that identifies the mobile consumer very closely.

The counter example is the usage of prepaid SIM cards. Users of these SIM cards tend to discard the SIM card once the minutes are used up and activate new SIM cards. In this type of usage scenario users do not mind the inconvenience of a changing phone number. This type of usage is thought to be much less frequent and IMSI is by and large a very good identifier for mobile consumers.

Individualization Requirements and Constraints

Further detail will now be provided of mobile client individualization and some constraints that may be encountered on the mobile phone platform.

Limited/Undependable Network Connectivity

By definition CLDC implies limited connectivity. In practice network connectivity is even more challenging. Currently Internet connectivity for mobile phones is limited, slow, undependable and often expensive.

Data Connectivity via Carrier's Radio Network

Data connectivity via a carrier's radio network is often slow (typically 56 Kbps for GPRS) and this can go up to ~236.8 Kbps for EDGE (although fewer handsets support EDGE).

Data connectivity through a carrier's radio network can be expensive. Many consumers do not have a data plan because of this reason. Prices have not fallen as much in markets where competition is less and subscriber churn is limited due to service contracts. Another factor is that the access to the Internet is via the carrier's WAP gateway which effectively makes it a walled garden.

High speed 3G networks are currently at least a year or two away in markets like India. Because of these reasons data connectivity via a carrier's radio network cannot be assumed to be present for a mobile device. Where present it is likely to be very slow and controlled to some extent by carriers.

WLAN Connectivity

WLAN connectivity via Wi-Fi or Wi-Fi with WiMAX interconnectivity between wireless hotspots could be another option for wireless devices. A problem with WLAN connectivity for mobile phones is that it is not available everywhere and not all handsets have radios that support WLAN connectivity. Using a WLAN connection typically requires the user to enter a passkey/passcode and this can be difficult on a typical phone keypad, although many phones allow you to store the connection information so that one does not need to enter it repeatedly. However if one is mobile and moving between many hotspots this can be cumbersome to use unless there is a municipal Wi-Fi network that covers the entire locality with the same passkey everywhere.

Impact on Individualization/Personalization

In summary, given current technology, the individualization of the mobile client preferably needs to happen when the mobile client is tethered to the PC as mobile network connectivity is very limited/undependable.

In some DRM systems, the client is pre-personalized/pre-registered because it may never be connected directly to a network. This is typically done using personality node (P)+service-user node (U)+P→U link that is baked in into the client application. DRM licenses will be bound and targeted to the service-user node. After the client application is installed it needs to be individualized.

Limited Secure Storage

Secure storage is typically one of the requirements of a DRM client. A DRM client often requires a secure storage to store secrets.

Storage can be secured by encrypting it (especially if it is stored in a public location). Having a private storage location that is only accessible to the application is more preferable because it cannot be obtained by running the code in a debugger or in a virtual machine. If the private location cannot be accessed without tampering physically with the device and on-device debugging is not possible then this is a reasonably secure solution.

Two possibilities for secure storage for J2ME application clients are:

1. Private location in the filesystem: Each MIDP application has access to a private location in the filesystem pointed by the system property—"fileconn.dir.private". However this property is not supported uniformly across all devices. For example S60 devices support this property but S40 devices do not support it. Vendor support for this property needs to be identified by manufacturer/model. Also on certain phones (e.g., Sony Ericsson) the filesystem location is not "private" but seen by a USB host when the mobile phone is mounted in the USB mass storage mode. Hence this may not be a very viable option for mobile phones.

2. Private Record Store using the RMS (Record Management System): RMS is currently believed to be supported on all MIDP phones. The records are stored in a binary format that is proprietary to each manufacturer. J2ME apps are signed and they are identified by the (signed) hash which is unique for each application. The J2ME JVM only permits the J2ME app to access Record Stores that it creates and marks as private. To break into RMS the attacker would need to circumvent JVM security and/or locate and decode the binary RMS data. Hence using the private record store should be reasonably secure. RMS is widely available and could be suitable for use as a secure storage. However as per the MIDP specification implementations are only required to provide a minimum of 8 Kbytes of RMS storage. Thus RMS storage is likely to be very limited on some devices.

Diversified (not globally unique) Client

One approach to deal with individualization could be to assign a unique personality node to each application binary that gets installed. This may not be practical in many situations, however, as it would typically require the server side to compile a very large number of client application binaries. Also users often copy binaries from handset to handset and relying on the baked in personality for a unique identifier may not be sufficient. Thus, in some preferred embodiments, the client application is diversified but not globally unique.

SMS is secure but short

The SMS return channel is a secure path with a guaranteed delivery (within certain limitations). However the payload size for an SMS PDU is very short (140 8-bit bytes). Multi-part messages are possible, but SMS incurs cost to the user and should preferably be used relatively sparingly.

Either Client Sync or App Run May Occur First

The mobile client may be run either before or after the first PC-sync operation. What this implies is that the individualization protocol should work irrespective of what event happens first. The sequence could be either:

1)
Mobile client runs
First PC Sync
Mobile client runs
. . .
or
2)
First PC Sync
Mobile Client runs
Second PC Sync
. . .

Usage Data Reporting Requirement

The client application will typically need to ensure that the usage data reported back to the server is authentic and accurate. In one embodiment, the client is pre-personalized. However, in preferred embodiments these baked-in personalities alone are not used to encrypt or sign the usage data.

Individualization Approach

In some embodiments, each client comes with a baked-in shared personalization secret. This shared personalization secret is used to bootstrap the client into a personalized client. Once personalization happens the client gets a unique personality. Each client can then acquire nodes, links, and licenses. Licenses are bound and/or targeted to the acquired personality/user nodes.

The personalization protocol uses session keys and only uses the secret key to encrypt the session keys to minimize plain-text and cipher-text attacks to obtain the secret key. It also uses a nonce to prevent message alteration attacks. The shared secret is diversified so that reverse engineering of a client will not prevent all the clients from being personalized (only a group of clients will be affected due to "blacklisting"). In practice though, detecting that a particular shared secret was compromised because of the reverse engineering of the client would be typically very hard to determine and blacklisting some un-personalized clients would be difficult.

Preferred embodiments of the client application described herein above will typically need to be pre-personalized with a fixed (but diversified) set of personality nodes and a single common user node (the service node). The licenses in the content are bound and targeted to the service node. The con troller in the DRM license is signed using PKI by the license server. The client application verifies this signature and uses the metering obligations in the license to meter the usage. The PKI signature ensures that the client meters what the server asked it to meter.

The client application also typically needs to ensure that the usage data it reports back is authentic and accurate. For example, in preferred embodiments it needs to use a different key to sign/encrypt the data than the baked in ones which are similar in position to the shared secret in traditional personalization.

In a preferred embodiment, the approach used for the individualization protocol is: (1) Do not use baked in secrets for signing/encryption of usage data; (2) Generate signing key on client and store it in secure storage (running the app outside the device will not have access to the secret key); (3) Use DH Key exchange with server authentication for agreeing upon a secret DH key which is used to send the signing key to the server; and (4) The server generates a GUID and plants it on the client as part of the DH exchange.

DH Key Exchange with Server Authentication

The client application and the server side will be able to agree on a shared secret key via a Diffie Hellman key exchange.

Mobile Client Runs First

Figure 27:
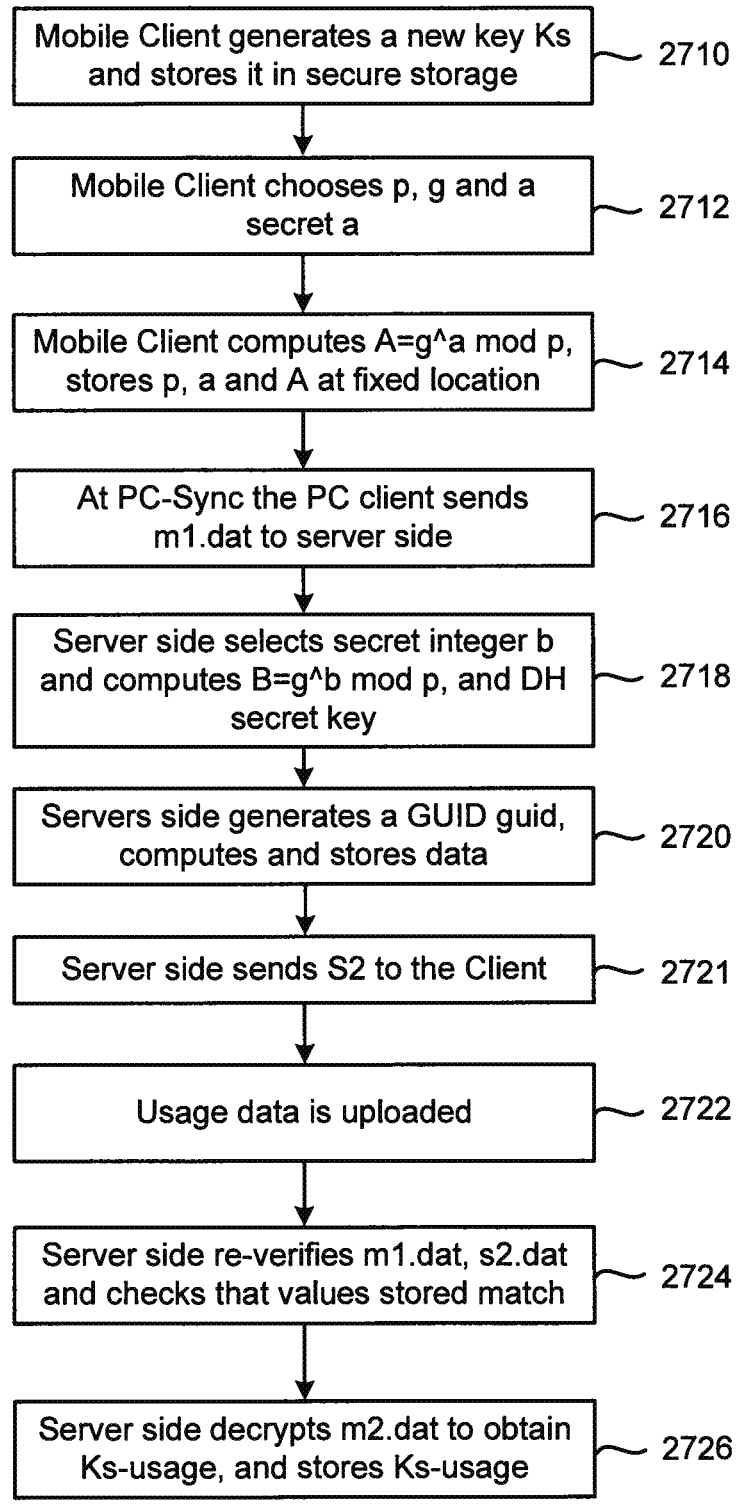
FIG. 27 is another flowchart showing steps for a mobile content service to provide a mobile identity and to protect/verify usage data, according to some embodiments.

FIG. 27 is a flow chart showing steps for a mobile content service to provide an appropriate mobile identity and to protect/verify the usage data, according to some embodiments. In particular, FIG. 27 shows steps in the case where the mobile client runs before the first sync the following happens. In step 2710, the mobile client generates a new key Ks-usage for signing/encrypting the usage data and stores the following in the secure storage:

Enc(Ks-share, 4 bytes to store random-length|random-bytes|Ks-usage)

Where Enc means Encryption using AES CBC mode

Ks-share is the Scuba Sharing Symmetric key for the 8 pus personality node random-length is the length of the random bytes (between 0 and 16 bytes)

random-bytes is an array of random bytes random-length long

Note that in some cases it may be useful to store the fuzzy fingerprint parameters here. According to one embodiment, the hash(FP params) is conveyed to the server and to include it in signature computation for usage data. This is used to provide some assurance that the same client that was involved in the individualization was the one that generated the usage data.

In step 2712, the mobile client chooses p, g and chooses a secret al. In step 2714, the mobile client computes $A=g^a \bmod p$; and stores p, g and A on a fixed location in the filesystem (m1.dat) containing the following:

Enc(Ks-share, nonce |p|g|A|Ks-share-ID|"m1.dat")

Ks-share-ID—id for Ks-share

Nonce=32 bit nonce

It will also store the same value in the secure storage. In step 2716, at PC-Sync the PC client sends the m1.dat to the server side. In step 2718, the server side selects a secret integer b and computes $B=g^b \bmod p$. It computes the DH secret key using $Kdh=A^b \bmod p=(g^a \bmod p)^b \bmod p=g^{ab} \bmod p$. In step 2720, the server side generates a GUID guid and it then computes the following, which is sent to the client as S2, in step 2721:

data=data-length|guid|Enc(Ks-share, nonce|B|"s2.dat")

and stores the following in s2.dat data|Enc(Kpriv, HMAC(Kdh, data))

The server will also store (guid, Kdh, nonce) for future use. In step 2722, the usage data (if any) is uploaded—the data is signed and/or encrypted with Ks-usage. Ks-usage is not known to the server at this time but it will just store the data for the guid. The next time the mobile app runs it can compute Kdh and verify the data in s2.dat. If the data does not verify it deletes m1.dat, s2.dat and the process begins all over again. If the data verifies then it knows it has agreed upon Kdh with the server side. It will store m3.dat with the following data:

Enc(Kdh, nonce|Ks-usage X|guid|"m3.dat")

At the next PC-Sync time, in step 2724, the server side can re-verify m1.dat, s2.dat and check that the values stored (guid, Kdh, nonce) match. Next, in step 2726, it can use Kdh to decrypt m2.dat and obtain Ks-usage. It will then store Ks-usage in the tuple (guid, Kdh, nonce, Ks-usage)

At this point the individualization process is complete. If the process fails at any point the following happens: (1) if mobile client aborts transaction: It deletes the files and restarts the process; and (2) if merver side aborts the transaction: It deletes the files and skips the data upload. The mobile client begins the process the next time it runs.

PC Sync Happens First

If PC Sync happens first, there is no usage data to upload and nothing happens. The process starts when the mobile app is run the first time.

Usage Data Signing/Encryption

Usage data would be signed using the Ks-usage and the signature would be encrypted using Ks-share in each data payload. During sync the PC client posts (m1.dat, s2.dat, m2.dat and usage data). The data could be verified and accepted after verification (offline not synchronously during data upload). In some embodiments the usage data may be encrypted.

Renewal

Server could force the re-individualization by deleting the cookies (m1.dat, s2.dat, m3.dat) if the Kdh or Ks-usage was compromised for any reason or periodically just as a part of the standard operating procedure.

In some embodiments, a call home message could be forced at renewal. In other embodiments, if the old guid is linked with the new one—and the renewal was a periodic renewal (not because the keys were compromised), we could skip the call home message.

Reverse Engineering of Client

The reverse engineering of clients and the disclosure of the secret keys can be fairly hard to detect.

A compromised client could be used to clone a client that submits junk data to the server side. To guard against this possibility, sanity checks could be performed on the uploaded data and compromised clients could be either forced to renew and/or the data could be ignored. The compromised clients could also be shunned (e.g., no content updates are given to compromised clients).

IMSI to GUID correlation (Call Home Message)

After the individualization procedure is completed the client application could send an SMS message to the server side (Call Home Message) containing the GUID and a maybe a hash of the fuzzy fingerprint parameters. The envelope information of the SMS message can be used to correlate the IMSI number to the GUID.

If we get demographic or other data about the subscriber from other sources in which subscribers would likely be identified using the IMSI then we could use the correlation between IMSI and GUID to correlate the usage data with the demographic data and draw better inferences/target advertisements better.

Governance Model.

An example will now be described for a governance model. A content item contains a DRM license that includes usage rules, which specify what usage data is to be collected. For example, usage rules can include: (1) what events must be recorded; (2) whether to show a survey to a user or not; and (3) how often must the data be sent back.

The client follows the governance model—it respects the rights and obligations specified in the DRM license. The mobile client signs the collected usage data and protects the integrity of this data. The data is sent back at the earliest opportunity. This can happen in two ways: (1) at PC-Sync time: When a user syncs up his mobile phone with a PC, this usage data is transmitted back to the Service Backend. The data could be optionally encrypted for privacy; and (2) alternatively the data may be sent back over SMS channel (if the user remains offline for a period longer than the one specified in the obligation for reporting the usage data back). The SMS channel could be considered a private channel and may not require encryption.

Figure 28:
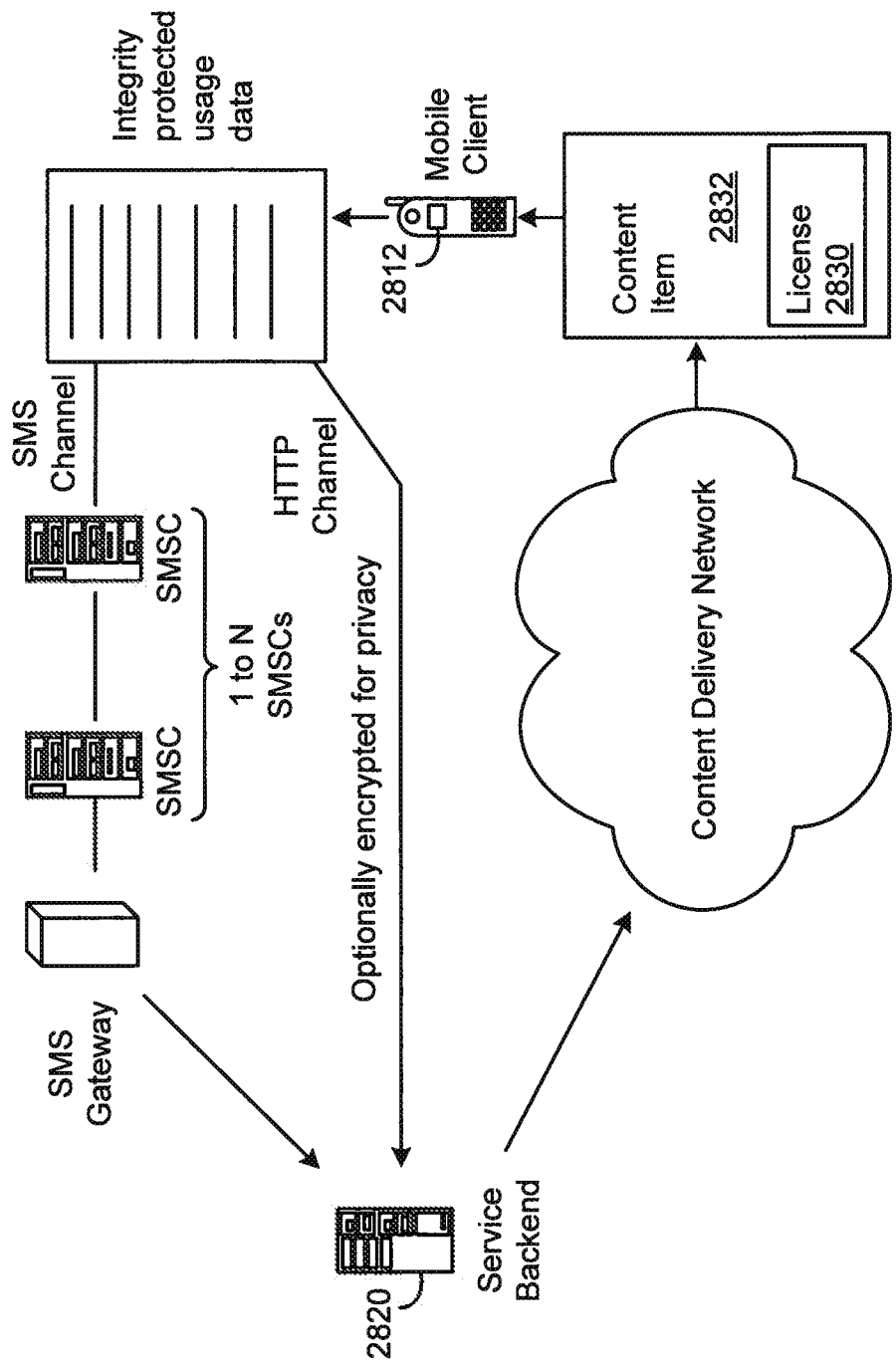
FIG. 28 shows the layout of a system for tracking the behavior of mobile consumers, according to some embodiments.

FIG. 28 shows the layout of a system for tracking the behavior of mobile consumers, according to some embodiments. Unlike WAP portal based data collection, the described system tracks the behavior of mobile consumers as they consume content on the go. Unlike SMS spamming an accurate and authentic usage data is provided that is actually measured on the client.

The system records events that capture a user's interaction with the content item. A metering system measures Play/Stop events to meter a user's content consumption data. A conventional application of metering is a service that charges the user based on the metered content usage. On the other hand, the present system is concerned with measuring and tracking not only the content consumption but also the user's interest in the content item. A user's interaction with the content item is one of the best indicators of the user's interest.

In order to track the user's interests and behavior higher-level player events are recorded by the mobile client. Some examples of these events are: (1) User Clicked on a banner-advertisement; (2) User Skipped Forward/Skipped Back part of the content/advertisement; (3) User Voted for a content item; (4) User responded to a Survey associated with a content item or advertisement with respond X/User skipped the survey entirely; (5) End of Media (User saw the entire content item).

ESB Structure.

The present system uses an obligations framework such as that described in the '693 application to specify what events must be recorded by the client. The client receives these obligations as part of an ESB (Extended Status Block) when it evaluates the license 2830 embedded in the content item 2832. Example of ESB in pseudo code:

```
extendedStatusBlock EsbOK =
esb{
    globalFlags = 0;
    esbCategory = ACTION_GRANTED;
    esbSubCategory = 0;
    localFlags = OBLIGATION_NOTICE | ...
    cacheDuration
    valueList = {
        Obligations = valueList {
        }
    }
}
```

TABLE 11

| Name | Type | Description | | | |
|---|---|---|---|---|---|
| urn:marlin:bluefin:data-collection | ValueList | Type | Description | | |
| | | Integer | Version - currently zero | | |
| | | Integer | Flags - extension flags currently zero. Flags may be used in future to extend the events to be recorded | | |
| | | Integer | ReportingInterval - interval for reporting the usage data back to the server (in seconds) | | |
| | | Integer | EventList - a bit-field that indicates what events are to be recorded | | |
| | | | Bit Index (0 is LSB) | Name | Description |
| | | | 0 | EVENT_TYPE_START | Record when a user starts playback |
| | | | 1 | EVENT_TYPE_STOP | Record when a user stopped playback |
| | | | 2 | EVENT_TYPE_PAUSE | Record when the user paused the playback |
| | | | 3 | EVENT_TYPE_CLICK | Record when user clicked on a banner advertisement |
| | | | 4 | EVENT_TYPE_SKIP_BACK | Record when user skipped back in the content item |
| | | | 5 | EVENT_TYPE_SKIP_FORWARD | Record when skipped forward in the content item |
| | | | 6 | EVENT_TYPE_VOTE | Record when a user votes for the content item (in addition to directly submitting the vote via SMS) |
| | | | 7 | EVENT_TYPE_SURVEY | Show the survey event when this flag is set to the user and record the user's response (if any) or a user no-response status if the user does not respond |
| | | | 8 | EVENT_TYPE_END_OF_MEDIA | Record when a user completely views a content item |

Data Collection and Delivery Framework

HTTP Channel—

Referring to FIG. 28, the mobile client 2812 records usage data to the local filesystem on the mobile handset. This data is cryptographically signed (integrity protected) by the mobile client. At the time of content download to the mobile client either via PC Sync or via direct OTA (Over the Air) download this data is transmitted to the service backend 2820 via HTTP POST The mobile client 2812 (or the PC acting on behalf of the mobile client) may optionally encrypt this data to protect privacy of the data during transit.

SMS Channel—

Alternatively the data may be sent via SMS to the service backend 2820. SMS is ubiquitous and the mobile client 2812 can always use SMS, however there is often a cost associated with sending SMS messages. Hence the mobile client tries to use HTTP whenever possible but will use SMS if the client remains offline (not connected to a wireless internet, and not sync'd with the PC) for a period longer than the reporting interval specified in the data collection obligation specified in the license 2830. SMS has limitations on the message size—the SMS PDU cannot exceed 140 bytes. The usage data may be segmented if it exceeds the limit. The data is compressed before sending it via the SMS channel to reduce the SMS usage.

Use of the Service Backend to Target Advertisements.

The usage data collected by the system is analyzed offline using statistical data mining and analysis techniques. Mobile users may be classified into categories using the analysis. A user may belong to more than one category and can have varying degrees of affinity to each of the categories to which it belongs. A user may also submit demographic data to the system to be included in some self-selected category. Demographic data (either from public sources or from partner companies) may also be submitted to the service backend 2820 in order to better target advertisements to users who might be interested in the products and services advertised. The service backend 2820 makes use of the inferred categories and demographic data to serve advertisements that are targeted to that category or demographic group/

Location Sensitive/Time of Day Sensitive Targeted Local-Ad Delivery.

Figure 29:
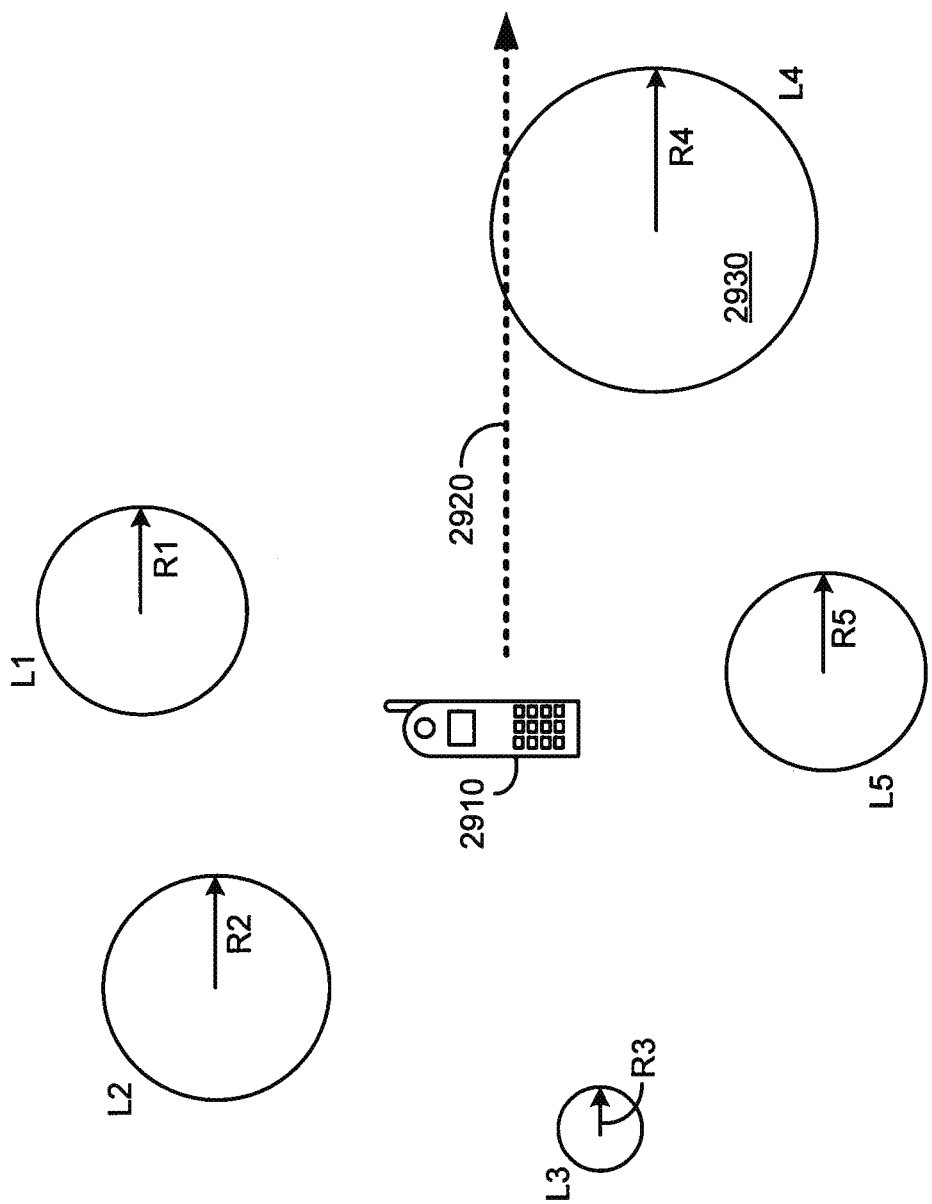
FIG. 29 is a diagram illustrating locations corresponding to location-sensitive ads for a target user for a particular time of day, according to some embodiments.

The described system enables advertisers to place location sensitive advertisements. FIG. 29 is a diagram illustrating locations corresponding to location sensitive ads for a target user for a particular time of day, according to some embodiments. A location sensitive advertisement, for example L4, is attached to a geographical location (GPS coordinates) and a region of activation (radius from the GPS coordinates, for example R4). The advertisement is presented to the mobile user 2910 when the mobile user comes within the region of activation, for example 2930 for L4 having radius R4. Arrow 2920 represents the path of the mobile user 2910. In the example shown in FIG. 29, there are also regions of activation associated with location sensitive ads L1, L2, L3, and L5 having radii R1, R2, R3 and R5 respectively.

Presenting a location sensitive advertisement to a user when the user is in the area of activation is very timely and effective because the user can make use of this information in his immediate neighbourhood at the time that it is presented.

As an example of location sensitive advertisements consider an advertiser who wishes to place a promotional advertisement (such as a coupon) with the described system. The system enables an advertiser to submit promotional advertisement material and to associate it with one or more geographical locations (these could be store locations). According to some embodiments, the system also allows the advertisement to be associated with a time window for presentation (time of day). The advertisement can also be targeted to a particular target group as is the case with all advertisements in the described systems.

When the user in the target group (who is likely to be interested in the promotional advertisement) is within the region of activation during the time window the promotional advertisement is presented to the user as a pop-up. The timeliness of the advertisement and its location sensitivity and the relevance of the promotional message to the target user together produce an increase in the effectiveness of the advertisement.

The advertisement in the example could be a coupon for a pizzeria to be shown around lunchtime that is tied to GPS coordinates of the pizzeria locations in the vicinity of the user. When the target user comes within the region of activation, he is shown the promotional advertisement which is very likely to be relevant to the user and can result in a greater chance of a sale (better ad-to-sale realization rate for the advertisement which makes this a valuable mechanism for advertising)

Different mobile phone platforms provide application programming interfaces (APIs) for applications to enable the system to callback the application when the mobile device is within a certain radius of the location. For example the J2ME platform provides Java binding for the API. An example of the use of the API is given in the following code:

1. Additional Information is specified for each advertisement that is attached to a location:

```
public LocationAdEntry(double lattitude,
        double longitude,
        float accuracy,
        int     adNumber,
        int     timeOfDay,
        String adFeed,
        String adInfo) {
    this.lattitude = latitude;
    this.longitude = longitude;
    this.accuracy = accuracy;
    this.timeOfDay = timeOfDay;
    this.adNumber = adNumber;
    this.adFeed = adFeed;
    this.adInfo = adInfo;
    this.doNotShow = false;
}
```

2. A location listener is added to listen for user location events for each location:

```
private void addLocationAdProximityListener(LocationProvider lp,
LocationAdEntry entry) {
    if (null != lp) {
        Coordinates coords = new Coordinates(entry.lattitude,
                    entry.longitude,
                    Float.NaN);
        try {
            LocationProvider.addProximityListener(this, coords,
            entry.accuracy);
        } catch (Exception ex) {
            TraceLogger.out.println("adding proximity listener failed! -" +
ex.getMessage( ));
            ex.printStackTrace( );
        }
    }
}
```

3. When the location event occurs the application shows the location sensitive advertisement:

```
private void handleProximityEvent(Coordinates coords) {
    double lattitude = coords.getLatitude( );
    double longitude = coords.getLongitude( );
    TraceLogger.out.println("PE: Lattitude =" + lattitude);
    TraceLogger.out.println("PE: Longitude =" + longitude);
    LocationAdEntry entry = getLocationAdEntry(lattitude, longitude);
    if (isTimeOfDayForAdvertisement(entry)) {
        displayLocationSensitiveAd( );
    }
}
```

Tracking Relatedness of Mobile Users.

The mobile client application enables users to share the mobile client application with their friends by forwarding the application while they are using it via SMS. Users can also share and recommend content items that they like using this mechanism. The ability to share and enjoy a content item with friends and peers makes the user experience much more interactive and enjoyable to users.

Viral distribution of content from user to user is an attractive mechanism for content providers who wish to achieve a wide dissemination of their content. This form of distribution is also useful for advertisers as they can potentially reach a wider audience for their marketing messages via this mechanism.

While users make use of this feature the system keeps track of the forwarding behavior and infers the relatedness of users based on their application/content forwarding behavior. These inferences are used to recommend content items that may be interesting to users as well as to target advertisements to users who share similar interests and preferences as regards to the content they consume.

The inferred relationships between users can be further classified and qualified by the categories of the content items that they share and recommend. The system reduces the inferred relationship to a measure called "user affinity" which is a numeric measure that quantifies the strength of the inferred relationship. As users forward more and more content of the same type to the same recipient the affinity grows stronger. As more time elapses between the forwarding events the affinity between users grows weaker.

For example, a simple measure of affinity is computed as follows: raw affinity value=number of items x effectiveness index/(average time elapsed between forwarding events in days).

According to some embodiments, the raw affinity value is normalized to a range between 0 and 100 for easy comparison based on the range of values for a particular category of content. According to some further embodiments, the affinity measurement is further refined by taking into account more variables such as the distribution of the time elapsed between forwarding events, time of day for forwarding behaviors etc.

The effectiveness index is a measure of how effective the inferred relationship was in targeting advertisements (measured indirectly from statistical data analysis of users' responses to similar advertisements). Better measures of affinity can be developed by statistical data analysis techniques on data collected over a longer time period.

Figure 30:
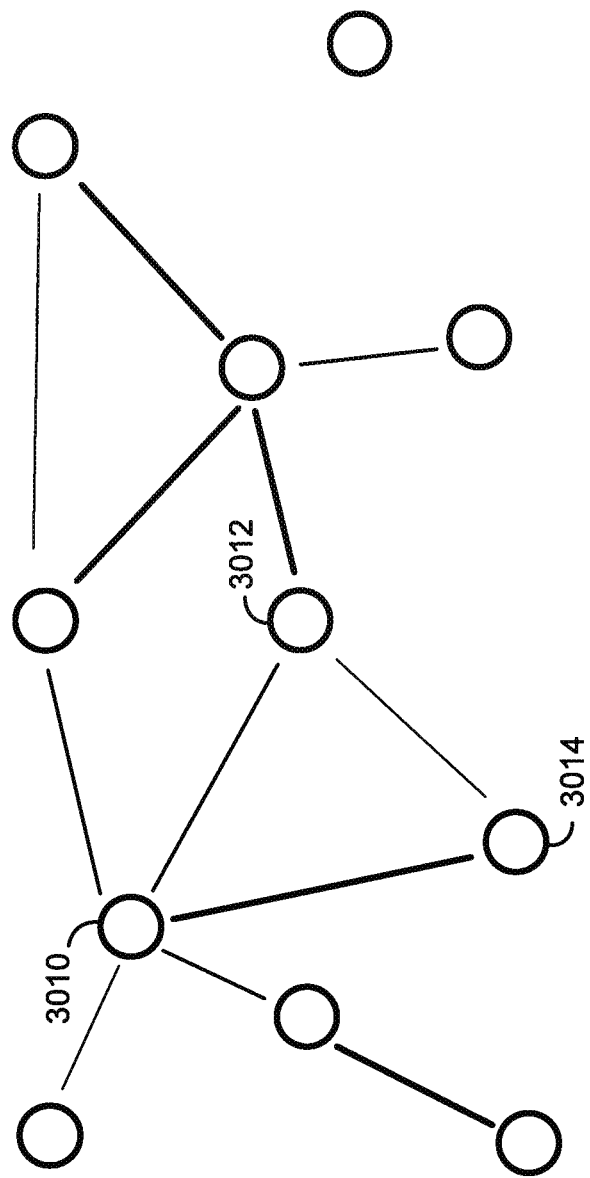
FIG. 30 is a diagram showing inferred relationships between users.

FIG. 30 is a diagram showing inferred relationships between users. The users, for example users 3010, 3012 and 3014 are indicated by circles. The inferred relationships between the users are represented by the connecting lines. The thickness of the connecting lines indicates the affinity of the relationship. For example, the affinity of the relationship between user 3010 and 3014 is relatively strong, and the affinity of the relationship between user 3012 and 3014 is relatively weak.

Keeping track of application and content forwarding behaviors is useful because it enables the system to better understand the tastes and preferences of the user base. It enables the system to better target the advertisements and recommendations by correlating the user preferences to user relatedness.

Figure 31:
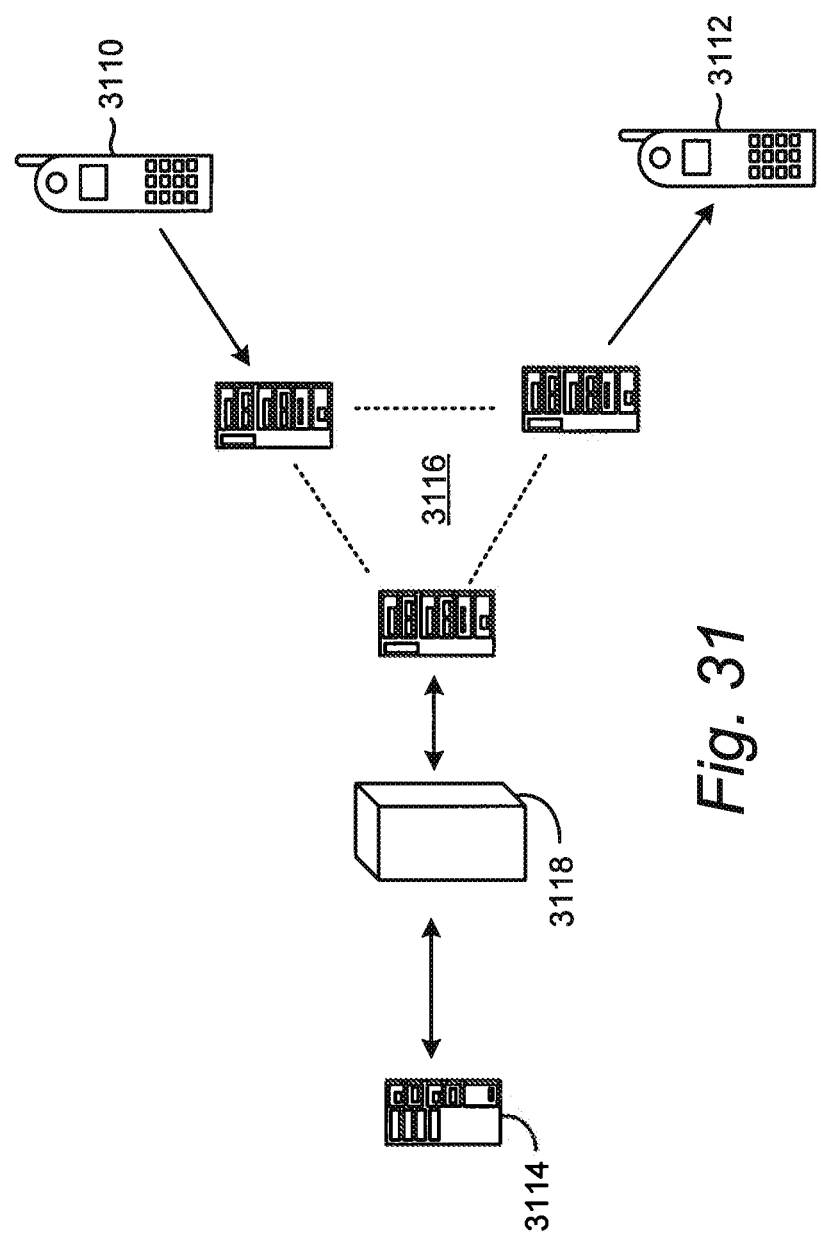
FIG. 31 is a diagram illustrating SMS message routing of a shared or recommended application or content between users, according to some embodiments.

FIG. 31 is a diagram illustrating SMS message routing of a shared or recommended application or content between users, according to some embodiments. User 3110 shares/recommends the application and/or content with one of his friends User 3112 via SMS through the described mobile client application. The SMS message is sent to the short code for the service backend by the application with context information (application version, client attributes probed from the handset, phone number of the buddy, content id etc).

The SMS message is routed by the SMS Data Network 3116 and the SMS Gateway 3118 to the service backend 3114. The backend 3114 records who has forwarded the content to whom and the context information before composing and sending out an SMS message to the intended recipient informing him that his friend has recommended the application/content item to him. The SMS message travels via the SMS gateway 3118 and the SMS Data Network 3116 to the recipient user 3112.

According to some embodiments, the SMS message also contains a URL for OTA (Over the air) download of the mobile client. The recipient can click on this URL and download the mobile client to his handset. The application may also contain a teaser or abbreviated version of the recommended content item.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive, and the inventive body of work is not to be limited to the details given herein, which may be modified within the scope and equivalents of the appended claims

What is claimed is:

1. A server system for collecting usage statistics and recommending targeted advertisements to a user of a mobile telecommunications device, the system comprising one or more processors adapted and programmed to:

receive usage statistics signed with a secret key from the user's mobile telecommunications device by tracking content usage of the user in accordance with a license associated with at least one piece of electronic content, wherein the license is configured to be enforced by a digital rights management engine running on the mobile telecommunications device, wherein the license comprises obligations that represent operations that the mobile telecommunications device must perform when use of the electronic content is requested, and wherein the usage statistics include one or more types of events selected from the group consisting of: how many times advertisement is played, play/stop events, clicking on an advertisement, skipping forward and/or skipping back part of a content item or advertisement, voting for a content item, responding to a survey associated with a content item or advertisement with certain response, skipping a survey entirely, a content item was presented in its entirety, and application and/or content forwarding behaviors;

verify that the usage statistics signed with the secret key were received from the user's mobile telecommunications device;

classify, according to the usage statistics, the user of the mobile telecommunications device into one or more categories with varying degrees of affinity; and recommend targeted advertisements for products and/or services based in part on the one or more categories into which the user of the mobile telecommunications device is classified.

2. The system of claim 1, wherein recommending targeted advertisements is based in part upon one or more criteria chosen from the group consisting of: geographic location of the mobile telecommunications device, time of day, and demographic information of the user of the telecommunications device.

3. The system of claim 1, wherein the one or more processors are further adapted and programmed to transmit a mobile device identifier to a first mobile telecommunications device and verify that received usage statistics originated from the first mobile telecommunications device based at least in part on an association of the mobile device identifier and the received usage statistics.

4. The system of claim 1, wherein the mobile telecommunications device is only intermittently in communication with the server system.

5. A method for recommending targeted advertisements to a user of a mobile telecommunications device comprising:

receiving usage statistics signed with a secret key from the user's mobile telecommunications device by tracking content usage of the user in accordance with a license associated with at least one piece of electronic content, wherein the license is configured to be enforced by a digital rights management engine running on the mobile telecommunications device, wherein the license comprises obligations that represent operations that the mobile telecommunications device must perform when use of the electronic content is requested, and wherein the usage statistics include one or more types of events selected from the group consisting of: how many times advertisement is played, play/stop events, clicking on an advertisement, skipping forward and/or skipping back part of a content item or advertisement, voting for a content item, responding to a survey associated with a content item or advertisement with certain response, skipping a survey entirely, a content item was presented in its entirety, and application and/or content forwarding behaviors;

verifying that the usage statistics signed with the secret key were received from the user's mobile telecommunications device;

classifying, according to the usage statistics, the user of the mobile telecommunications device into one or more categories with varying degrees of affinity; and generating recommendations for targeted advertisements for products and/or services based in part on the one or more categories into which the user of the mobile telecommunications device is classified; and transmitting the recommendations to the mobile telecommunications device.

6. The method of claim 5, wherein the recommendations are further based in part on one or more criteria chosen from the group consisting of: geographic location of the mobile telecommunications device, time of day, and demographic information of the user of the telecommunications device.

7. The method of claim 5, further comprising:

transmitting a mobile device identifier to a first mobile telecommunications device; and verifying that certain received usage statistics originate from the first mobile telecommunications device based at least in part on an association of the mobile device identifier and the certain received usage statistics.

8. The method of claim 5, wherein the mobile telecommunications device is only intermittently in communication with the server system.

9. A method for identifying a mobile telecommunications device for purposes of collecting usage statistics and recommending targeted advertising comprising:

transmitting a mobile device identifier from the server system to the mobile telecommunications device;

receiving usage statistics signed with a secret key from the user's mobile telecommunications device by tracking content usage of the user in accordance with a license associated with at least one piece of electronic content,
  wherein the license is configured to be enforced by a digital rights management engine running on the mobile telecommunications device,
  wherein the license comprises obligations that represent operations that the mobile telecommunications device must perform when use of the electronic content is requested, and
  wherein the usage statistics include one or more types of events selected from the group consisting of: how many times advertisement is played, play/stop events, clicking on an advertisement, skipping forward and/or skipping back part of a content item or advertisement, voting for a content item, responding to a survey associated with a content item or advertisement with certain response, skipping a survey entirely, a content item was presented in its entirety, and application and/or content forwarding behaviors;

verifying that the received usage statistics originated from the mobile telecommunications device based at least in part on an association of the mobile device identifier, the secret key, and the received usage statistics;

classifying, according to the usage statistics, the user of the mobile telecommunications device into one or more categories with varying degrees of affinity;

generating recommendations for targeted advertisements for products and/or services based in part on the one or more categories into which the user of the mobile telecommunications device is classified; and transmitting the recommendations to the mobile telecommunications device.

10. A server system for collecting usage statistics from a mobile telecommunications device comprising one or more processors adapted and programmed to:

transmit a mobile device identifier to a mobile telecommunications device;

receive usage statistics signed with a secret key from the user's mobile telecommunications device by tracking content usage of the user in accordance with a license associated with at least one piece of electronic content,
  wherein the license is configured to be enforced by a digital rights management engine running on the mobile telecommunications device,
  wherein the license comprises obligations that represent operations that the mobile telecommunications device must perform when use of the electronic content is requested, and
  wherein the usage statistics include one or more types of events selected from the group consisting of: how many times advertisement is played, play/stop events, clicking on an advertisement, skipping forward and/or skipping back part of a content item or advertisement, voting for a content item, responding to a survey associated with a content item or advertisement with certain response, skipping a survey entirely, a content item was presented in its entirety, and application and/or content forwarding behaviors;

verify that the received usage statistics originated from the mobile telecommunications device based at least in part on an association of the mobile device identifier, the secret key, and the received usage statistics;

classify, according to the usage statistics, the user of the mobile telecommunications device into one or more categories with varying degrees of affinity;

recommend targeted advertisements for products and/or services based in part on the one or more categories into which the user of the mobile telecommunications device is classified; and transmit the recommendations to the mobile telecommunications device.

11. The system of claim 10, wherein the advertisements are targeted based in part upon one or more criteria chosen from the group consisting of: geographic location of the mobile telecommunications device, time of day, and demographic information of the user of the telecommunications device.

12. The system of claim 10, wherein the mobile device identifier is acquired by the mobile telecommunications device using three or fewer exchange steps between the mobile telecommunications device and the server system.

13. A server system for collecting usage statistics and recommending targeted advertisements to a user of a mobile telecommunications device, the system comprising one or more processors adapted and programmed to:

transmit a mobile device identifier to the user's mobile telecommunications device and verify that received usage statistics originated from the user's mobile telecommunications device based at least in part on an association of the mobile device identifier and the received usage statistics;

receive usage statistics signed with a secret key from the user's mobile telecommunications device by tracking content usage of the user in accordance with a license associated with at least one piece of electronic content,
  wherein the license is configured to be enforced by a digital rights management engine running on the mobile telecommunications device, and
  wherein the license comprises obligations that represent operations that the mobile telecommunications device must perform when use of the electronic content is requested;

verify that the usage statistics signed with the secret key were received from the user's mobile telecommunications device;

classify, according to the usage statistics, the user of the mobile telecommunications device into one or more categories with varying degrees of affinity; and recommend targeted advertisements for products and/or services based in part on the one or more categories into which the user of the mobile telecommunications device is classified.

14. The system of claim 13, wherein recommending targeted advertisements is based in part upon one or more criteria chosen from the group consisting of: geographic location of the mobile telecommunications device, time of day, and demographic information of the user of the telecommunications device.

15. The system of claim 13, wherein the mobile telecommunications device is only intermittently in communication with the server system.

16. A method for recommending targeted advertisements to a user of a mobile telecommunications device comprising:

transmitting a mobile device identifier to the user's mobile telecommunications device and verify that received usage statistics originated from the user's mobile telecommunications device based at least in part on an association of the mobile device identifier and the received usage statistics;

receiving usage statistics signed with a secret key from the user's mobile telecommunications device by tracking content usage of the user in accordance with a license associated with at least one piece of electronic content, wherein the license is configured to be enforced by a digital rights management engine running on the mobile telecommunications device, and wherein the license comprises obligations that represent operations that the mobile telecommunications device must perform when use of the electronic content is requested;

verifying that the usage statistics signed with the secret key were received from the user's mobile telecommunications device;

classifying, according to the usage statistics, the user of the mobile telecommunications device into one or more categories with varying degrees of affinity; and generating recommendations for targeted advertisements for products and/or services based in part on the one or more categories into which the user of the mobile telecommunications device is classified; and transmitting the recommendations to the mobile telecommunications device.

17. The method of claim 16, wherein the recommendations are further based in part on one or more criteria chosen from the group consisting of: geographic location of the mobile telecommunications device, time of day, and demographic information of the user of the telecommunications device.

18. The method of claim 16, wherein the mobile telecommunications device is only intermittently in communication with the server system.

* * * * *